US012753345B2

(12) United States Patent
Saito et al.

(10) Patent No.: US 12,753,345 B2
(45) Date of Patent: Oct. 6, 2026

(54) LIQUID CRYSTAL MEDIUM AND ELECTRONIC COMPONENT

(71) Applicant: Merck Patent GmbH, Darmstadt (DE)

(72) Inventors: Izumi Saito, Darmstadt (DE); Benjamin Snow, Feltham (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/290,249

(22) PCT Filed: May 11, 2022

(86) PCT No.: PCT/EP2022/062716

§ 371 (c)(1),
(2) Date: Nov. 10, 2023

(87) PCT Pub. No.: WO2022/238453

PCT Pub. Date: Nov. 17, 2022

(65) Prior Publication Data

US 2024/0271042 A1 Aug. 15, 2024

(30) Foreign Application Priority Data

May 12, 2021 (EP) .................................... 21173479

(51) Int. Cl.

| | |
|---|---|
| ***G02F 1/1333*** | (2006.01) |
| ***C09K 19/12*** | (2006.01) |
| ***C09K 19/34*** | (2006.01) |
| *C09K 19/18* | (2006.01) |

(52) U.S. Cl.

CPC .......... *C09K 19/3475* (2013.01); *C09K 19/12* (2013.01); *C09K 19/3444* (2013.01); *C09K 19/3491* (2013.01); *C09K 2019/183* (2013.01); *C09K 2019/3422* (2013.01)

(58) Field of Classification Search

CPC .... C09K 19/12; C09K 19/54; C09K 19/3475; C09K 19/3444; C09K 19/3491; C09K 2019/183; C09K 2019/3422; C09K 2019/0466; C09K 2019/3004; C09K 2019/3009; C09K 2019/301; C09K 2019/3025; G02F 1/1333; G02F 1/13363

See application file for complete search history.

(56) References Cited

U.S. PATENT DOCUMENTS

| | | | | |
|---|---|---|---|---|
| 8,486,297 | B2 | 7/2013 | Jansen et al. | |
| 8,906,261 | B2 | 12/2014 | Wittek et al. | |
| 10,412,806 | B2 | 9/2019 | Chong et al. | |
| 11,473,014 | B2 * | 10/2022 | Chang | C09K 19/3405 |
| 2013/0119312 | A1 | 5/2013 | Wittek et al. | |
| 2017/0306230 | A1 | 10/2017 | Manabe et al. | |
| 2018/0100104 | A1 * | 4/2018 | Goebel | C09K 19/42 |
| 2020/0032142 | A1 | 1/2020 | Chang et al. | |
| 2024/0271042 | A1 * | 8/2024 | Saito | C09K 19/54 |

FOREIGN PATENT DOCUMENTS

| | | | |
|---|---|---|---|
| CN | 103038312 | A | 4/2013 |
| CN | 107109225 | A | 8/2017 |
| CN | 107406767 | A | 11/2017 |
| DE | 102011106314 | A1 | 2/2012 |
| EP | 3599266 | A1 | 1/2020 |
| WO | 2019024052 | A1 | 2/2019 |
| WO | 2020015933 | A1 | 1/2020 |

OTHER PUBLICATIONS

International Search Report, PCT International Application No. PCT/EP2022/062716, Sep. 8, 2022 (2 p.).

Davis et al., "Liquid Crystal Waveguides: New Devices Enabled by >1000 Waves of Optical Phase Control", Proceedings of SPIE—The International Society for Optical Engineering, (Feb. 2010), vol. 7618, pp. 76180E-1-76180E-14.

McManamon et al., "Optical Phased Array Technology", Proceedings of the IEEE, (Feb. 1996), vol. 84, No. 2, pp. 268-298.

McManamon, "Agile Nonmechanical Beam Steering", Optics and Photonics News, (Mar. 2006), vol. 17, No. 3, pp. 24-29.

Office Action (Notification of the First Office Action) issued on Jul. 31, 2025, by the State Intellectual Property Office of People's Republic of China in corresponding Chinese Patent Application No. 202280034363.X, and an English Translation of the Office Action. (18 pages).

Kirsch, "Fluorine in Liquid Crystal Design for Display Applications", Journal of Fluorine Chemistry, (Sep. 2015), vol. 177, pp. 29-36.

* cited by examiner

*Primary Examiner* — Geraldina Visconti

(74) *Attorney, Agent, or Firm* — Buchanan Ingersoll & Rooney PC

(57) ABSTRACT

A liquid crystal medium comprising a) one or more compounds of formula I and one or more compounds of the formula T and one or more compounds of the formula S1

I

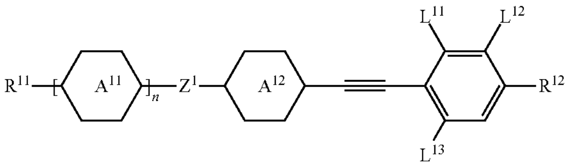

T

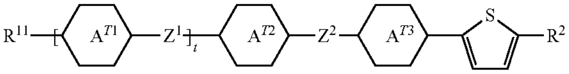

S1

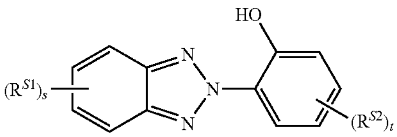

and an electronic component comprising said LC medium, operable in the visible (VIS), infrared (IR) or microwave region of the electromagnetic spectrum. Also, the use of said LC medium in the IR, VIS or microwave region and to devices comprising said electronic component.

18 Claims, 1 Drawing Sheet

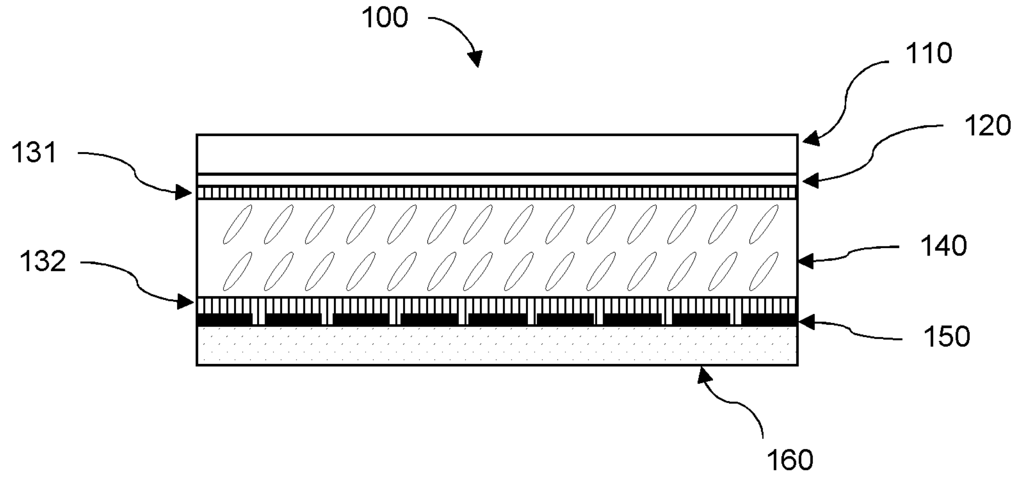
100
110
120
131
140
132
150
160

LIQUID CRYSTAL MEDIUM AND ELECTRONIC COMPONENT

CROSS-REFERENCE TO RELATED APPLICATIONS

This application is a U.S. national stage application filed and claiming priority under 35 U.S.C. §§ 120 and 365(a) of International Application No. PCT/EP2022/062716, filed May 11, 2022, and claiming priority under 35 U.S.C. § 119 of and to European Patent Application No. 21173479.3, filed May 12, 2021, each of which applications is incorporated herein by reference in its entirety and for all purposes.

BACKGROUND

The invention relates to a liquid crystal (LC) medium and to an electronic component comprising said LC medium, operable in the visible (VIS), infrared (IR) or microwave region of the electromagnetic spectrum. The invention further relates to the use of said LC medium in the IR, VIS or microwave region and to devices comprising said electronic component.

Liquid-crystalline media have been used for many years in electro-optical displays (liquid crystal displays: LCDs) in order to display information by amplitude modulation of polarised light in the visible region and are widely used in displays for TV, monitor or portable devices such as tablet PC, mobile phones etc.

Nematic liquid crystals have also been proposed for phase modulation of light: The article McManamon P F, Dorschner T A, Corkum D L, Friedman L J, Hobbs D S, Holz M, Liberman S, Nguyen H Q, Resler D P, Sharp R C, Watson E A. Optical phased array technology. Proc IEEE. 1996; 84:268-298. doi:10.1109/5.482231 describes liquid crystal based optical phased arrays for various types of sensor applications; the article Scott R. Davis, George Farca, Scott D. Rommel, Seth Johnson, Michael H. Anderson, "Liquid crystal waveguides: new devices enabled by >1000 waves of optical phase control," Proc. SPIE 7618, Emerging Liquid Crystal Technologies V, 76180E (12 Feb. 2010); doi: 10.1117/12.851788 describes refractive beam steering using a waveguide structure.

Liquid crystal on silicon (LCoS) is a miniaturized reflective active-matrix liquid-crystal display or "micro display" using a liquid crystal layer on top of a silicon backplane. It is also referred to as a spatial light modulator (SLM).

The silicon backplane is an array of pixels, each of which has a mirrored surface which at the same time acts as electrical conductor. Each pixel comprises a stationary mirror covered by an active liquid-crystal layer having a twisted nematic alignment which can be switched into homeotropic alignment by application of a voltage. LCoS micro displays are small, with a diagonal of typically less than 1.0 inch, but enable high resolutions from ¼ VGA (78 thousand pixels) to UXGA+(over 2 million pixels). Owing to the small pixel size, LCoS displays also have a very small cell thickness, which is typically about 1 micron. Low cell thickness may also be required when a device operates in reflection mode so light will travel through the LC layer twice. The liquid-crystalline phases used in these displays therefore have to have, in particular, high values for the optical anisotropy $\Delta n$, in contrast to conventional reflective-type LC displays, which usually require LC phases of low $\Delta n$. Small cell thicknesses are preferably used, in particular, for applications which require a short response time since the response time drops proportionally, often quadratically, with the cell thickness.

Liquid-crystalline compounds with high birefringence frequently have an intrinsic smectic phase or induce the formation of a smectic phase when mixed with other liquid-crystalline compounds, which has an adverse effect on the low-temperature stability of the displays.

LCoS was initially developed for projection televisions but is now also used for wavelength selective switching, structured illumination, near-eye displays and optical pulse shaping. A computer-generated hologram may be encoded on a spatial light modulator arranged to modulate the amplitude and/or phase of incident light, which forms part of a holographic projector as described in WO2020/015933 A1. Such projectors have found application in head-up displays (HUD) and head-mounted displays (HMD) including near-eye devices.

Another application using liquid crystal based devices is light detection and ranging (Lidar)—a method for measuring distances by illuminating a target with laser light and measuring the reflection with a sensor. Differences in laser return times and wavelengths can then be used to make digital 3-D representations of the target. In WO2019/24052 A1, a holographic LIDAR system is proposed that uses for example an LCoS SLM.

SUMMARY

One of the most important features for a phase-only LCoS device is its use of optically non-linear liquid crystal materials that are sensitive to the working temperature. While the main focus of LCoS devices in the past was on optical intensity modulation, which is little affected by temperature variation, for phase-only LCoS devices optical phase modulation of the incident light is an essential performance parameter and it can easily be affected by a small change of working temperature, resulting in a significant change in the outcome of corresponding optical diffractions.

Another key challenge for the development of next generation LCoS devices is the creation of a high-speed multilevel phase modulation. Nematic LCoS devices have demonstrated the benefits of the multi-level phase modulation but are limited by the slow response time of the nematic LC. This is especially the case in telecommunication applications, where infrared wavelengths are used that require thicker devices, thus further slowing down the response times. Hence, the main materials challenge for these applications is to find a suitable high-speed LC material capable to deliver the full $2\pi$ phase depth required in these applications.

There is thus a need for liquid-crystal based optical components, in particular LCOS devices, operable in the visible or infrared region of the electromagnetic spectrum with improved overall application relevant properties having high birefringence and fast switching speed.

The invention is devised in the light of the problems of the prior art described herein. Accordingly, it is a general object of the present invention to provide a novel and useful material, device and technique that can solve the problems described herein.

An object of the present invention is a liquid crystal medium comprising a) one or more compounds of formula I

I

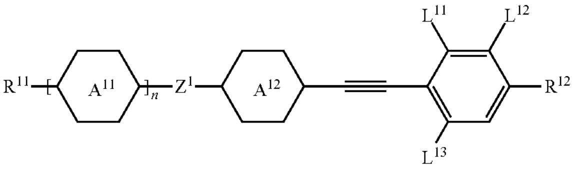

in which $R^{11}$ and $R^{12}$, identically or differently, denote H, alkyl or alkoxy having 1 to 12 C atoms, or alkenyl, alkenyloxy or alkoxyalkyl having 2 to 12 C atoms, in which one or more $CH_2$-groups may be replaced by

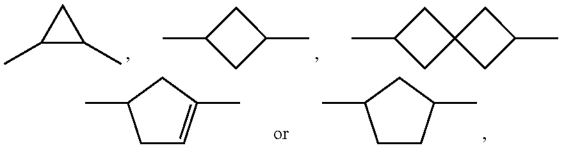

, , , or , and in which one or more H atoms may be replaced by fluorine, $L^{11}$, $L^{12}$, $L^{13}$ identically or differently, denote H, $CH_3$, Cl or F, $A^{11}$ denotes phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl or cyclo-hexene-1,4-diyl, in which one or two non-adjacent $CH_2$ groups may be replaced, independently of one another, by O and/or S and one or more H atoms may be replaced by F, bicyclo[1.1.1]pentane-1,3-diyl, bicyclo[2.2.2]-octane-1,4-diyl, spiro[3.3]heptane-2,6-diyl, tetrahydro-pyran-2,5-diyl or 1,3-dioxane-2,5-diyl, $A^{12}$ denotes phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, or cyclohexane-1,4-diyl or cyclohexene-1,4-diyl, in which, one or two non-adjacent $CH_2$ groups may be replaced, independently of one another, by O and/or S and one or more H atoms may be replaced by F, preferably phenylene-1,4-diyl, in which one or more H atoms may be replaced by halogen, CN, $CH_3$, $CHF_2$, $CH_2F$, $CF_3$, $OCH_3$, $OCHF_2$ or $OCF_3$ or cyclo-hexane-1,4-diyl, $Z^1$ denotes denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, —CH═$CHCH_2O$—, preferably a single bond, n is 0 or 1, preferably 1;

and b) one or more compounds of the formula T,

T

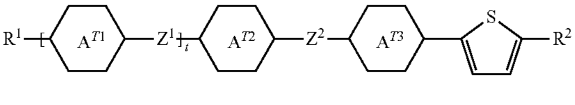

in which $R^1$ and $R^2$ denote H, F, C, Br, —CN, —SCN, —NCS, $SF_5$ or straight-chain or branched alkyl having 1 to 12 C atoms, in which one or more non-adjacent $CH_2$ groups may each be replaced, independently of one another, by —CH═CH—, —C≡C—, —O—, —CO—, —CO—O—, —O—CO—, —O—CO—O— in such a way that 0 atoms are not linked directly to one another, and in which one or more H atoms may be replaced by F, C or Br, $A^{T1}$, $A^{T2}$ and $A^{T3}$ each, independently of one another, denote phenylene-1,4-diyl, in which one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, wherein $A^{T1}$ alternatively denotes cyclohexane-1,4-diyl, in which one or two non-adjacent $CH_2$ groups may be replaced, independently of one another, by O and/or S and one or more H atoms may be replaced by F, cyclohexene-1,4-diyl, bicyclo [1.1.1]pentane-1,3-diyl, bicyclo[2.2.2]octane-1,4-diyl, spiro[3.3]-heptane-2,6-diyl, tetrahydropyran-2,5-diyl or 1,3-dioxane-2,5-diyl, $Z^1$ and $Z^2$ each, independently of one another, denote —$CF_2O$—, —$OCF_2$—, —$CH_2O$—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2CFH$—, —$CF_2CFH$—, —$CFHCF_2$—, —CH═CH—, —CF═CH—, —CH═CF—, —CF═CF—, —C≡C— or a single bond, preferably a single bond, t is 0 or 1, preferably 0;

and c) one or more compounds of formula S1

S1

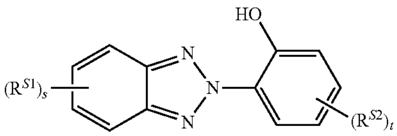

in which $R^{S1}$ and $R^{S2}$, on each occurrence, identically or differently, denote H or straight-chain alkyl having from 1 to 25 carbon atoms or branched alkyl having from 3 to 25 carbon atoms, which are unsubstituted or monosubstituted by CN or $CF_3$ or at least monosubstituted by halogen and in which one or more $CH_2$ groups may each, independently of one another, be replaced by

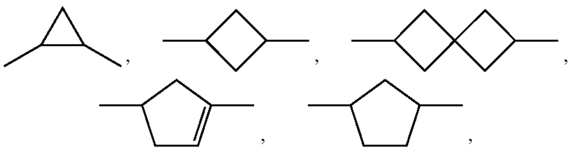

, , , , ,

—O—, —S—, —CO—, —CO—O—, —O—CO—, —O—CO—O—, —CH═CH— or —C≡C— in such a way that O and/or S atoms are not linked directly to one another, or halogen, aryl, heteroaryl, alkylaryl or arylalkyl having from 6, 5, 7, or 7 to 25 carbon atoms, respectively, each of which is unsubstituted or monosubstituted or polysubstituted by alkyl having from 1 to 6 C atoms or by halogen, s is 0, 1 or 2, and t is 0, 1, 2 or 3.

According to another aspect of the present invention there is provided an electronic component comprising the liquid crystal medium according to the invention.

The invention further relates to a device comprising said electronic component.

The invention further relates to the use of the medium defined above and below for electro-optical purposes in the visible or in the infrared region of the electromagnetic spectrum, preferably in the region from 420 nm to 750 nm, or in the A-band, and/or B-band and/or C-band, for phase modulation of said visible or infrared light.

The medium according to the invention is distinguished by a very high birefringence, where despite the high birefringence excellent light stability is observed under irradiation with blue light. The medium particularly is further distinguished by high values of the dielectric anisotropy and low rotational viscosities. As a result, the threshold voltage, i.e., the minimum voltage at which a device is switchable, is very low. A low operating voltage and low threshold voltage is desired in order to enable a device having improved switching characteristics and high energy efficiency. Low rotational viscosities enable fast switching of the components and devices according to the invention.

The optical component according to the invention is distinguished by excellent operational stability when exposed to the environment because of high clearing temperature, broad nematic phase range and excellent low-temperature stability (LTS) of the liquid crystal medium used therein. As a result, the component and devices containing the component are operable under extreme temperature conditions. Surprisingly, the temperature dependence of the birefringence of said liquid crystal medium is very small, i.e., the Δn changes little with the temperature which makes a device reliable and easy to control.

The medium according to the invention is likewise suitable for use in components and devices for high-frequency technology and applications in the microwave range, in particular devices for shifting the phase of microwaves, tunable filters, tunable metamaterial structures, and electronic beam steering antennas (e.g., phased array antennas).

According to another aspect of the present invention there is thus provided a component and a device comprising said component, both operable in the microwave region of the electromagnetic spectrum. Preferred components are phase shifters, varactors, wireless and radio wave antenna arrays, matching circuits and adaptive filters.

BRIEF DESCRIPTION OF FIGURES

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 1 depicts an exemplary a reflective spatial light modulator according to one example.

DETAILED DESCRIPTION

Unless explicitly stated otherwise, the following definitions apply. As used herein, halogen is F, Cl, Br or I, preferably F or Cl, particularly preferably F.

Herein, alkyl is straight-chain or branched and has 1 to 15 C atoms, is preferably straight-chain and has, unless indicated otherwise, 1, 2, 3, 4, 5, 6 or 7 C atoms and is accordingly preferably methyl, ethyl, n-propyl, n-butyl, n-pentyl, n-hexyl or n-heptyl.

Herein, branched alkyl is alkyl having a secondary and/or tertiary, preferably secondary, carbon atom and is preferably isopropyl, s-butyl, isobutyl, isopentyl, 2-methylhexyl or 2-ethylhexyl, 2-methylpropyl, 2-pentyl, 3-pentyl, 2-methylbutyl, 3-methylbutyl.

Herein, a cyclic alkyl group is taken to mean a cycloalphatic radical or an alkyl group in which a methylene group is replaced with a cycloalphatic group (i.e. a cycloalkylalkyl or alkylcycloalkylalkyl), which may be saturated or partially unsaturated, and preferably denotes cyclopropyl, methylcyclopropy, cyclobutyl, methylcyclobutyl, cyclopentyl, methylcyclpoentyl, cyclopent-1-enyl, cyclopropylmethyl, cyclopropylethyl, cyclobutylmethyl, cyclobutylethyl, cyclopentylmethyl, cyclopentylethyl, cyclopent-1-enylmethyl.

Herein, an alkoxy radical is straight-chain or branched and contains 1 to 15 C atoms. It is preferably straight-chain and has, unless indicated otherwise, 1, 2, 3, 4, 5, 6 or 7 C atoms and is accordingly preferably methoxy, ethoxy, n-propoxy, n-butoxy, n-pentoxy, n-hexoxy or n-heptoxy.

Herein, an alkenyl radical is preferably an alkenyl radical having 2 to 15 C atoms, which is straight-chain or branched and contains at least one C—C double bond. It is preferably straight-chain and has 2 to 7 C atoms. Accordingly, it is preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl. If the two C atoms of the C—C double bond are substituted, the alkenyl radical can be in the form of E and/or Z isomer (trans/cis). In general, the respective E isomers are preferred. Of the alkenyl radicals, prop-2-enyl, but-2- and -3-enyl, and pent-3- and -4-enyl are particularly preferred.

Herein, alkynyl is taken to mean an alkynyl radical having 2 to 15 C atoms, which is straight-chain or branched and contains at least one C—C triple bond. 1- and 2-propynyl and 1-, 2- and 3-butynyl are preferred.

As used herein, infrared region of the electromagnetic spectrum is taken to mean the spectral region of electromagnetic radiation having a wavelength in the range of from 0.75 μm to 1000 μm.

As used herein, visible light is taken to mean light having a wavelength in the range of from 420 nm to 750 nm.

As used herein, blue light is light having a peak wavelength in the range of from 420 to 490 nm, preferably from 450 to 460 nm.

As used herein, infrared A (IR-A) is taken to mean the spectral region of electromagnetic radiation having a wavelength in the range of from 0.75 μm to 1.4 μm.

As used herein, infrared B (IR-B) is taken to mean the spectral region of electromagnetic radiation having a wavelength in the range of from 1.4 μm to 3 μm.

As used herein, infrared C (IR-C) is taken to mean the spectral region of electromagnetic radiation having a wavelength in the range of from 3 μm to 1000 μm.

Preferably, the optical component according to the invention operates at a wavelength in the range of from 750 nm to 2500 nm, in particular from 1530 nm to 1565 nm.

A very preferred light source for applications according to the invention is an IR laser emitting light with a wavelength of 1.55 μm or an IR laser emitting light with a wavelength of 905 nm.

Herein, "high-frequency technology" means applications of electromagnetic radiation having frequencies in the range of from 1 MHz to 1 THz, preferably from 1 GHz to 500 GHz, more preferably 2 GHz to 300 GHz, particularly preferably from 5 GHz to 150 GHz.

The compounds of formula I are preferably selected from the group of the formulae I-1 to I-3, particularly preferably from formula I-3

I-1

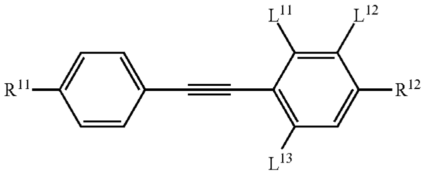

I-2

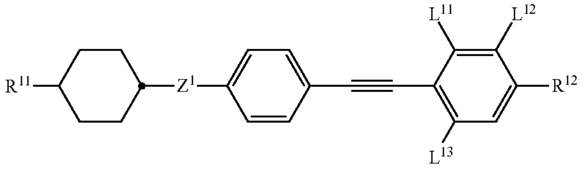

I-3

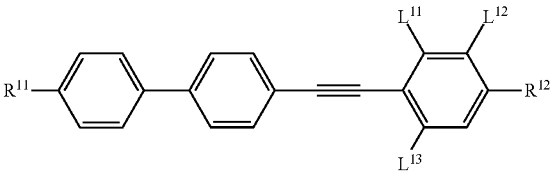

in which the occurring groups have the respective meanings given above under formula I, and in the formulae I-1 and I-2 preferably $R^{11}$ is n-alkyl or alkenyl having up to 7 C atoms, most preferably n-alkyl having 1 to 5 C atoms, and $R^{12}$ is n-alkoxy or alkenyloxy having 1 to 6 C atoms, most preferably n-alkoxy having 1 to 4 C atoms, and in formula I-3 preferably $R^{11}$ is n-alkyl or alkenyl having up to 7 C atoms, most preferably n-alkyl having 1 to 5 C atoms, and $R^{12}$ is n-alkyl or alkenyl having up to 7 C atoms, most preferably n-alkyl having up to 5 C atoms.

The liquid-crystal media according to the present invention preferably comprise one or more compounds of formula I-1, preferably selected from the group of compounds of formulae I-1a to I-1d, preferably of formulae I-1a and/or I-1d, most preferably of formula I-1a, I-1a

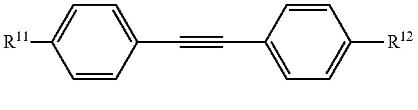

-continued

I-1b

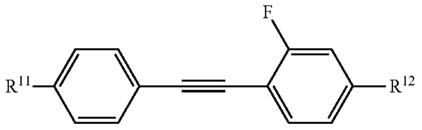

I-1c

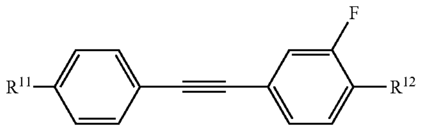

I-1d

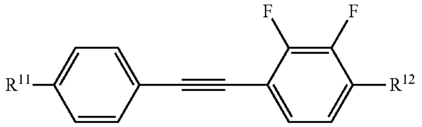

in which $R^{11}$ and $R^{12}$ have the meanings given above.

The liquid-crystal media according to the present invention preferably comprise one or more compounds of formula I-2, preferably selected from the group of compounds of formulae I-2a to 1-2f, preferably of formulae I-2a and/or 1-2d, most preferably of formula 1-2a, I-2a

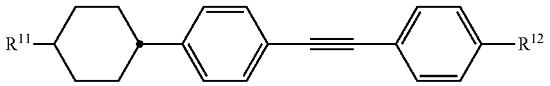

I-2b

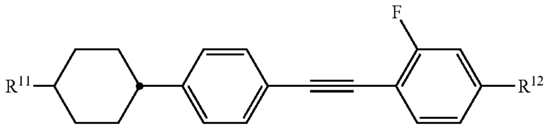

I-2c

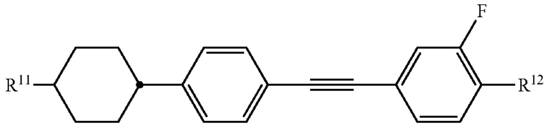

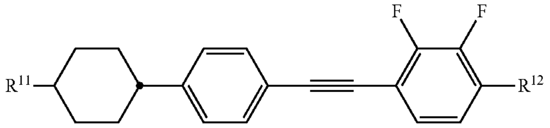

I-2e

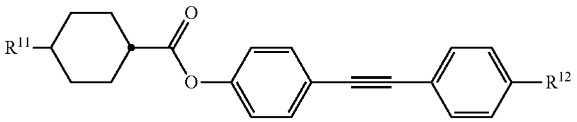

I-2f

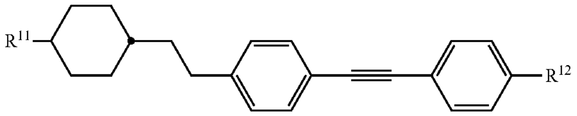

in which $R^{11}$ and $R^{12}$ have the meanings given above.

The liquid-crystal media according to the present invention preferably comprise one or more compounds of formula I-3, preferably selected from the group of compounds of formulae I-3a to I-3d, preferably of formulae I-3a and/or I-3c and/or I-3d, most preferably of formula I-3d, I-3a

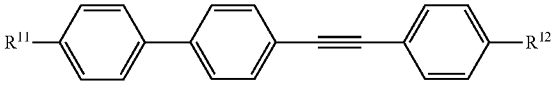

I-3b

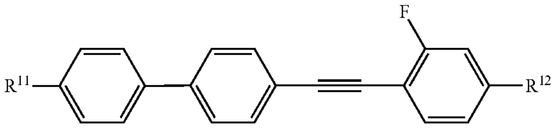

I-3c

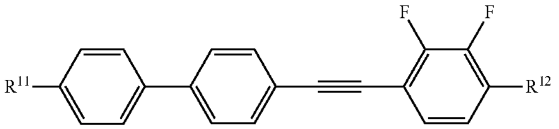

I-3d

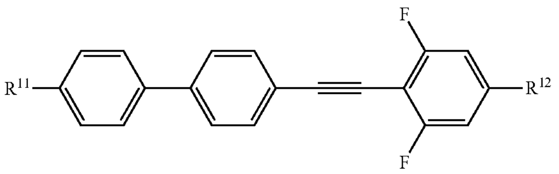

in which $R^{11}$ and $R^{12}$ have the meanings given above.

Preferred compounds of the formula T are selected from the group of the formulae T1 to T5, very preferred are the compounds of the formula T1:

T1

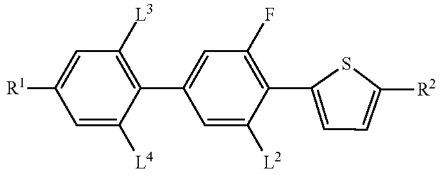

T2

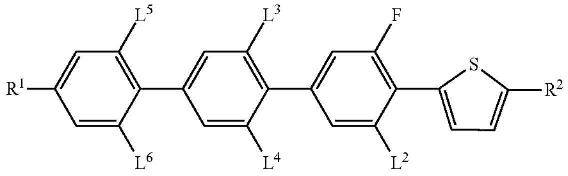

T3

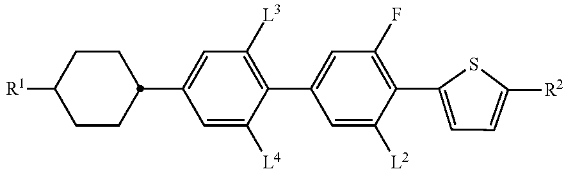

-continued

T4

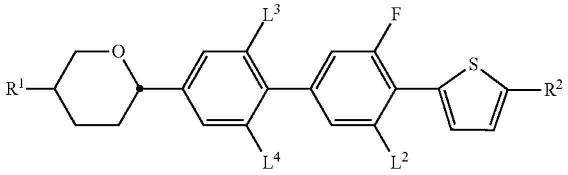

T5

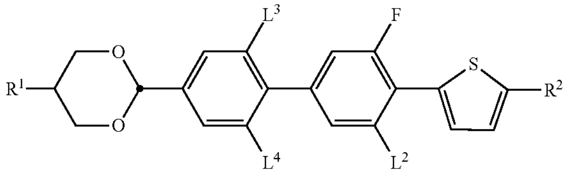

in which $R^1$ and $R^2$ have the meanings indicated above for formula T, and $L^2$, $L^3$, $L^4$, $L^5$ and $L^6$ denote H of F. Preferably $L^2$ denotes F and $L^4$, $L^5$ and $L^6$ denote H and $L^3$ denotes H or F.

Very preferred compounds of the formula S1 are those in which at least one of the radicals $R^{S2}$ is straight-chain or branched alkyl having from 1 to 15 carbon atoms, in which, in addition, one or more $CH_2$ groups may be replaced by —COO— or —O—CO—, aryl or alkylaryl having from 5 to 15 carbon atoms, and X is preferably H or Cl. Very particularly preferred radicals $R^{S2}$ are methyl, tert-butyl, 2-butyl, 1,1-dimethylpropyl, 1,1,2,2-tetramethylpropyl and 1-methyl-1-phenylethyl.

The compounds of formula S1 are preferably selected from the compounds of the formula S1-1

S1-1

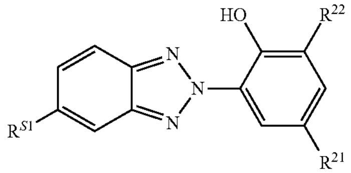

in which $R^{S1}$ denotes H, F or Cl, preferably H or Cl, and $R^{21}$ and $R^{22}$, identically or differently, denote H or straight-chain or branched alkyl having from 1 to 12 carbon atoms, in which one or more $CH_2$ groups may each, independently of one another, be replaced by

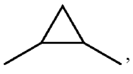, 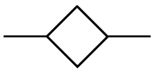, 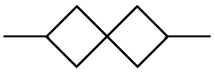, 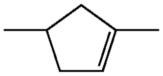, 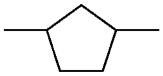,

—O—, —CO—O—, —O—CO—, —CH═CH— or —C≡C— in such a way that O atoms are not linked directly to one another, or aryl, or arylalkyl having from 6 to 25 carbon atoms.

Particular preference is given to compounds of the formula S1-1 selected from the following formulae:

S1-1a
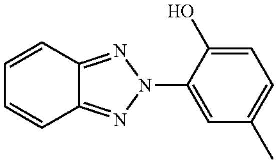
S1-1b
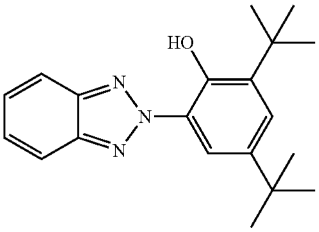
S1-1c
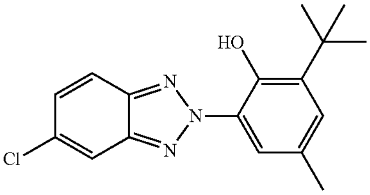
S1-1d
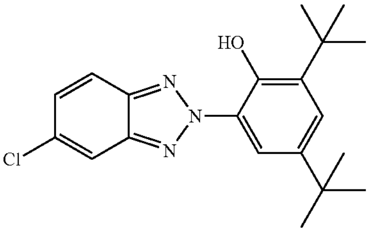
S1-1e
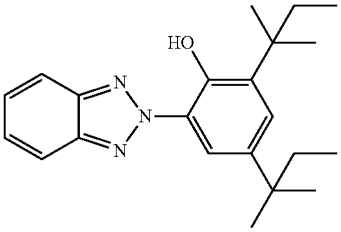
S1-1f
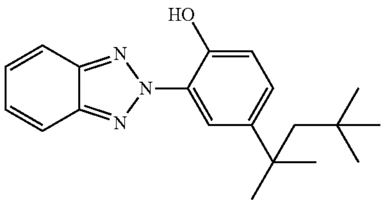
S1-1g
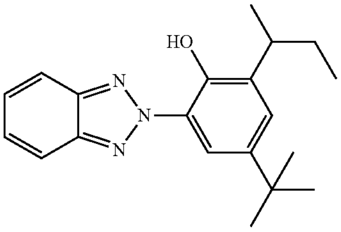
-continued
S1-1h
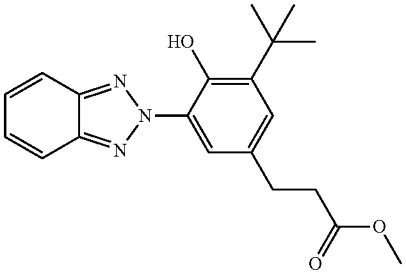
S1-1i
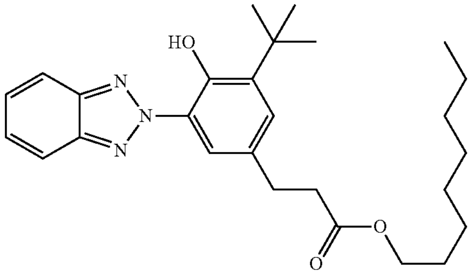
S1-1j
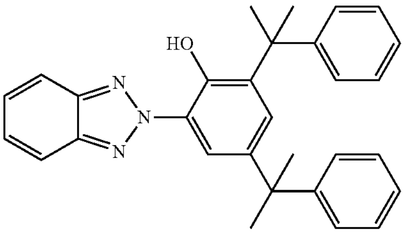
S1-1k
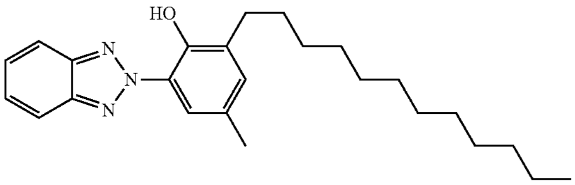
S1-1l
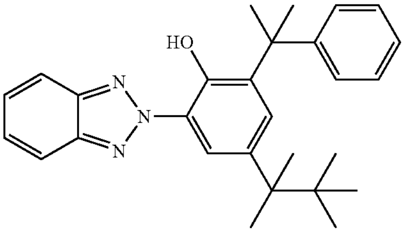
or mixtures of these compounds. Particularly preferred is the compound of the formula S1-1a.
Further suitable UV stabilisers are selected from the following formulae:
UV1
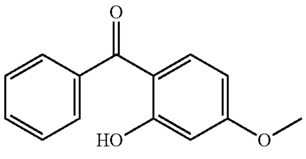

-continued

UV2

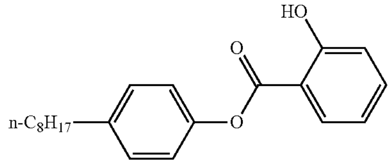

UV3

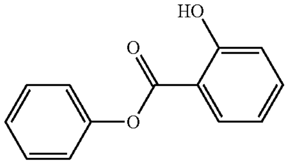

UV4

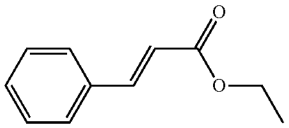

UV5

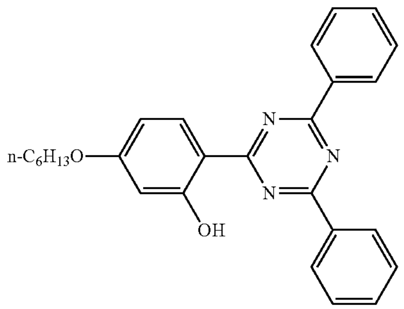

In a preferred embodiment of the present invention the medium comprises one or more compounds selected from the group consisting of the formulae S2 and S3

S2

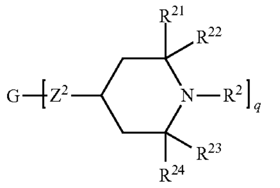

S3

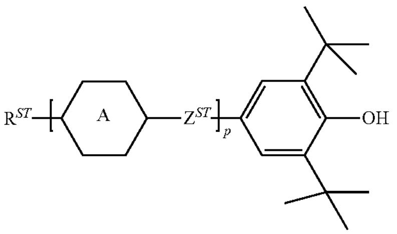

in which q is 1, 2, 3 or 4, preferably 2, 3 or 4, very preferably 2 or 4,

G denotes a hydrocarbon radical having from 1 to 60 carbon atoms, that can be straight chain or branched or cyclic, and which is unsubstituted or monosubstituted by CN or $CF_3$ or at least monosubstituted by halogen and in which one or more $CH_2$ groups may each, independently of one another, be replaced by —O—, —S—, —$NR^0$—, —CO—, —CO—O—, —O—CO—, —O—CO—O—, —CH═CH— or —C≡C— in such a way that O or S atoms are not linked directly to one another, $R^0$ denotes alkyl having 1 to 6 C atoms, $R^2$ denotes H, —O·, —OH, straight chain or branched or cyclic alkyl or alkoxy or arylalkoxy each having 1 to 12 C atoms, preferably H or —O·, $R^{21}$ and $R^{22}$ identically or differently, denote a straight- or branched alkyl residue having from 1 to 12 carbon atoms or $R^{21}$ and $R^{22}$, together with the carbon atom to which they are attached, form a cycloalkyl group having from 5 to 12 carbon atoms, $R^{23}$ and $R^{24}$ identically or differently, denote a straight- or branched alkyl residue having from 1 to 12 carbon atoms or $R^{23}$ and $R^{24}$, together with the carbon atom to which they are attached, form a cycloalkyl group having from 5 to 12 carbon atoms, $Z^2$ on each occurrence, identically or differently, denotes —O—, —C(O)O—, OC(O)— or a single bond, $R^{ST}$ denotes H, alkyl or alkoxy having 1 to 12 C atoms, or alkenyl, alkenyloxy or alkoxyalkyl having 2 to 12 C atoms, in which one or more $CH_2$-groups may be replaced by

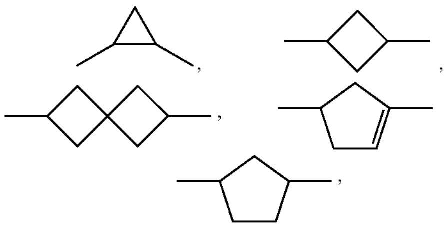

or and in which one or more H atoms may be replaced by fluorine, $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond,

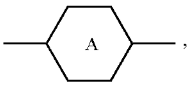

on each occurrence, identically or differently, denotes cyclohexane-1,4-diyl, cyclohexene-1,4-diyl, pyrane-2,5-diyl or 1,3-dioxane-2-5-diyl, in which one or more H atoms may be replaced by F, p is 0, 1 or 2.

In formula S2, when q is 2, G may be a divalent, straight- or branched aliphatic residue (either saturated or unsaturated) having from 2 to 20 carbon atoms, a divalent alicyclic residue having from 5 to 20 carbon atoms, a divalent aralkyl residue having 8 to 20 carbon atoms, or a divalent aryl residue having 6 to 20 carbon atoms.

Examples of the group G when q is 2 are 1,2-ethylene, 1,2-propylene, 1,4-n-butylene, 1,3-butylene, 1,6-n-hexylene, 1,7-n-heptylene, 1,10-n-decylene, 1,12-n-dodecylene, 2,2-dimethyl-1,3-propylene, 1,2,3-trimethyl-1,4-butylene, 3-thia-1,5-pentylene, 3-oxa-1,5-pentylene, 1,4-but-2-enylene, 1,4-but-2-ynylene, 2,5-hex-3-enylene, 1,2-cyclohexylene, 1,3-cyclohexylene, 1,4-cyclohexylene, hexahydro-p-xylylene, p-xylylene, m-xylylene, 1,2-phenylene, 1,4-phenylene, 2,2'-biphenylene, 4,4'-biphenylene, 2,6-naphthylene and 2,7-fluoroenylene.

In formula S2, when q is 3, G may be a trivalent straight- or branched chain aliphatic (either saturated or unsaturated) residue having 3 to 15 carbon atoms, a trivalent alicyclic residue having 5 to 15 carbon atoms, a trivalent aralkyl residue having from 9 to 15 carbon atoms, or a trivalent aryl residue having 6 to 16 carbon atoms.

Examples of the group G when q is 3 are 1,2,3-trisubstituted propane, 1,2,4-tri substituted butane, 2,5-dimethyl-1,2,6-tri substituted hexane, 1,1,1-trimethylene-propane, 1,2,3-tri-substituted cyclohexane, 1,3,5-tri-substituted cyclohexane, 1,3,5-trimethylenebenzene and 1,2,7-trisubstituted anthracene.

In formula S2, when q is 4, G may be a straight- or branched chain tetravalent aliphatic residue (either saturated or unsaturated) having 4 to 60 carbon atoms or a tetravalent alicyclic residue having from 5 to 60 carbon atoms, such as tetramethylenemethane or 1,1,4,4-tetramethylene cyclohexane, or arylene-tetraalkylene or aralkylaryl-tetraalkylene.

When n is 2, 3 or 4 and G is an aliphatic or alicyclic residue each of these residues may be unsubstituted or substituted by halogen or interrupted by one or more oxygen or sulphur atoms or an aryl or aralkyl residue. Aryl includes condensed rings such as naphthalene and one, two three or more aryl groups connected via a single bond or an alkylene group.

Examples of the groups $R^{21}$ and $R^{22}$, and $R^{23}$ and $R^{24}$ are methyl, ethyl, n-propyl, isopropyl, n-butyl, sec-butyl, n-hexyl, n-dodecyl, or together with the carbon to which they are bound $R^{21}$ and $R^{22}$, and $R^{23}$ and $R^{24}$ can form a group such as

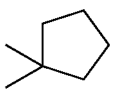 or 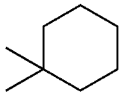.

Particularly preferred substituents $R^{21}$ and $R^{22}$, and $R^{23}$ and $R^{24}$ are straight or branched alkyl groups having 1 to 4 carbon atoms, most preferred methyl.

Very preferred compounds of the formula S2 are selected from the sub-formulae S2-1 and S2-2

S2-1

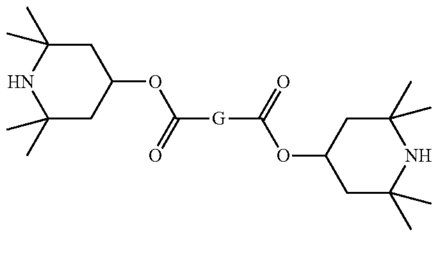

-continued

S2-2

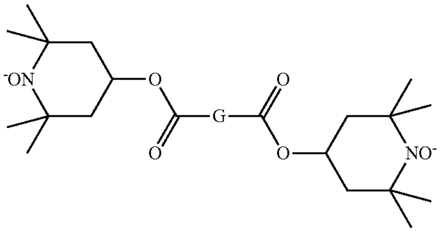

in which G denotes a divalent aliphatic or cycloaliphatic radical having 1 to 20 C atoms.

Examples of the group G in Formula S2-1 or S2-2 are optionally alkylated methylene, ethylene or polymethylene having up to 20 carbon atoms; or the alkylene radical is interrupted by one or two hetero atoms, such as the bivalent radicals $—CH_2OCH_2—$, $—CH_2CH_2OCH_2CH_2—$, $—CH_2CH_2OCH_2CH_2OCH_2CH_2—$, $—CH_2C(O)OCH_2CH_2O(O)CCH_2—$, $—CH_2CH_2C(O)OCH_2CH_2O(O)CCH_2CH_2—$, $—CH_2CH_2—C(O)O(CH_2)_4O(O)C—CH_2CH_2—$, $—CH_2CH_2O(O)C(CH_2)_4C(O)OCH_2CH_2—$ and $—CH_2CH_2O(O)C(CH_2)_8C(O)OCH_2CH_2—$. G can also be arylene-bis-alkylene, e.g. p-xylylene, benzene-1,3-bis(ethylene), biphenyl-4,4'-bis(methylene) or naphthalene-1,4-bis(methylene).

Further very preferred compounds of formula S2 are selected from the compounds of the formula S2-3

S2-3

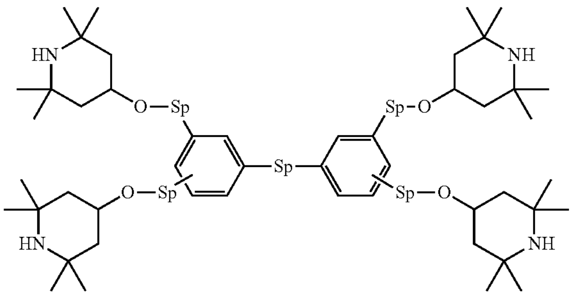

in which

Sp, on each occurrence, identically or differently, denotes straight chain or branched alkylene having 1 to 12 C atoms in which one or more $CH_2$ groups may be replaced with O in such a way that 0 atoms are not linked directly to one another, or a single bond.

Particularly preferably, the medium comprises one or more compounds of the formula S2-1a or S2-2a, preferably S2-1a S2-1a

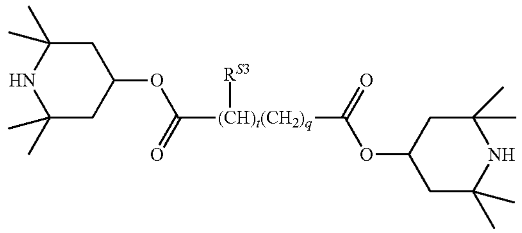

-continued

S2-2a

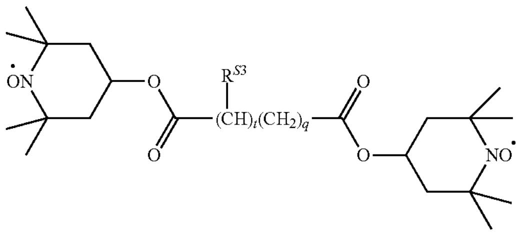

S2-3a

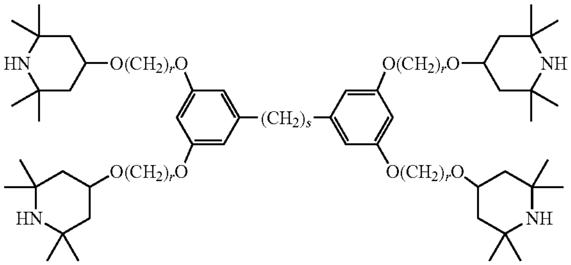

in which $R^{S3}$ denotes H or alkyl having 1 to 6 C atoms, preferably H or ethyl;

t is 0 or 1, and q is 0, 1, 2, 3, 4, 5, 6, 7, 8, or 9, r is 2, 3, 4, 5, 6, 7 or 8, and s is 0, 1, 2, 3, 4, 5, 6, 7, 8, 9, 10, 11 or 12.

Particularly preferably, the compounds of formula S2 are selected from the compounds of the formulae S2-1a-1, S2-1a-2, S2-2a-1 and S2-3a-1. These compounds are distinguished by a very good solubility in liquid-crystalline media.

S2-1a-1

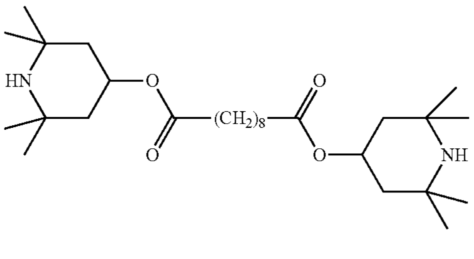

-continued

S2-1a-2

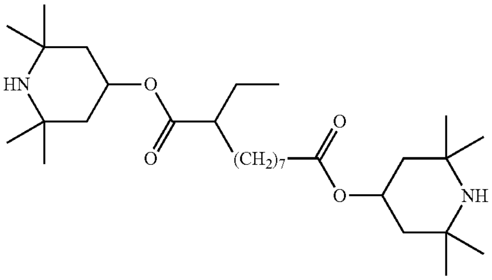

S2-2a-1

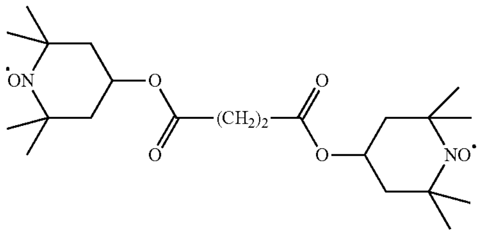

S2-3a-1

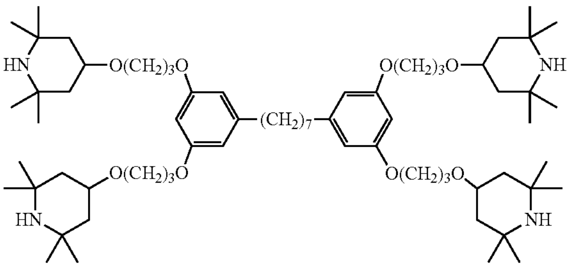

Further preferred examples of compounds of the formula S2 are the following:

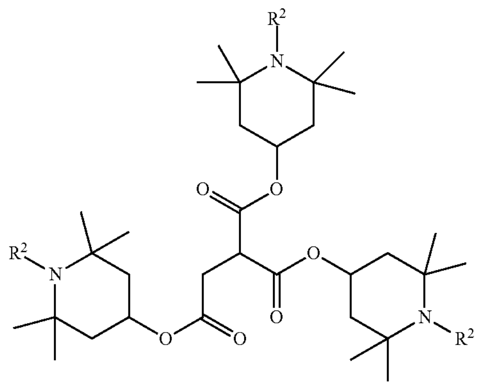
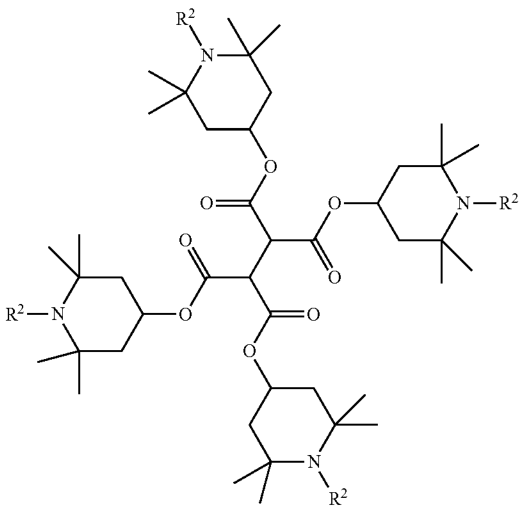
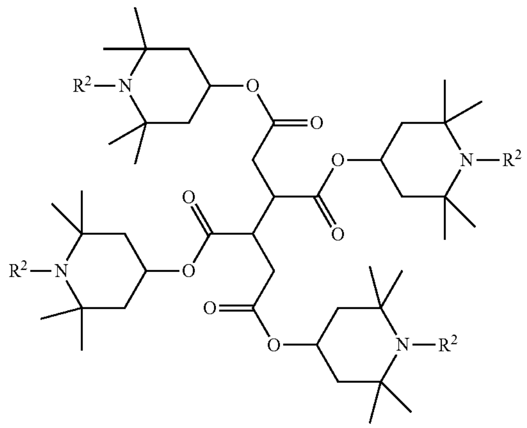
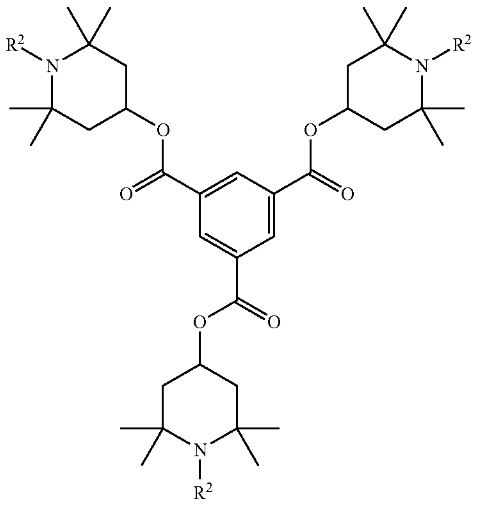
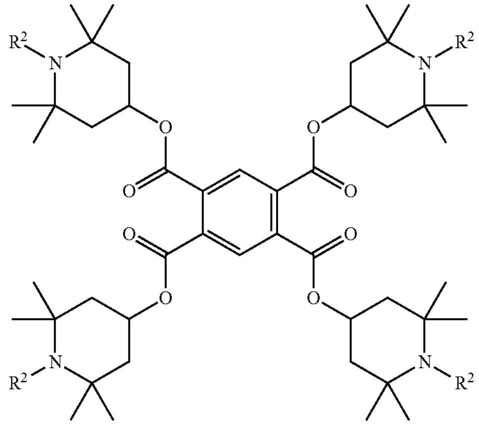

-continued
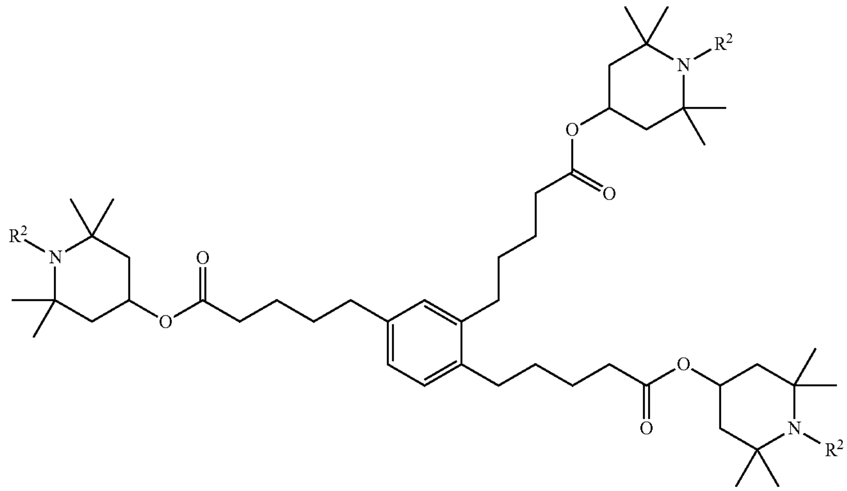
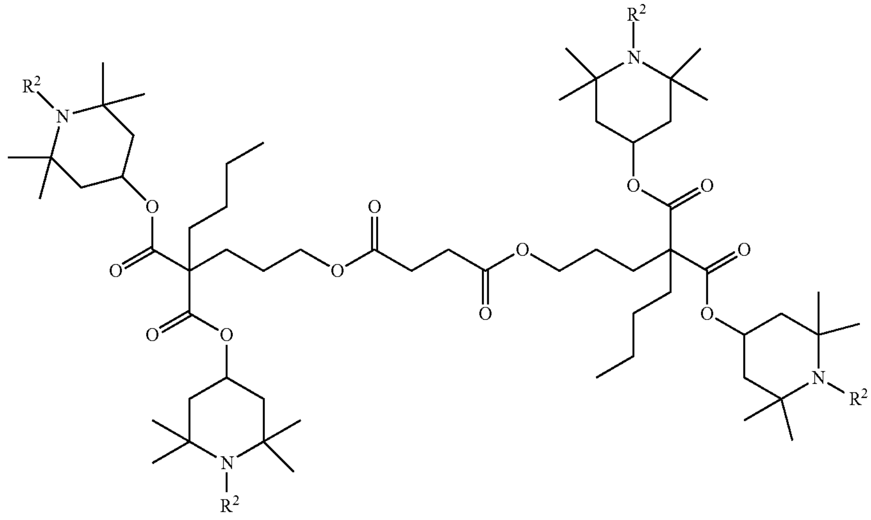

-continued
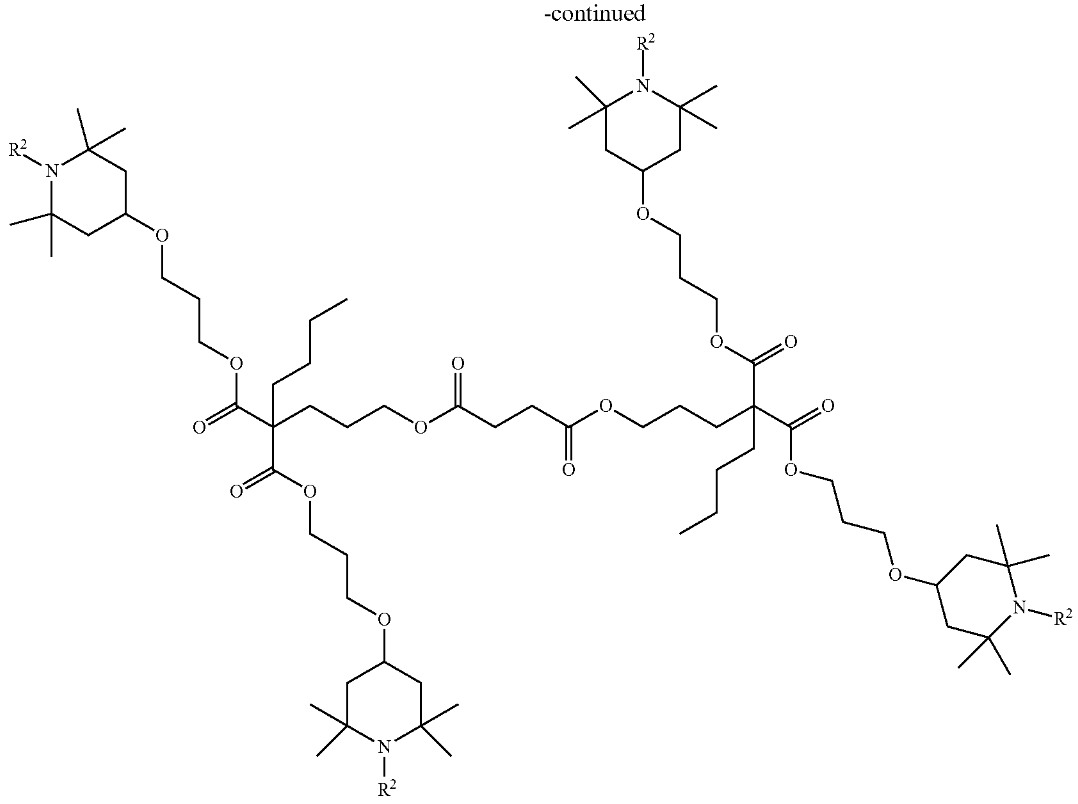
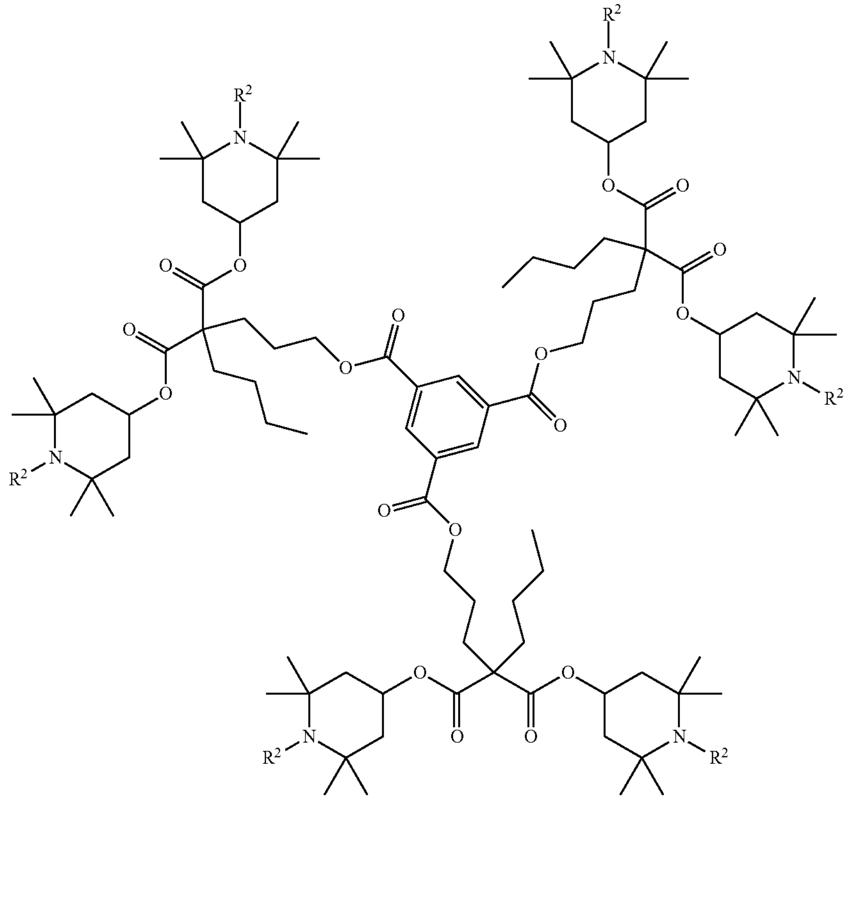

-continued
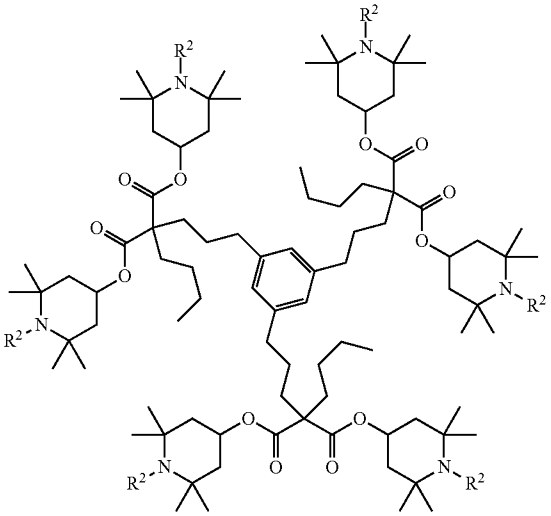
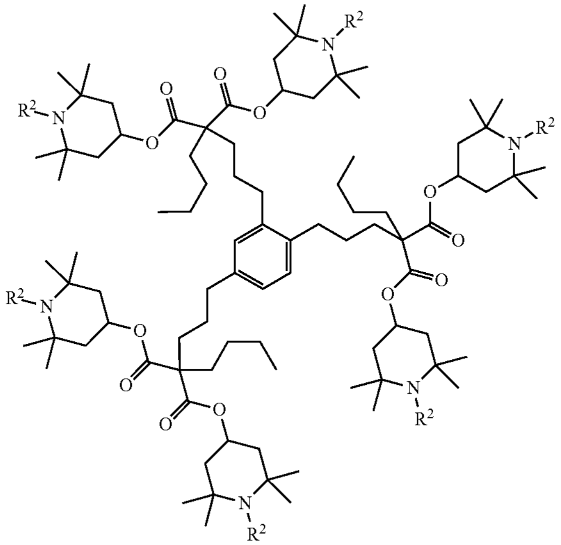
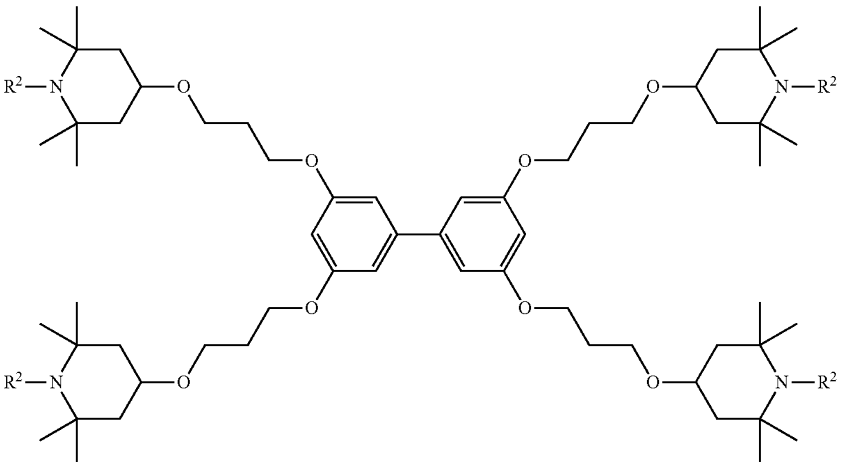

-continued
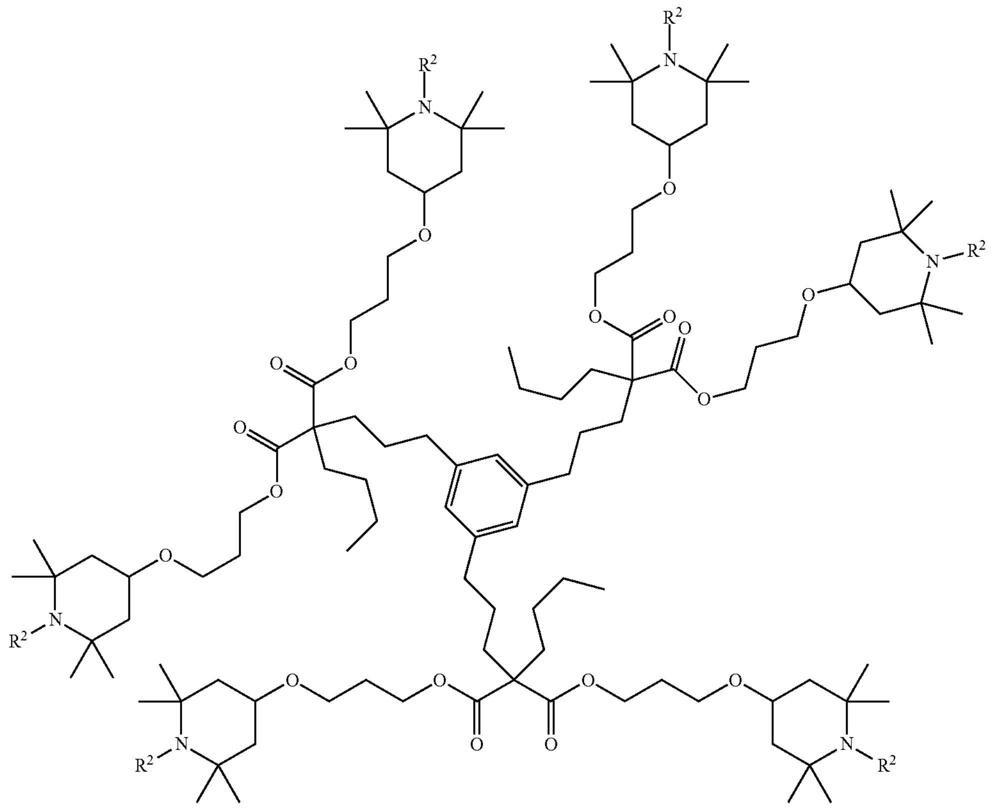

-continued
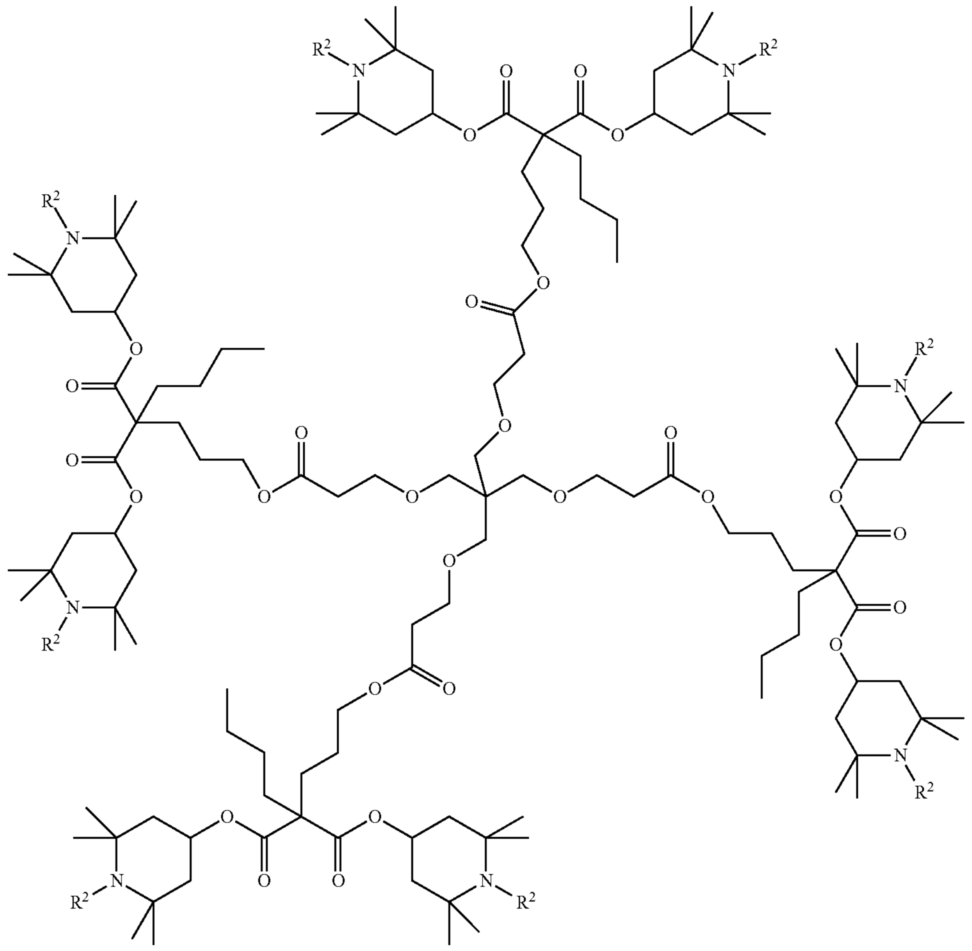

-continued

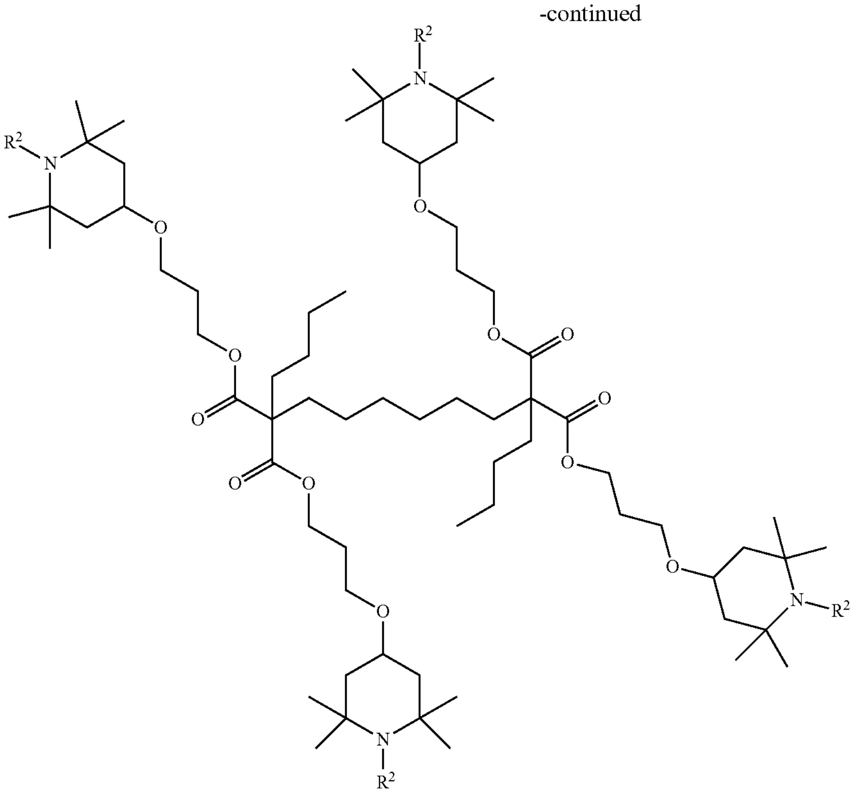

in which $R^2$ has the meanings given above and preferably denotes H or —O·.

Of the compounds of the formula S3, special preference is given to the compounds of the formulae S3-1 to S3-4

S3-1

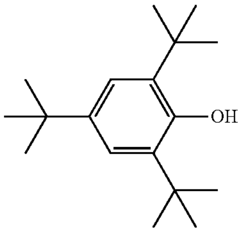

S3-2

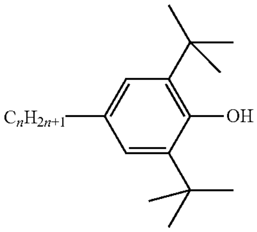

in which n=1, 2, 3, 4, 5, 6 or 7, preferably n=1 or 7

S3-3

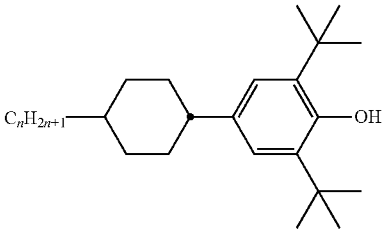

in which n=1, 2, 3, 4, 5, 6 or 7, preferably n=3

S3-4

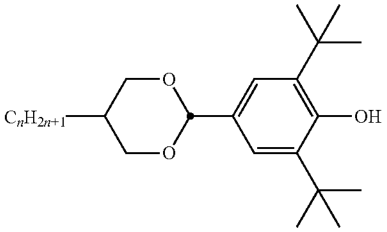

in which n=1, 2, 3, 4, 5, 6 or 7, preferably n=3

In a preferred embodiment, the medium according to the invention comprises one or more compounds selected from the group consisting of the formulae II and III:

II

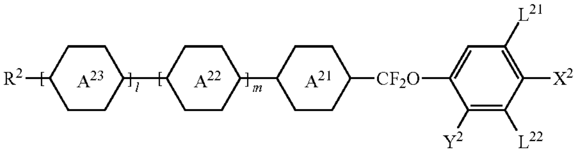

III

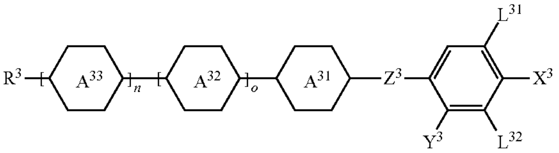

in which $R^2$ and $R^3$ denote a straight-chain or branched alkyl or alkoxy radical that is unsubstituted or halogenated and has 1 to 15 C atoms, where one or more $CH_2$ groups in these radicals may each be replaced, independently of one another, by

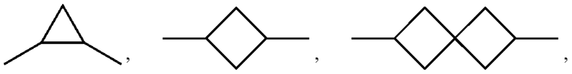

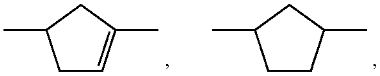

—C≡C—, —$CF_2O$—, —CH═CH—, —O—, —CO—O— or —O—CO— in such a way that O atoms are not linked directly to one another,

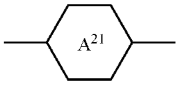

to

and

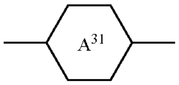

to

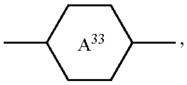

, identically or differently, denote

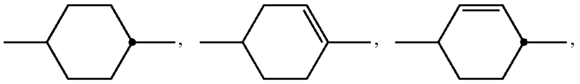

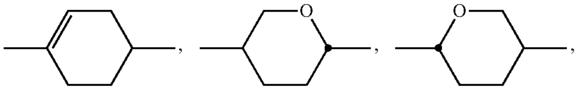

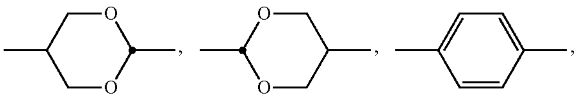

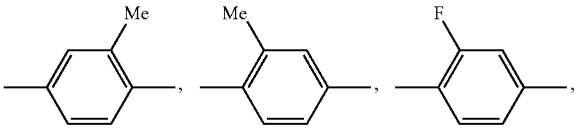

-continued

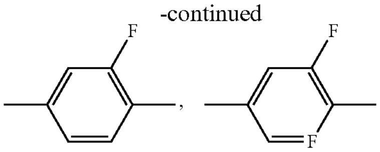

or

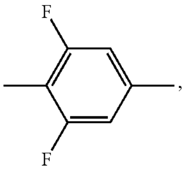

preferably

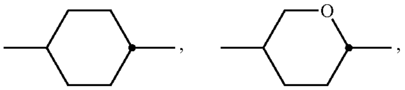

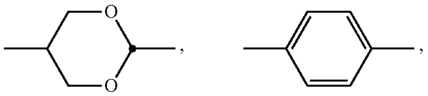

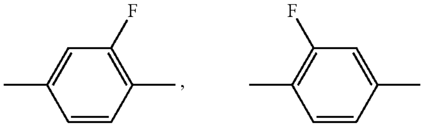

or

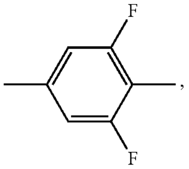

$L^{21}$, $L^{22}$, $L^{31}$ and $L^{32}$ identically or differently, denote H or F, preferably F, $Y^2$ and $Y^3$ identically or differently, denote H or $CH_3$, $X^2$ and $X^3$ identically or differently, denote halogen, halogenated alkyl or alkoxy with 1 to 3 C-atoms or halogenated alkenyl or alkenyloxy with 2 or 3 C-atoms, preferably F, Cl, $OCF_3$ or $CF_3$, most preferably F, $CF_3$ or $OCF_3$, $Z^3$ denotes —$CH_2CH_2$—, —$CF_2CF_2$—, —COO—, trans-—CH═CH—, trans-CF═CF—, —$CH_2O$—or a single bond, preferably —$CH_2CH_2$—, —COO—, trans-—CH═CH— or a single bond and most preferably —COO—, trans- —CH═CH— or a single bond, and l, m, n and o are, independently of each other, 0 or 1, preferably l+m is 2.

Preferably, the medium comprises one or more compounds of formula II, preferably selected from the group of compounds of formulae II-1 to II-3, very preferably from the group of compounds of formulae II-1 and II-3

II-1

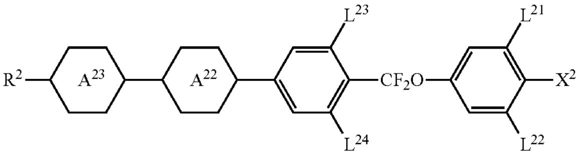

-continued

II-2

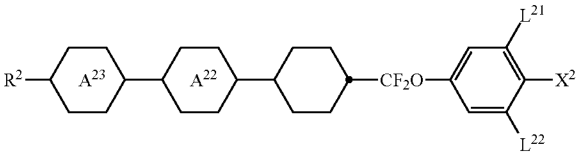

II-3

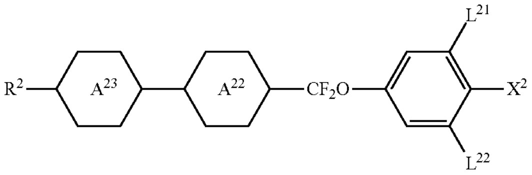

in which the occurring groups have the respective meanings given under formula II above and in formula II-1 the radicals $L^{23}$ and $L^{24}$ denote, independently of each other and of the other parameters, H or F and in formula II-2 preferably

and

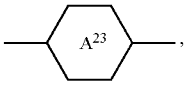

, independently of each other, denote

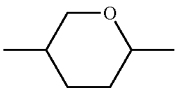

or

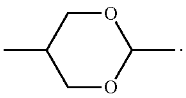

.

In formulae II-1, II-2 and II-3, $L^{21}$ and $L^{22}$ or $L^{23}$ and $L^{24}$ are preferably both F.

In another preferred embodiment in formulae II-1 and II-2, all of $L^{21}$, $L^{22}$, $L^{23}$ and $L^{24}$ denote F.

The compounds of formula II-1 are preferably selected from the group of compounds of formulae II-1a to II-1h, preferably from II-1a, I-1b, II-1g and II-1h II-1a

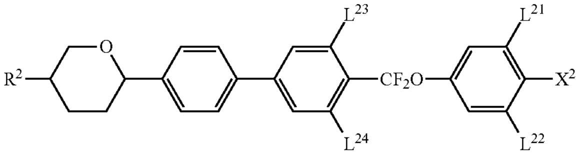

II-1b

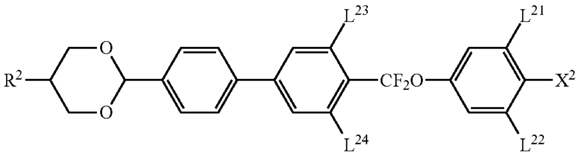

-continued

II-1c

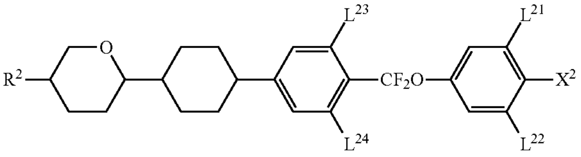

II-1d

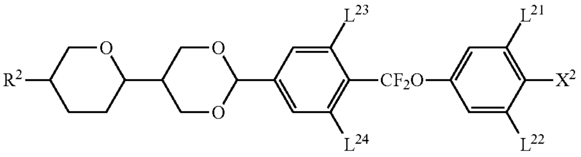

II-1e

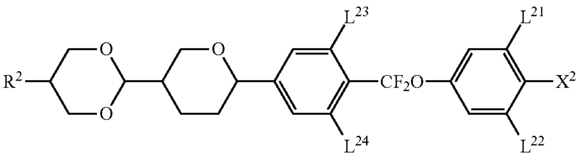

II-1f

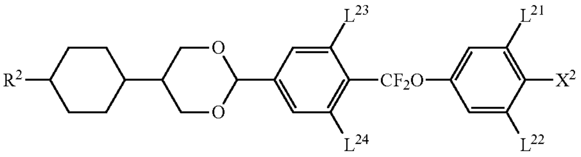

II-1g

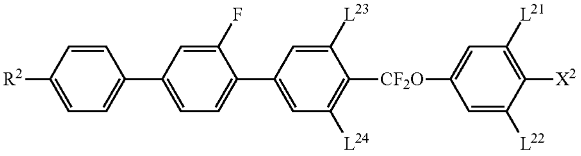

II-1h

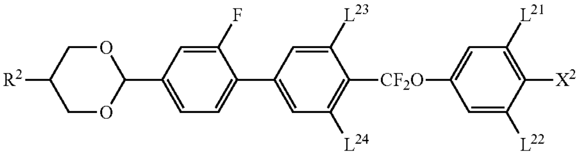

in which the occurring groups have the respective meanings given above.

In a preferred embodiment of the present invention the medium comprises one or more compounds selected from the group of compounds of the formulae II-1a to II-1h wherein $L^{21}$ and $L^{22}$, and/or $L^{23}$ and $L^{24}$ are both F, respectively.

In another preferred embodiment the medium comprises compounds selected from the group of compounds of formulae II-1a to II-1h, wherein $L^{21}$, $L^{22}$, $L^{23}$ and $L^{24}$ all are F.

Especially preferred compounds of formula II-1 are

II-1a-1

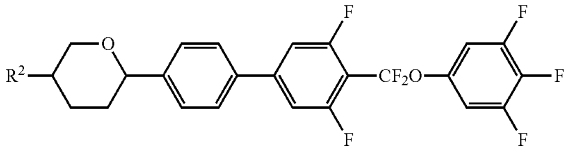

II-1g-1

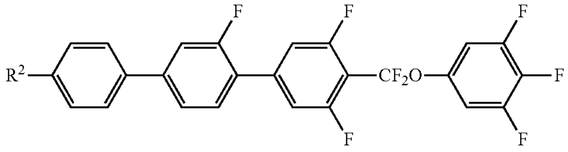

II-1h-1

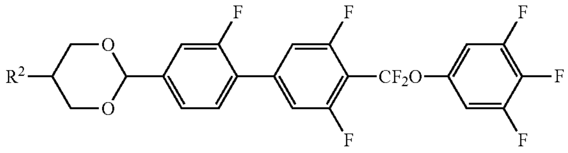

in which $R^2$ has the meaning given above.

Preferably the compounds of formula II-2 are selected from the group of compounds of formulae II-2a to II-2c II-2a

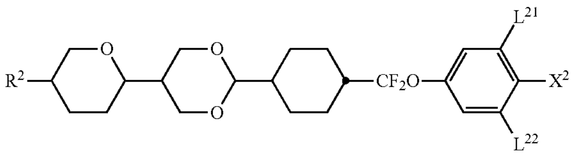

II-2b

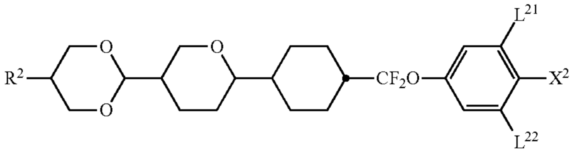

II-2c

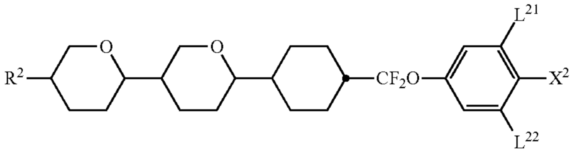

in which the occurring groups have the respective meanings given above and preferably $L^{21}$ and $L^{22}$ are both F.

Preferably the compounds of formula II-3 are selected from the group of compounds of formulae II-3a to II-3e, preferably from II-3d and II-3e II-3a

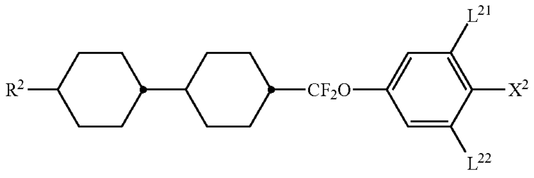

II-3b

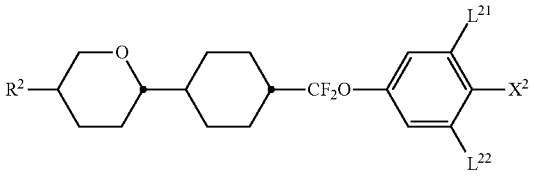

II-3c

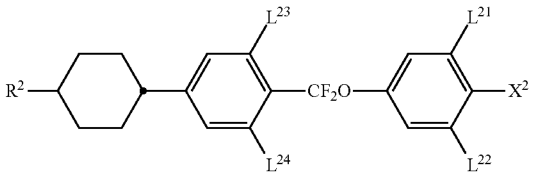

II-3d

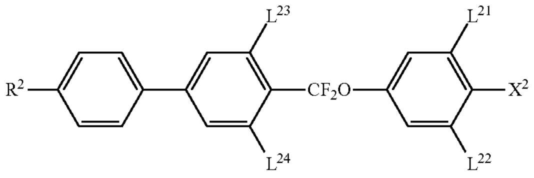

II-3e

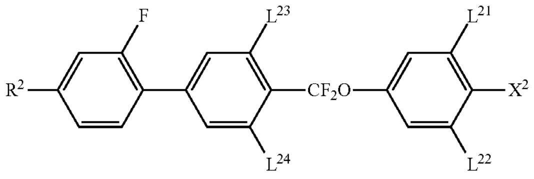

in which the occurring groups have the respective meanings given above and preferably $L^{21}$ and $L^{22}$ are both F, and $L^{23}$ and $L^{24}$ are both H or $L^{21}$, $L^{22}$, $L^{23}$ and $L^{24}$ are all F.

Especially preferred compounds of formula II-3 are

II-3a-1

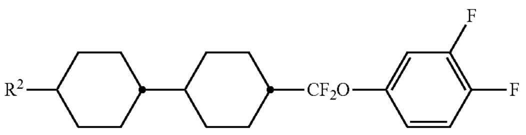

II-3a-2

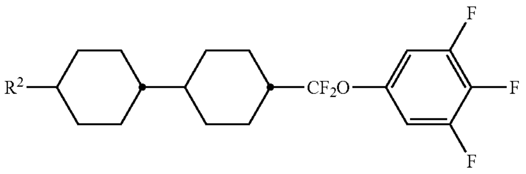

-continued

II-3b-1

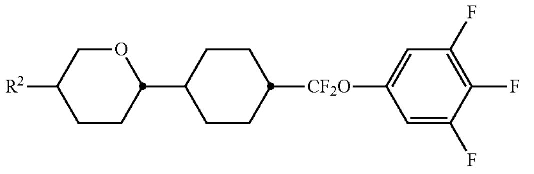

II-3d-1

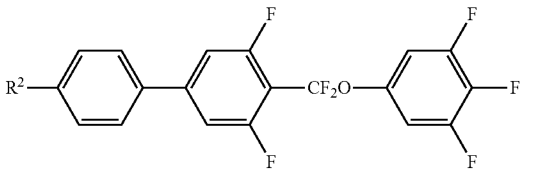

II-3e-1

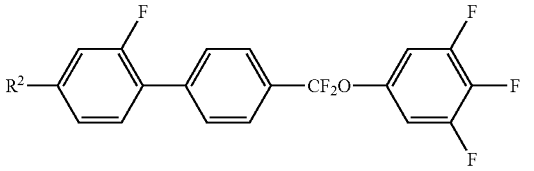

in which $R^2$ has the meaning given above.

Very preferred are the compounds of the formula II-3d-1.

In addition to the preferred compounds of formula II above the medium optionally comprises one or more compounds of formula II selected from the compounds of the formulae IIA1 to IIA7:

IIA1

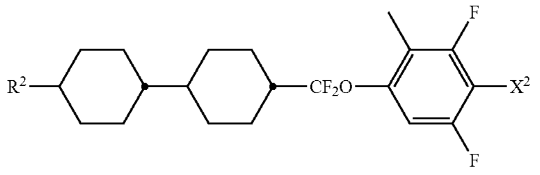

IIA2

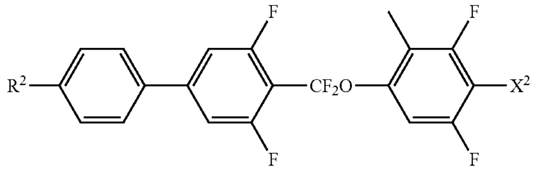

IIA3

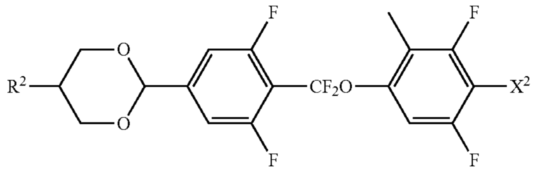

IIA4

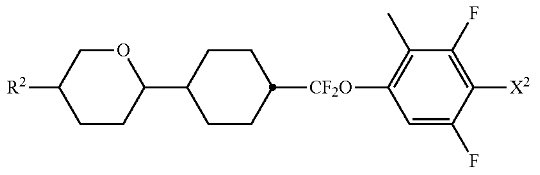

-continued

IIA5

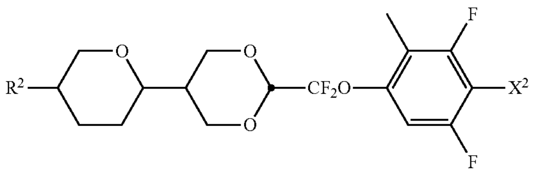

IIA6

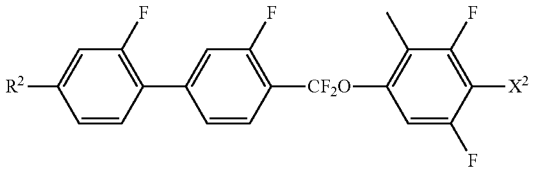

IIA7

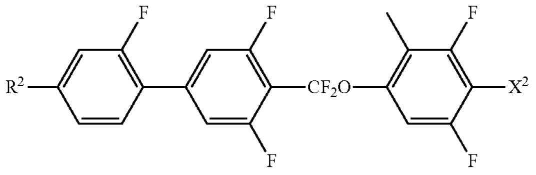

in which $R^2$ and $X^2$ have the meanings given in formula II or one of the preferred meanings given above and below.

Preferred compounds are those of formula IIA1, IIA2 and IIA3, very preferred those of formula IIA1 and IIA2.

In the compounds of formulae IIA1 to IIA7 $R^2$ preferably denotes alkyl having 1 to 6 C atoms, very preferably ethyl or n-propyl, and $X^2$ preferably denotes F or $OCF_3$, very preferably F.

In another preferred embodiment of the present invention the medium comprises one or more compounds of formula III preferably selected from the group of formulae III-1 and III-2, preferably of formula III-2:

III-1

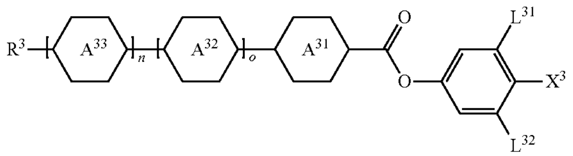

III-2

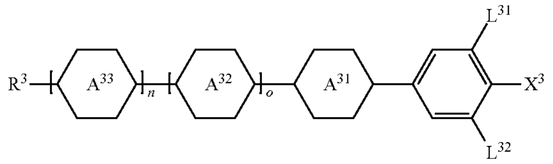

in which the occurring groups and parameters have the respective meanings given under formula III above.

Preferably the compounds of formula III-1 are selected from the group of compounds of formulae III-Ia and III-Ib III-1a

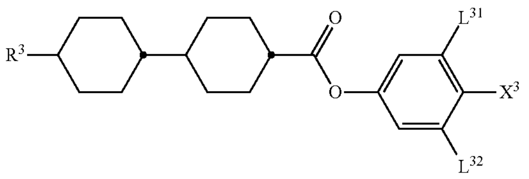

III-1b

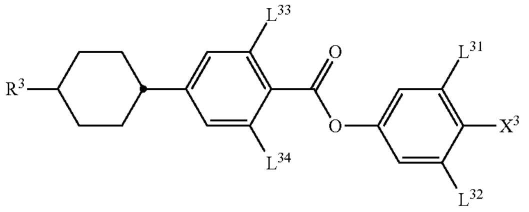

in which the occurring groups have the respective meanings given above and $L^{33}$ and $L^{34}$, independently of each other, denote H or F.

The compounds of formula III-1a are preferably selected from the group of compounds of formulae III-1a-1 to III-1a-6

III-1a-1

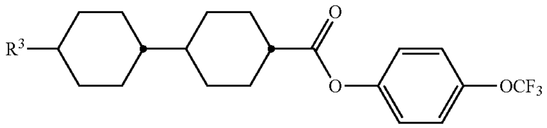

III-1a-2

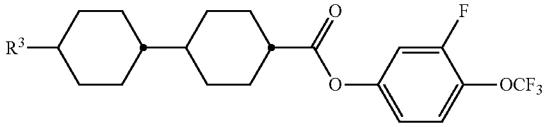

III-1a-3

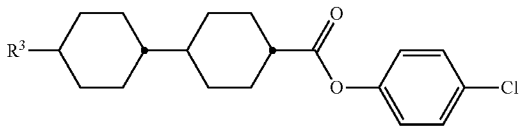

III-1a-4

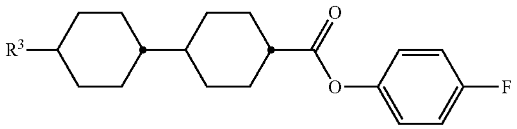

III-1a-5

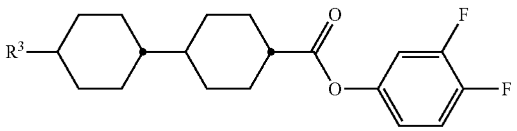

-continued

III-1a-6

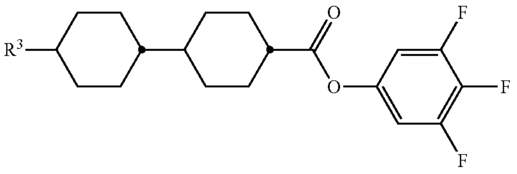

in which $R^3$ has the meaning given above.

Preferably the compounds of formula III-2 are selected from the group of compounds of formulae III-2a to III-2m III-2a

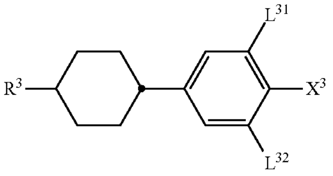

III-2b

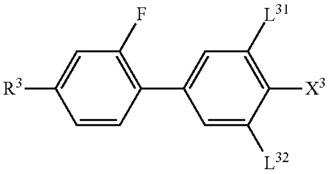

III-2c

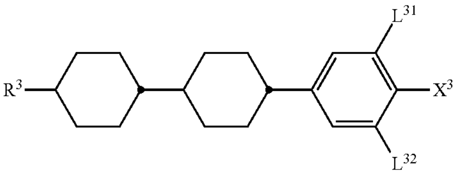

III-2d

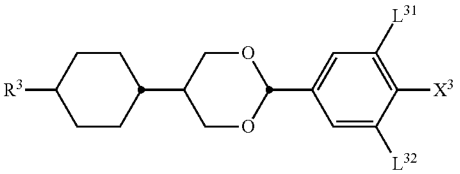

III-2e

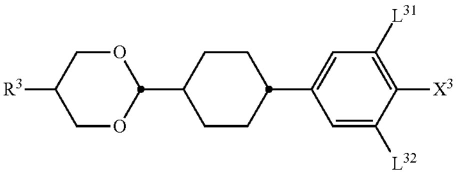

III-2f

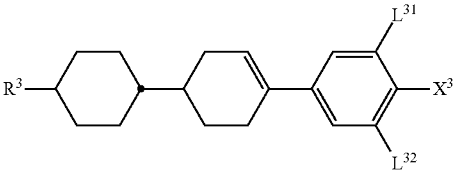

-continued

III-2g

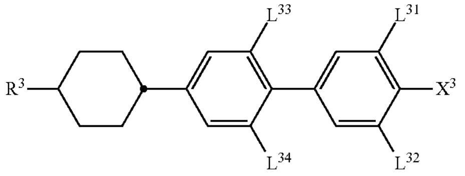

III-2h

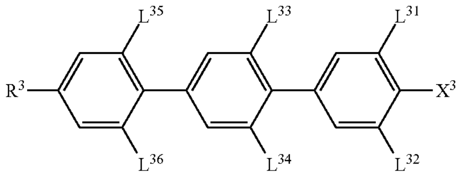

III-2i

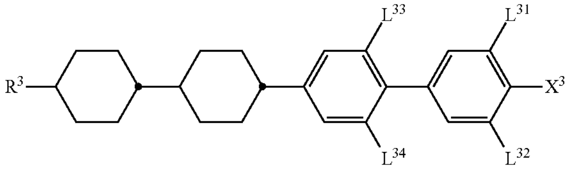

III-2j

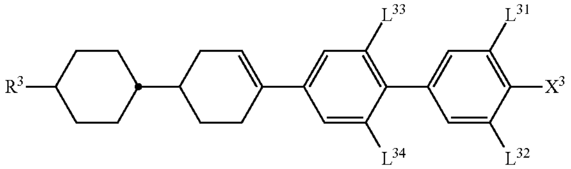

III-2k

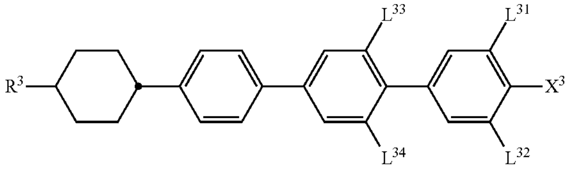

III-2l

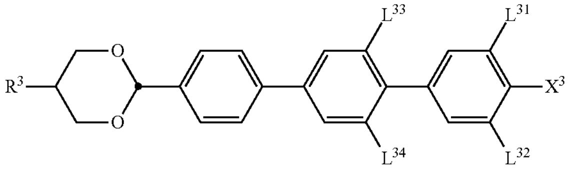

III-2m

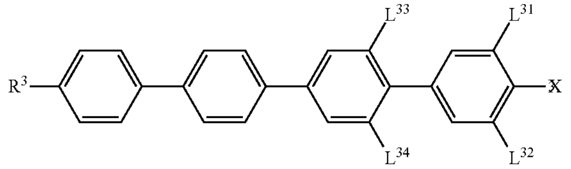

in which the occurring groups have the respective meanings given above and $L^{35}$ and $L^{36}$, independently of one another, denote H or F.

Preferably, the compounds of formula II-2a are selected from the group of compounds of formulae III-2a-1 to III-2a-4

III-2a-1

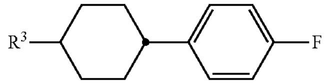

III-2a-2

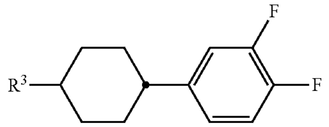

III-2a-3

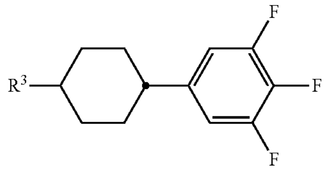

III-2a-4

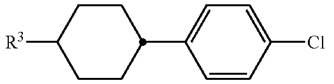

in which $R^3$ has the meaning given above.

The compounds of formula III-2b are preferably selected from the group of compounds of formulae III-2b-1 and III-2b-2, preferably III-2b-2

III-2b-1

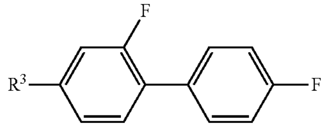

III-2b-2

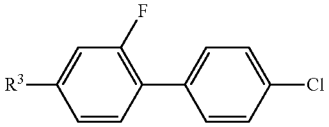

in which $R^3$ has the meaning given above.

The compounds of formula II-2c, are preferably selected from the group of compounds of formulae III-2c-1 to III-2c-5

III-2c-1

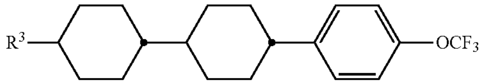

III-2c-2

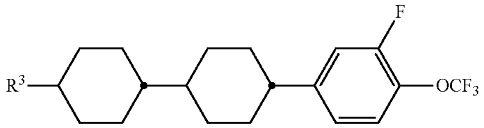

III-2c-3

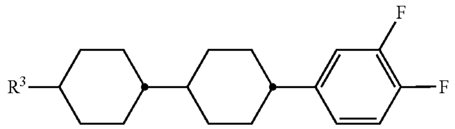

-continued

III-2c-4

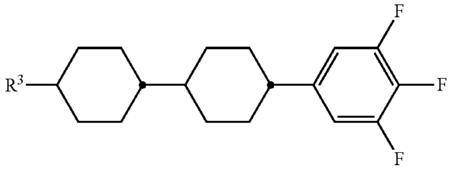

III-2c-5

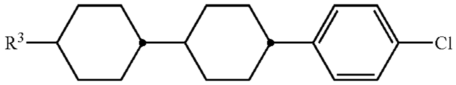

in which $R^3$ has the meaning given above.

The compounds of formulae III-2d and III-2e are preferably selected from the group of compounds of formulae III-2d-1, III-2d-2 and III-2e-1

III-2d-1

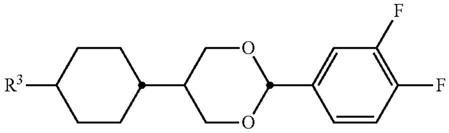

III-2d-2

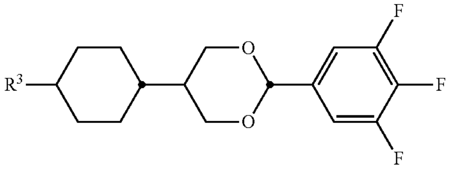

III-2e-1

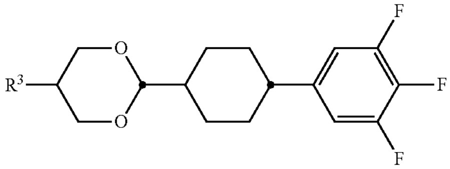

in which $R^3$ has the meaning given above.

The compounds of formula III-2f are preferably selected from the group of compounds of formulae III-2f-1 to III-2f-7

III-2f-1

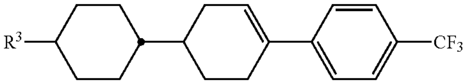

III-2f-2

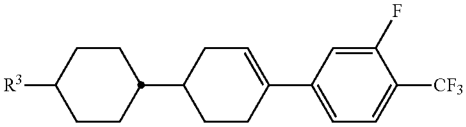

III-2f-3

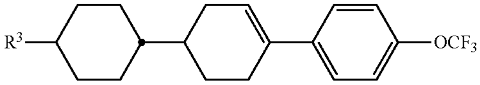

III-2f-4

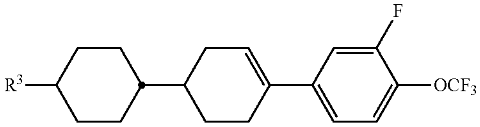

-continued

III-2f-5

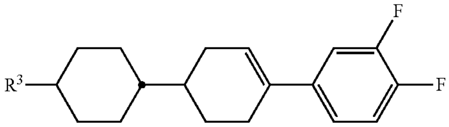

III-2f-6

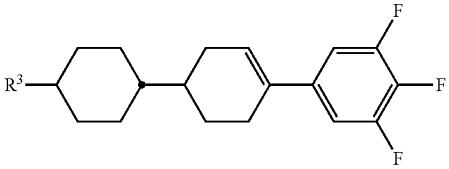

III-2f-7

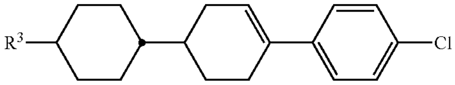

The compounds of formula III-2g are preferably selected from the group of compounds of formulae III-2g-1 to III-2g-7

III-2g-1

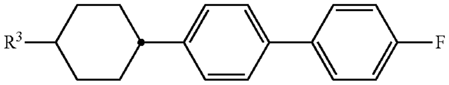

III-2g-2

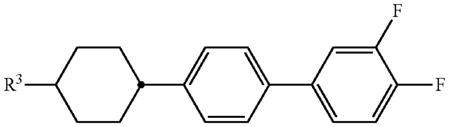

III-2g-3

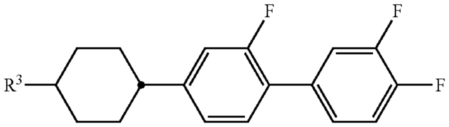

III-2g-4

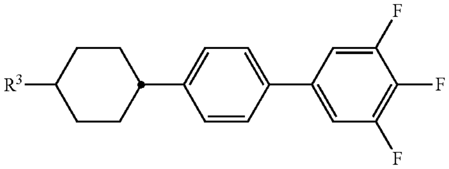

III-2g-5

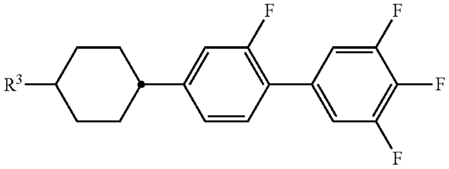

III-2g-6

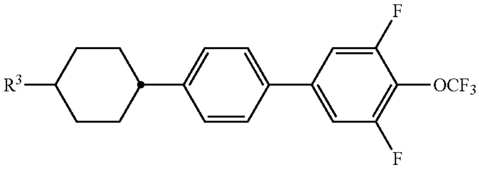

-continued

III-2g-7

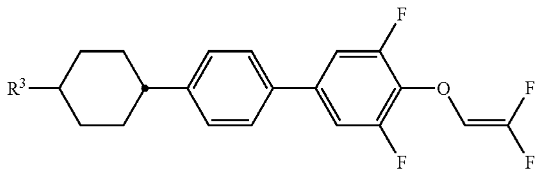

in which $R^3$ has the meaning given above.

The compounds of formula III-2h are preferably selected from the group of compounds of formulae III-2h-1 to III-2h-5

III-2h-1

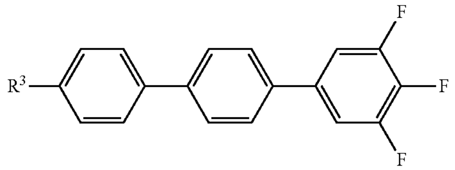

III-2h-2

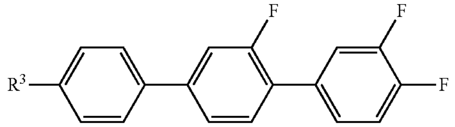

III-2h-3

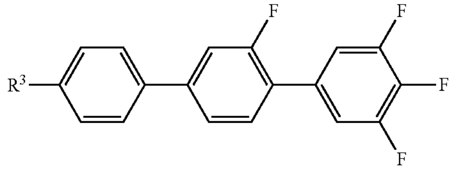

III-2h-4

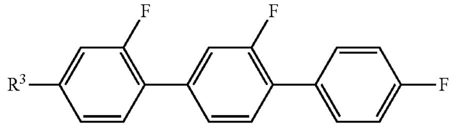

III-2h-5

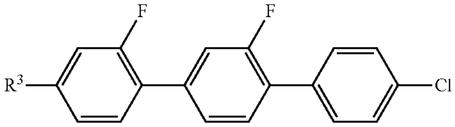

in which $R^3$ has the meaning given above.

The compounds of formula III-2i are preferably selected from the group of compounds of formulae III-2i-1 to III-2i-3

III-2i-1

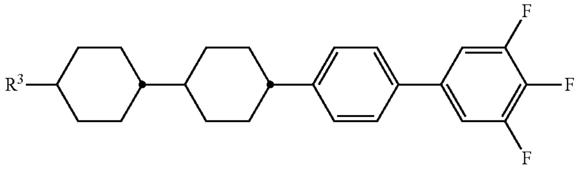

-continued

III-2i-2

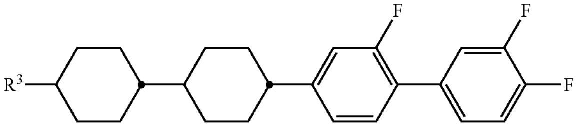

III-2i-3

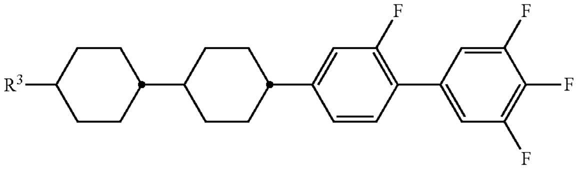

in which $R^3$ has the meaning given above.

The compounds of formula III-2j are preferably selected from the group of compounds III-2j-1

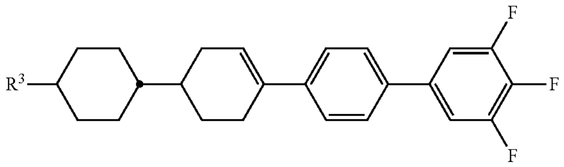

III-2j-2

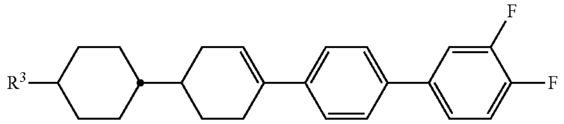

III-2j-3

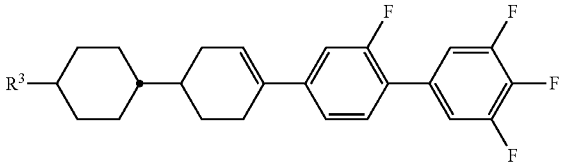

in which $R^3$ has the meaning given above.

The compounds of formula III-2k are preferably selected from the group of compounds of formulae III-2k-1 to III-2k-6

III-2k-1

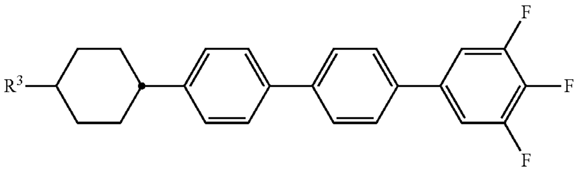

III-2k-2

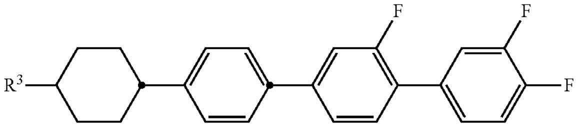

-continued

III-2k-3

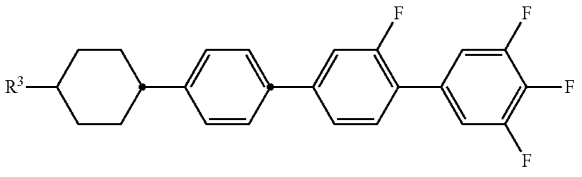

III-2k-4

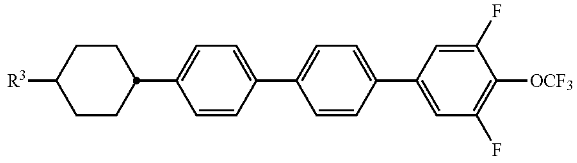

III-2k-5

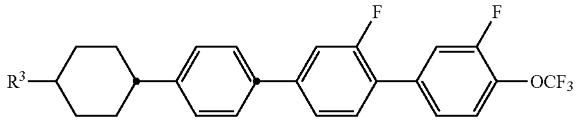

III-2k-6

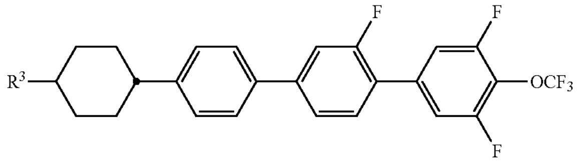

in which $R^3$ has the meaning given above.

The compounds of formula III-21 are preferably selected from the group of compounds of formulae III-21-1 to 111-21-6

III-21-1

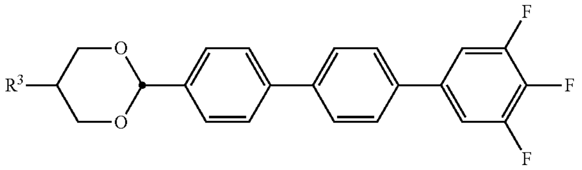

III-21-2

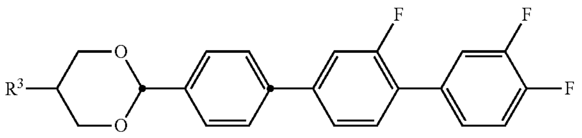

III-21-3

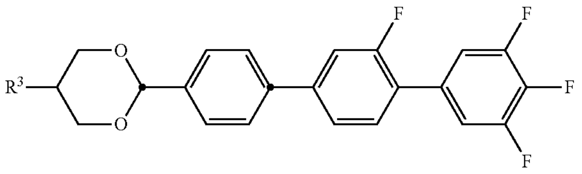

-continued

III-21-4

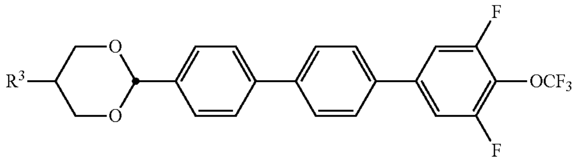

III-21-5

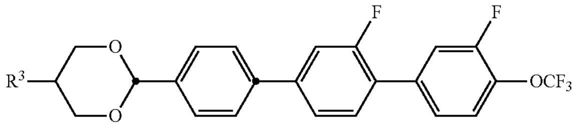

III-21-6

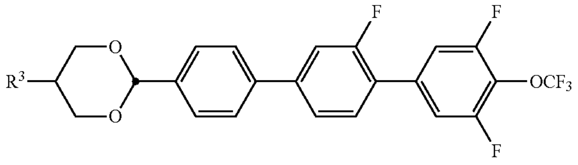

in which $R^3$ has the meaning given above.

The compounds of formula III-2m are preferably selected from the compounds of formula III-2m-1

III-2m-1

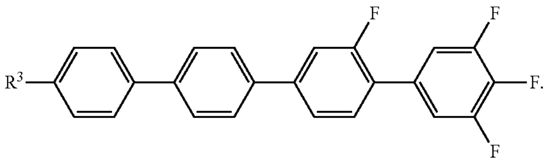

Alternatively, or in addition to the compounds of the formulae III-1 and/or 111-2 the media according to the present invention optionally comprise one or more compounds of formula III-3,

III-3

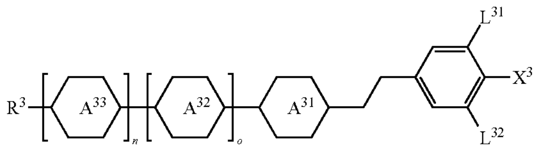

in which the groups and parameters have the respective meanings given under formula III above, preferably of formula III-3a III-3a

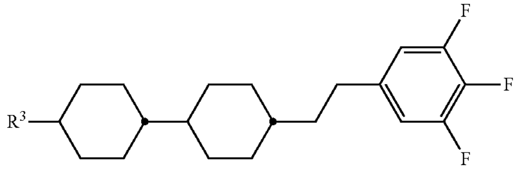

in which the $R^3$ has the meaning given above.

In addition to the preferred compounds of formula III above the medium optionally comprises one or more compounds selected from the group consisting of the formulae IIIA-1 to IIIA-21:
IIIA1
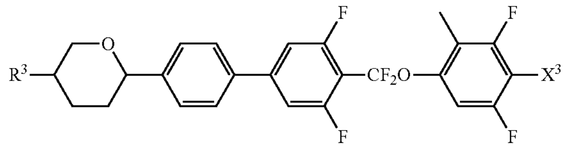
IIIA2
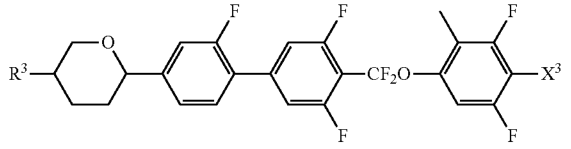
IIIA3
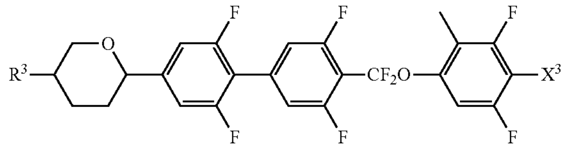
IIIA4
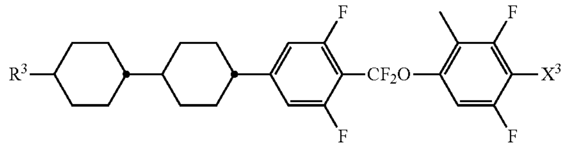
IIIA5
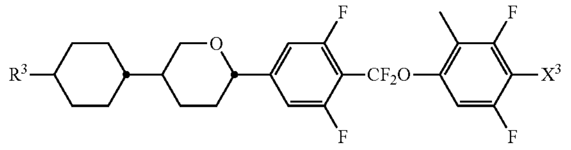
IIIA6
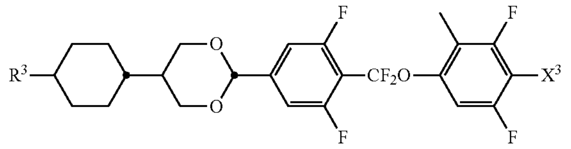
IIIA7
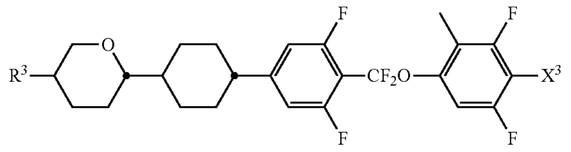
IIIA8
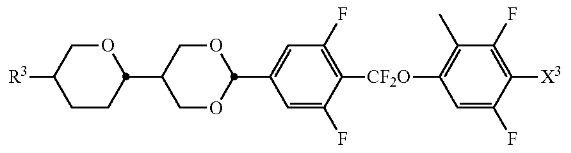
-continued
IIIA9
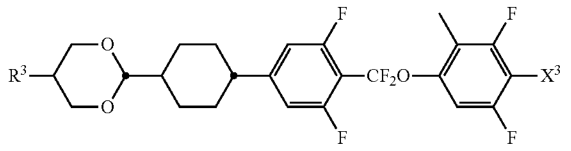
IIIA10
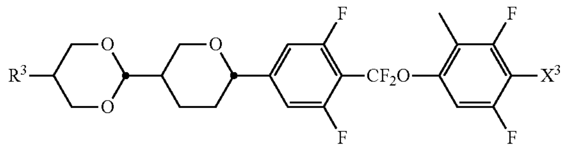
IIIA11
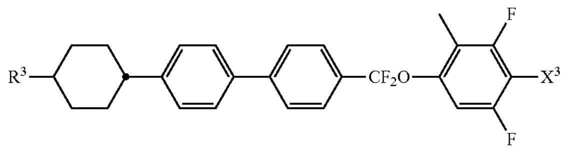
IIIA12
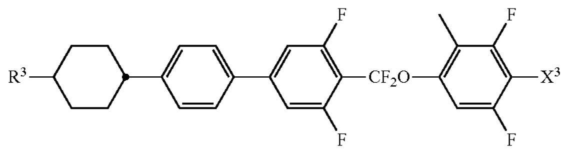
IIIA13
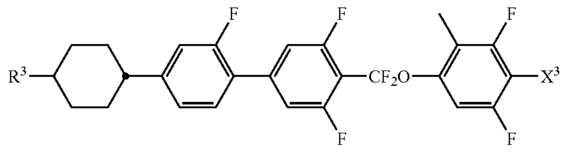
IIIA14
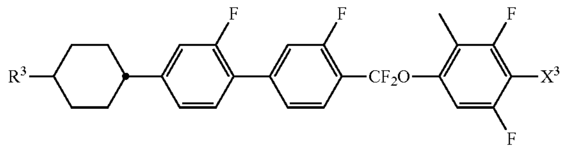
IIIA15
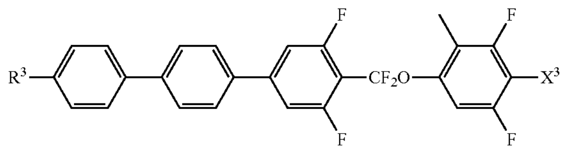
IIIA16
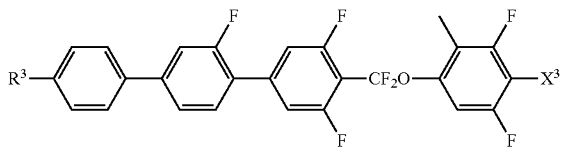
IIIA17
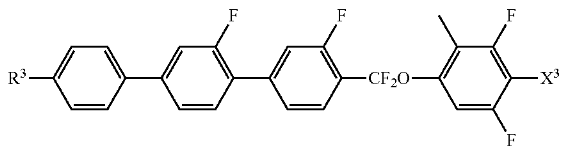

-continued

IIIA18

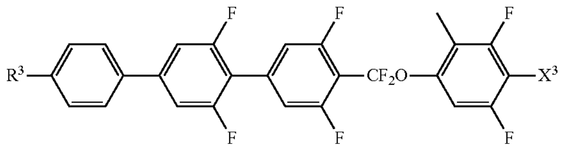

IIIA19

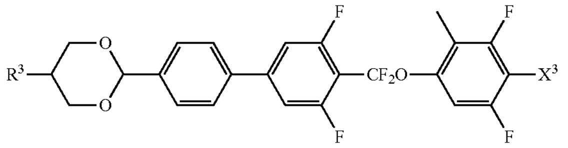

IIIA20

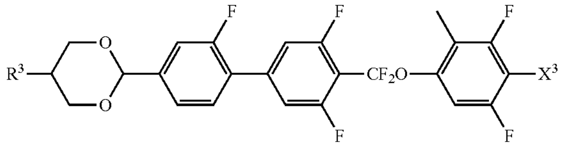

IIIA21

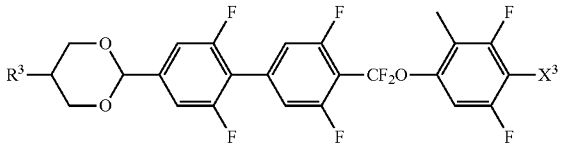

in which $R^3$ and $X^3$ have the meanings given in formula III or one of the preferred meanings given above and below. Preferred compounds are those of formula IIIA1, IIIA4, IIIA6, IIIA16, IIIA19 and IIIA20.

Preferably, the medium according to the invention comprises one or more compounds of the formula

IV

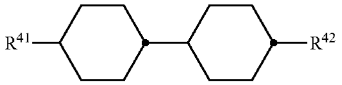

in which $R^{41}$ denotes a straight chain alkyl radical having 1 to 12 C atoms or a branched or cyclic alkyl radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, preferably a straight chain alkenyl radical having 2 to 12 C atoms, $R^{42}$ denotes a straight chain alkyl or alkoxy radical having 1 to 12 C atoms or a branched or cyclic alkyl or alkoxy radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, preferably a straight chain alkyl radical having 1 to 12 C atoms, very preferably having 1 to 7 C atoms.

The compounds of the formula IV are preferably selected from the group of the compounds of the formulae IV-1 to IV-4, very preferably of the formula IV-3

IV-1

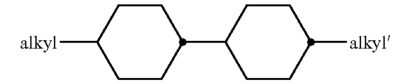

IV-2

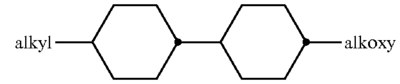

IV-3

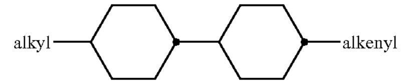

IV-4

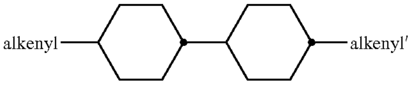

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, alkenyl denotes an alkenyl radical having 2 to 5 C atoms, preferably having 2 to 4 C atoms, particularly preferably 2 C atoms, and alkenyl' denotes an alkenyl radical having 2 to 5 C atoms, preferably having 2 to 4 C atoms, particularly preferably having 2 to 3 C atoms.

In a preferred embodiment, the medium according to the invention comprises one or more compounds of formula IV selected from the compounds of the formulae IV-1 to IV-4 in combination with one or more compounds selected from the group of compounds of the formulae IVA-1 to IVA-18:

IVA-1

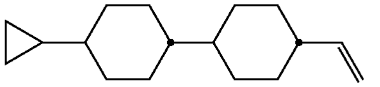

IVA-2

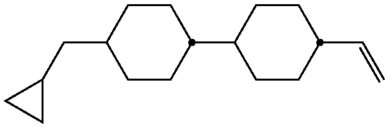

IVA-3

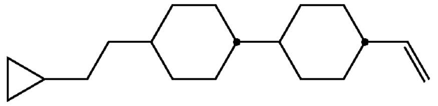

IVA-4

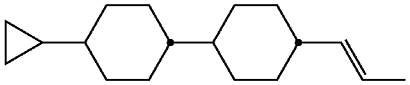

IVA-5

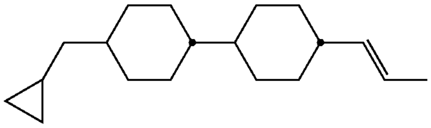

IVA-6

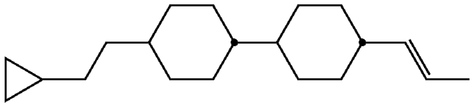

-continued

IVA-7

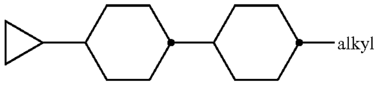

IVA-8

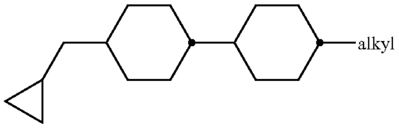

IVA-9

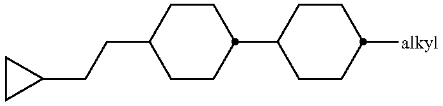

IVA-10

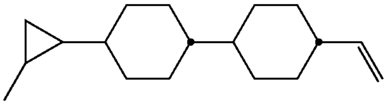

IVA-11

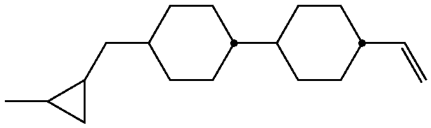

IVA-12

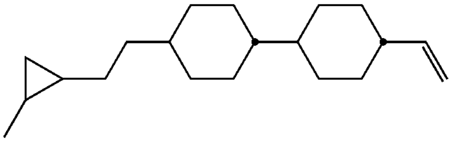

IVA-13

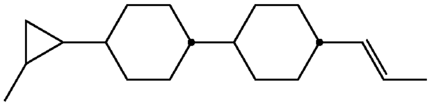

IVA-14

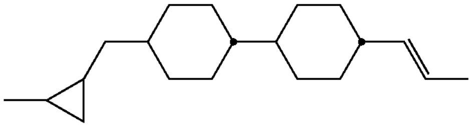

IVA-15

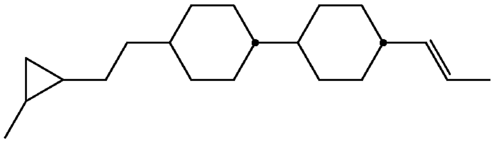

IVA-16

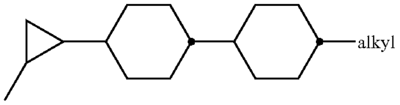

IVA-17

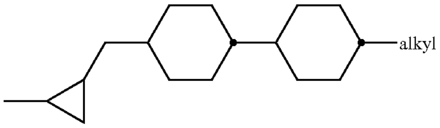

IVA-18

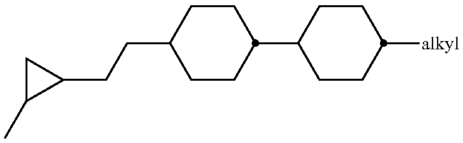

in which alkyl denotes methyl, ethyl, n-propyl, isopropyl, n-butyl, isobutyl, or n-pentyl.

Preferably, the medium comprises one or more compounds of formula IV-1, preferably selected from the compounds of the formulae IV-1-1 to IV-1-6

IV-1-1

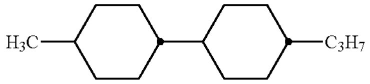

IV-1-2

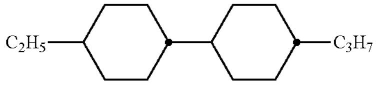

IV-1-3

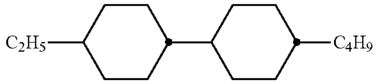

IV-1-4

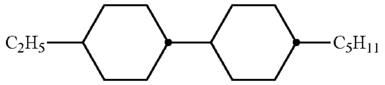

IV-1-5

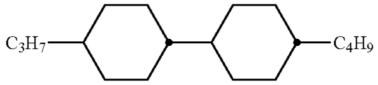

IV-1-6

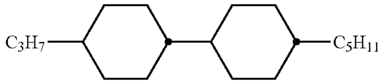

Preferably, the medium according to the invention comprises one or more compounds of the formulae IV-2-1 and/or IV-2-2

IV-2-1

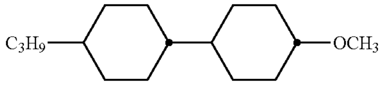

IV-2-2

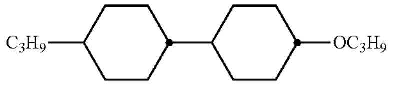

Preferably, the medium according to the invention comprises a compound of formula IV-3, very preferably selected from the compounds of the formulae IV-3-1 to IV-3-6, in particular the compound of formula IV-3-2 and/or IV-3-6:

IV-3-1

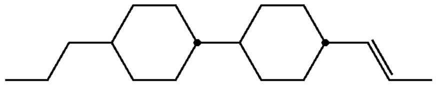

IV-3-2

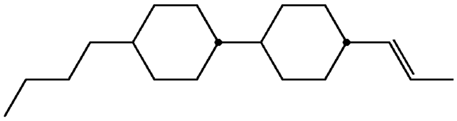

IV-3-3

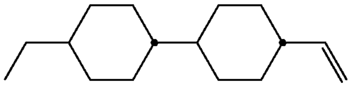

-continued

IV-3-4

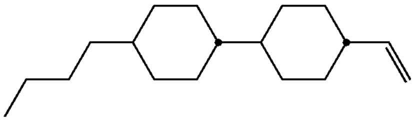

IV-3-5

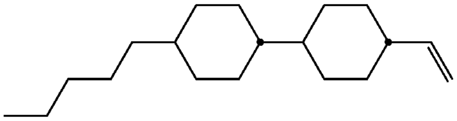

IV-3-6

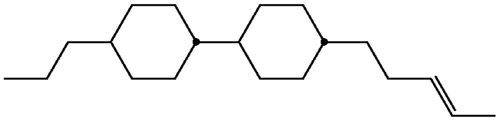

Preferably, the medium according to the invention comprises a compound of formula IV-4, in particular selected from the compounds of the formulae IV-4-1 and IV-4-2:

IV-4-1

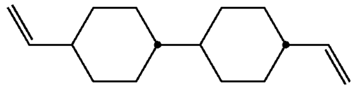

IV-4-2

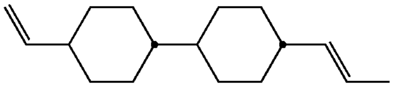

Preferably, the medium according to the invention comprises one or more compounds of the formula IVa and/or IVb, IVa

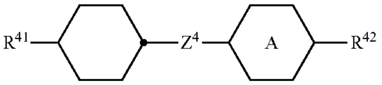

IVb

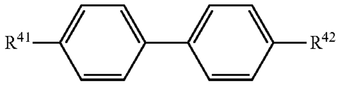

in which $R^{41}$ and $R^{42}$ independently of one another, have the meanings defined above for formula IV, and

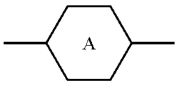 denotes 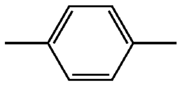 ,

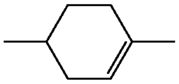 , 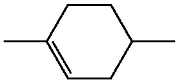 ,

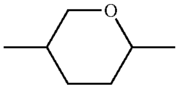 or 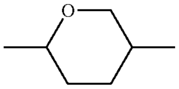 , $Z^4$ denotes a single bond, $-CH_2CH_2-$, $-CH{=}CH-$, $-CF_2O-$, $-OCF_2-$, $-CH_2O-$, $-OCH_2-$, $-COO-$, $-OCO-$, $-C_2F_4-$, $-C_4H_8-$, or $-CF{=}CF-$.

Preferred compounds of the formula IVa are selected from the compounds of the formulae IVa-1 to IVa-4:

IVa-1

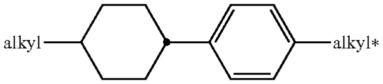

IVa-2

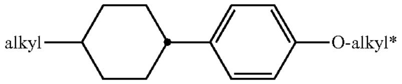

IVa-3

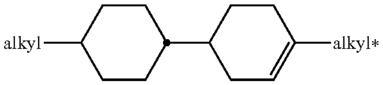

IVa-4

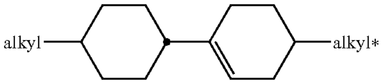

in which alkyl and alkyl* each, independently of one another, denote a straight-chain alkyl radical having 1 to 6 C atoms.

The medium according to the invention preferably comprises at least one compound of the formula IVa-2.

Preferred compounds of the formula IVb are selected from the compounds of the formulae IVb-1 to IVb-3:

IVb-1

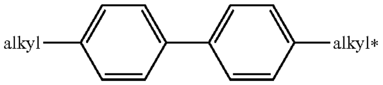

IVb-2

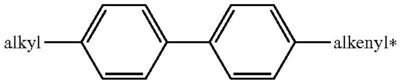

IVb-3

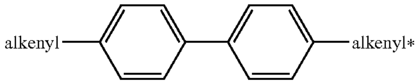

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Of the compounds of the formulae IVb-1 to IVb-3, the compounds of the formula IVb-2 are particularly preferred.

Particularly preferred compounds of the formulae IVb are selected from the following compounds:

IVb-1-1

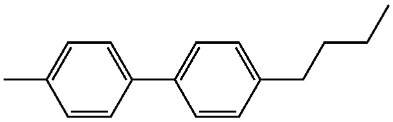

-continued

IVb-2-1

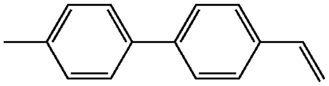

IVb-2-2

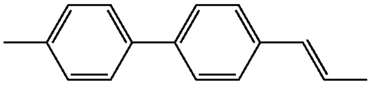

IVb-2-3

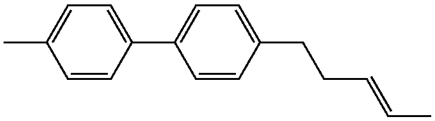

The medium according to the invention particularly preferably comprises the compound IVb-2-3.

Preferably, the medium according to the invention comprises one or more compounds of the formula V

V

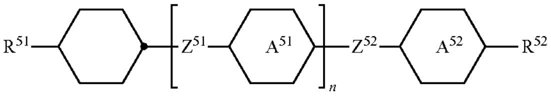

in which $R^{51}$, $R^{52}$ denote alkyl having 1 to 7 C atoms, alkoxy having 1 to 7 C atoms, or alkoxyalkyl, alkenyl or alkenyloxy having 2 to 7 C atoms,

 ,  , identically or differently, denote

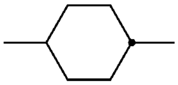 , 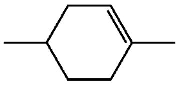 ,

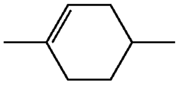 , 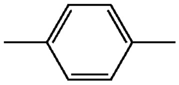 ,

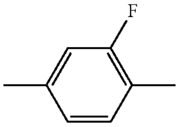 or 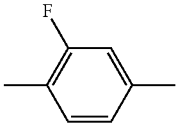

$Z^{51}$, $Z^{52}$ each, independently of one another, denote —$CH_2$—$CH_2$—, —$CH_2$—O—, —CH═CH—, —C≡C—, —COO— or a single bond, and n is 1 or 2.

The compounds of formula V are preferably selected from the compounds of the formulae V-1 to V-17:

V-1

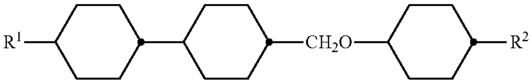

V-2

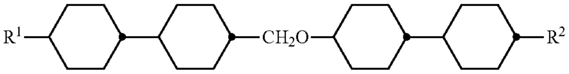

V-3

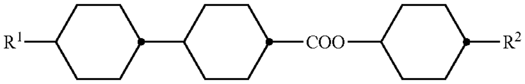

V-4

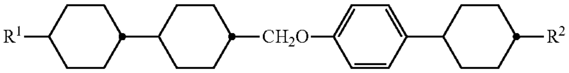

V-5

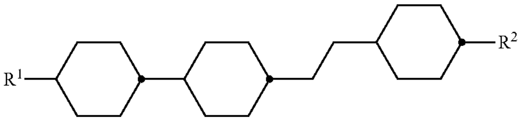

V-6

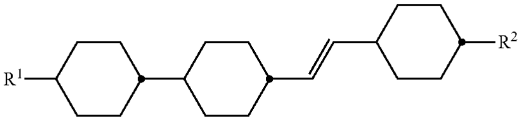

V-7

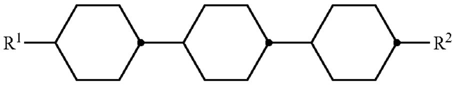

V-8

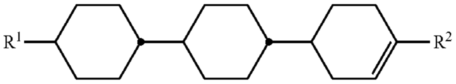

V-9

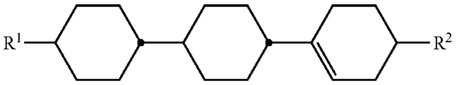

V-10

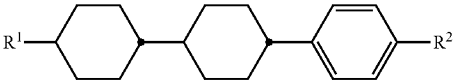

V-11

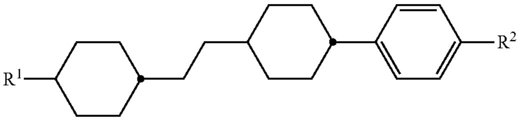

V-12

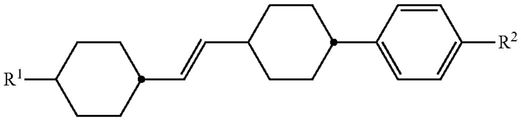

V-13

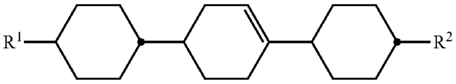

-continued

V-14

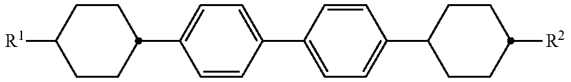

V-15

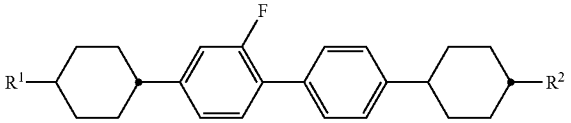

V-16

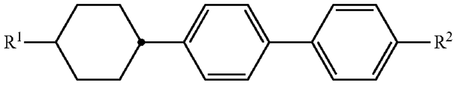

V-17

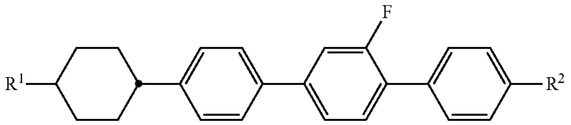

in which $R^1$ and $R^2$ have the meanings indicated above for formula V.

$R^1$ and $R^2$ preferably each, independently of one another, denote straight-chain alkyl having 1 to 7 C atoms or alkenyl having 2 to 7 C atoms.

Preferred media comprise one or more compounds of the formulae V-10, V-11, V-12, V-14, V-15, V-16 and/or V-17. Very preferably, the medium comprises one or more compounds of the formulae V-10, V-16 and/or V-17, in particular V-10 and V-17.

In a preferred embodiment of the present invention the medium additionally comprises one or more compounds of the formulae VI-1 to VI-9

VI-1

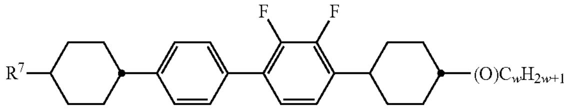

VI-2

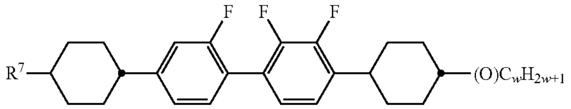

VI-3

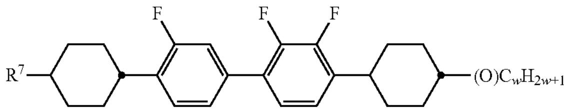

VI-4

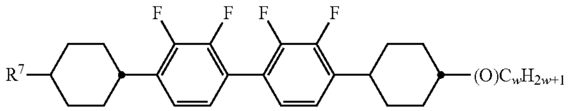

VI-5

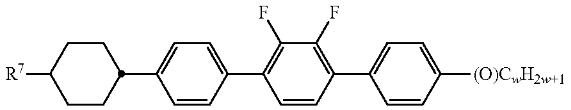

-continued

VI-6

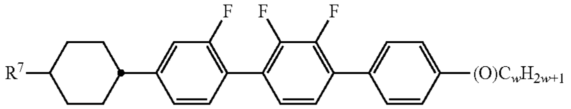

VI-7

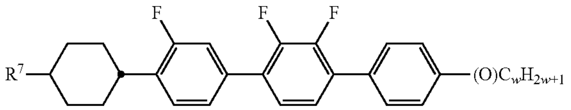

VI-8

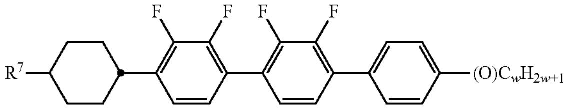

VI-9

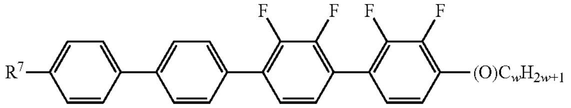

in which $R^7$ each, independently of one another, have one of the meanings indicated for $R^{2A}$ in Claim 5, and w and x each, independently of one another, denote 1 to 6.

Particular preference is given to mixtures comprising at least one compound of the formula V-9.

In a preferred embodiment of the present invention the medium additionally comprises one or more compounds of the formulae VII-1 to VII-21,

VII-1

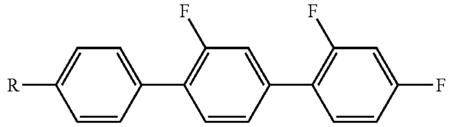

VII-2

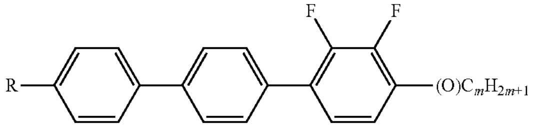

VII-3

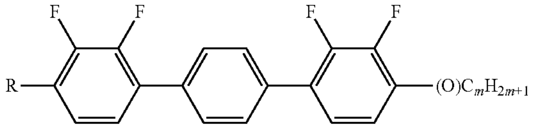

VII-4

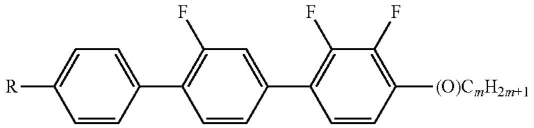

-continued

VII-5

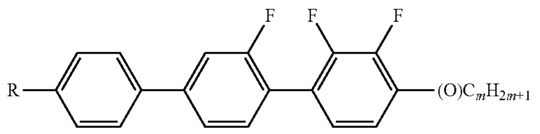

VII-6

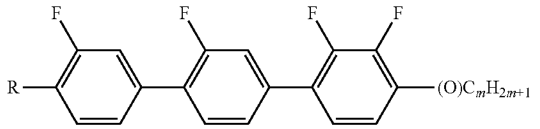

VII-7

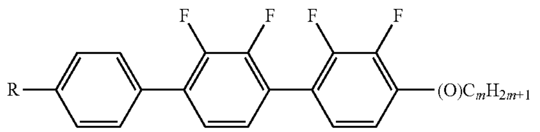

VII-8

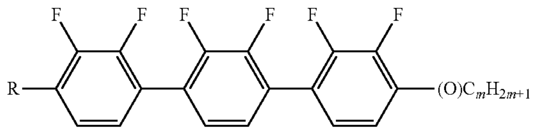

VII-9

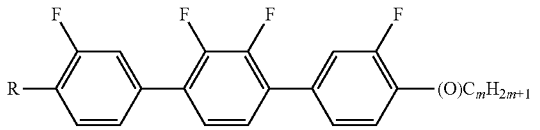

VII-10

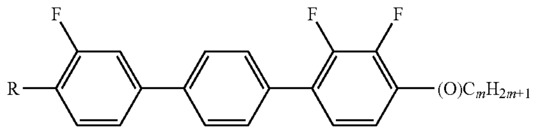

VII-11

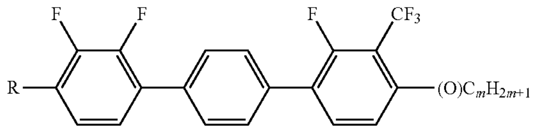

VII-12

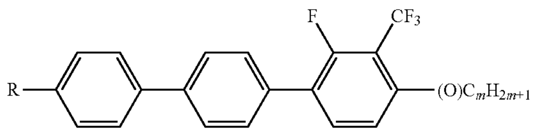

VII-13

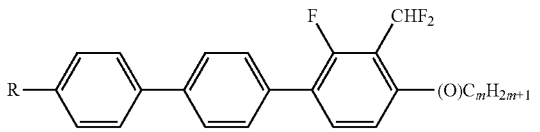

VII-14

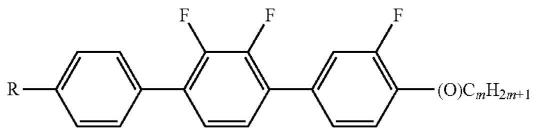

-continued

VII-15

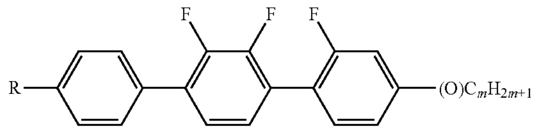

VII-16

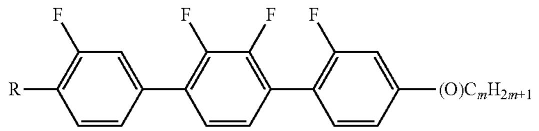

VII-17

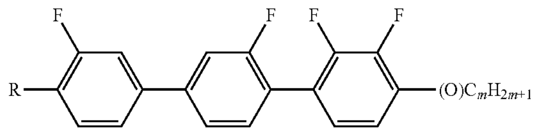

VII-18

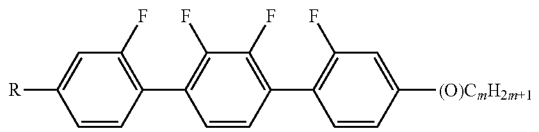

VII-19

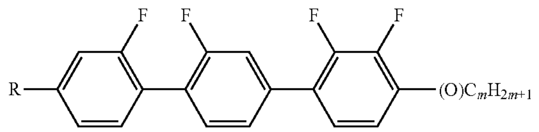

VII-20

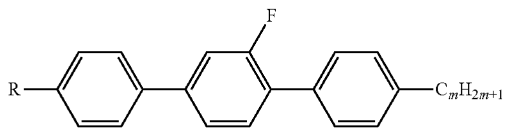

VII-21

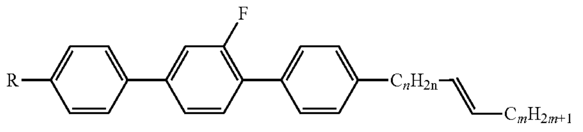

in which

R denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4, and R preferably denotes methyl, ethyl, propyl, butyl, pentyl, hexyl, methoxy, ethoxy, propoxy, butoxy, pentoxy.

Particular preference is given to compounds of the formulae VII-1, VII-2, VII-4, VII-20 and VII-21. In these compounds, R preferably denotes alkyl, furthermore alkoxy, each having 1 to 5 C atoms. In the compounds of the formula VII-20, R preferably denotes alkyl or alkenyl, in particular alkyl. In the compound of the formula VII-21, R preferably denotes alkyl.

In an embodiment of the present invention the liquid-crystal medium has a clearing point of 70° C. or more, more preferably 75° C. or more, still more preferably 80° C. or more or 85° C. or more, very preferably 90° C. or more, particularly preferably 100° C. or more.

In an embodiment, the medium comprises one or more compounds of the formula I in a total concentration in the range of from 10% to 60%, preferably from 15% to 55% more preferably from 30% to 40%, and one or more compounds of formula T in a total concentration in the range of from 5% to 25%, preferably from 8% to 15%, more preferably from 10% to 20%, and one or more compounds of formula S1 in a total concentration of from more than 0% to 3%, preferably from 0.1% to 2%, more preferably from 0.15% to 1.5% and in particular from 0.2% to 1%, and preferably one or more compounds of formula II and/or III, more preferably of formula II, where the total concentration of the compounds of the formula II and/or III is in the range of from 15% to 45%, preferably from 20% to 40%, more preferably from 25% to 35%; the compounds of the formula II are preferably selected from the formulae II-1a and II-1g and II-3d; the medium very preferably comprises one or more compounds of the formula II-1a and/or II-1g in a total concentration of from 10% to 20% in particular from 12% to 17% and one or more compounds of the formula II-3d in a total concentration of from 10% to 20%, in particular from 12% to 17%;

and/or preferably one or more compounds of formula IV, more preferably of formula IV-3, where the total concentration of the compounds of the formula IV is in the range of from 5 to 25%, preferably from 7% to 20%, very preferably from 12% to 17%; or one or more compounds of formula IV and IVa, preferably IV-3 and IVa-2, where the total concentration of the compounds of the formula IV is in the range of from 2 to 20%, preferably from 5% to 15%, very preferably from 8% to 12% and the total concentration of the compounds of the formula IVa is in the range of from 5 to 25%, preferably from 7% to 20%, very preferably from 12% to 17% and where the total concentration of the compounds of the formulae IV and IVa preferably is in the range of from 10 to 40%, more preferably from 15% to 35%, very preferably from 20% to 30%.

In a preferred embodiment the liquid-crystal medium according to the invention has a positive dielectric anisotropy Δε in the range of from 6.0 to 20.0, preferably from 8.0 to 17.0, in particular from 10 to 13.

In a preferred embodiment, the birefringence (Δn) of the liquid-crystal media according to the present invention at 589 nm ($Na^D$) and 20° C. is in the range of from 0.180 to 0.400, preferably from 0.190 to 0.310, more preferably from 0.200 to 0.300, very preferably form 0.210 to 0.260.

In another embodiment, the medium comprises one or more compounds of the formula I in a concentration in the range of from 15% to 65%, preferably from 20% to 60% and more preferably from 35% to 45%, and one or more compounds of formula T in a total concentration in the range of from 2% to 30%, preferably from 5% to 25%, more preferably from 7% to 18%, very preferably from 8% to 13%, and one or more compounds of formula S1 in a total concentration of from above 0% to 3%, preferably from 0.1% to 2%, more preferably from 0.15% to 1.5% and in particular from 0.2% to 1%, and preferably one or more compounds of formula II and/or III, more preferably of formula II, where the total concentration of the compounds of the formula II and/or III is in the range of from 5% to 30%, preferably from 8% to 20%, more preferably from 10% to 16%; the compounds of the formula II are preferably selected from the formulae II-1a and II-1g and II-3d; the medium very preferably comprises one or more compounds of the formula II-1a and/or II-1g in a total concentration of from 2% to 15% in particular from 8% to 10% and one or more compounds of the formula II-3d in a total concentration of from 1% to 10%, in particular from 2% to 7%;

and/or preferably one or more compounds of formula IV, preferably of formula IV-3, where the total concentration of the compounds of the formula IV is in the range of from 3 to 20%, preferably from 5% to 15%, very preferably from 7% to 12%:

and/or preferably one or more compounds of the formula V in a total concentration in the range of from 5% to 30%, more preferably from 8% to 25%, very preferably from 12% to 18%, preferably selected from the compounds of the formulae V-10 and V-17, where the total concentration of the compounds of the formula V-10 is in the range of from 2% to 20%, more preferably from 4% to 13%, very preferably from 5% to 10%, and where the total concentration of the compounds of the formula V-17 is in the range of from 2% to 20%, more preferably from 4% to 13%, very preferably from 5% to 10%, In a preferred embodiment the liquid-crystal medium according to the invention has a positive dielectric anisotropy Δε in the range of from 2.0 to 6.0, preferably from 3.0 to 5.0, in particular from 3.5 to 4.5.

In a preferred embodiment of the present invention the liquid-crystal media have a clearing point of 120° C. or more, preferably 130° C. or more, particularly preferably 140° C. or more and very particularly preferably 150° C. or more.

The nematic phase of the media according to the invention preferably extends at least from 0° C. or less to 90° C. or more. It is advantageous for the media according to the invention to exhibit even broader nematic phase ranges, preferably at least from −10° C. or less to 120° C. or more, very preferably at least from −20° C. or less to 140° C. or more and in particular at least from −30° C. or less to 150° C. or more, very particularly preferably at least from −40° C. or less to 170° C. or more.

The tunability τ of the medium according to the invention, measured at 20° C. and 19 GHz is 0.200 or more, preferably 0.210 or more.

The material quality (η) of the preferred liquid-crystal materials is 6 or more, preferably 8 or more, very preferably 10 or more, in particular 15 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

An electronic component is provided comprising a first substrate and a second substrate facing each other, where the liquid crystal medium according to the invention is sandwiched between said first and second substrates. An electrode provided on each substrate, or two electrodes provided on only one of the substrates for supplying an electric potential across the liquid crystal material to drive liquid crystals in a predetermined configuration.

In an embodiment, the electronic component is operable in the microwave range of the electromagnetic spectrum. Here, the liquid crystal medium in the component functions as a tunable dielectric and can be used in high-frequency technology.

Preferred components are a liquid-crystal based antenna element, a phase shifter, a tunable filter, a tunable metamaterial structure, a matching network or a varactor.

A microwave antenna array is provided comprising one or more of said components.

In another embodiment, the electronic component is an optical component operable in the visible or infrared range of the electromagnetic spectrum, preferably a transmissive SLM.

In another preferred embodiment, the optical component is a reflective SLM.

In the optical device component according to the invention the light-modulating elements (i.e., the pixels) of the spatial light modulator are cells containing liquid crystal as set forth in claim 1. That is, the spatial light modulator is a liquid crystal device in which the optically-active component is a liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels.

An LCOS device provides a dense array of light modulating elements, or pixels, within a small aperture (e.g., a few centimeters in width). The pixels are typically approximately 10 microns or less which results in a diffraction angle of a few degrees meaning that the optical system can be compact. An LCOS device is typically reflective which means that the circuitry which drives the pixels of a LCOS SLM can be buried under the reflective surface. This results in a higher aperture ratio. In other words, the pixels are closely packed meaning there is very little dead space between the pixels. This is advantageous because it reduces the optical noise in the replay field. An LCOS SLM uses a silicon backplane which has the advantage that the pixels are optically flat. This is particularly important for a phase modulating device.

Hence, in a preferred embodiment and referring to FIG. 1 there is provided a reflective spatial light modulator, in particular an LCoS device 100 including the liquid crystal material 140 as defined above, sandwiched between a transparent glass layer 110 having a transparent electrode 120, a mirror 150 mounted on a silicon CMOS backplane 160 and PCB mounting (not shown). The mirror is divided into a two-dimensional array of individually addressable pixels. Each pixel is individually drivable by a voltage signal to provide a local phase change to at least one polarization component of an optical signal, thereby providing a two-dimensional array of phase manipulating regions. Pre-alignment of the liquid crystal 140 is provided by alignment layers 131 and 132.

Said LCOS device is useful for the integration into optical devices. The described LCOS SLM outputs spatially modulated light in reflection. Reflective LCOS SLMs have the advantage that the signal lines, gate lines and transistors are below the mirrored surface, which results in high fill factors (typically greater than 90 percent) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Examples of devices comprising the optical component according to the invention are holographic projectors, head-up displays comprising at least one holographic projection channel, a driver monitoring system for a head-up display, more preferably an infrared holographic projector for a driver monitoring system of a head-up display, an augmented reality head-up display, "AR-HUD", including eye-tracking or head-tracking, a picture generating unit and integrated infrared holographic illuminator for head-tracking or eye-tracking.

A spatial light modulator may be used to display a diffractive pattern including a computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

Other preferred devices are infrared imagers, wavelength selective switches, LCoS-SLM, LIDAR systems, wavelength-division multiplexing (WDM) systems, reconfigurable optical add-drop multiplexer (ROADM), and nonmechanical beam steering, e.g., steerable Electro Evanescent Optical Refraction (SEEOR) prism as published in the article P. McManamon, 2006, "Agile Nonmechanical Beam Steering," Opt. Photon. News 17(3): 24-29.

The technology incorporates an SLM device and a red-green-blue (RGB) light source. The red-green-blue (RGB) light source is configured to emit red color, green color, and blue color light at the same time or at different times (e.g., time multiplexed RGB LEDs or laser diodes). As one example, the light source is an RGB light source using arrays of red, green and blue micro-LEDs as proposed in for example EP3539157 A1.

RGB refers to the three primary colors of light, red, green and blue, out of which the other colors and white may be formed. A conventional single LED may only send single-color (monochromatic) light, which may be one of these three primary colors. To create more colors, three LEDs may be used together for an RGB mix. An RGB LED is in principle three single-color LEDs placed close to one another, often in the same package, and which are red, green and blue in color. When all the LEDs of an RGB-LED emit at proportionately the same luminous intensity, and the right kind optics is used, the light emitted from an RGB-LED appears white to the human eye.

The use of an RGB light source avoids exposure of the liquid crystal to UV light which can be unavoidable when conventional light sources are used, such as for example cold-cathode fluorescent lamps.

According to another aspect of the present invention there is thus provided an optical device comprising an RGB light source, and the optical component described above, where the phase of an incident optical signal from said RGB light source is modulated by the component when the optical device is in operation.

According to another aspect of the present invention there is provided a method of spatially modulating visible or infrared light, the method comprising, i) providing an optical component comprising first and second substrates facing each other and each having a surface, the first substrate comprising at least one first electrode, the second substrate comprising at least one second electrode, the component further comprising a liquid crystal layer sandwiched between the first and second substrates wherein the liquid crystal comprises one or more compounds selected from the compounds of formulae I, T and S1 described above;

ii) receiving incident visible or infrared light at a surface of said optical component;

iii) applying a predetermined voltage to each of the individual electrodes formed on the first substrate in order to modulate a refractive index of the liquid crystal layer.

According to another aspect of the present invention there is provided a method of manufacturing an optical phase modulator, comprising at least the steps of a) providing a first substrate with a first electrode, optionally having a two dimensional array of individually electrically drivable cells;

b) depositing a liquid crystal medium as set forth in claim 1 over the first substrate; and c) mounting a second substrate with a second electrode onto the liquid crystal material.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures. In the present invention and especially in the following examples, the structures of the mesogenic compounds are indicated by abbreviations or acronyms. In these acronyms, the chemical formulae are abbreviated as follows using Tables A to C below. All groups $C_nH_{2n+1}$, $C_mH_{2m+1}$ and $C_lH_{2l+1}$, and $C_nH_{2n-1}$, $C_mH_{2m-1}$ and $C_lH_{2l-1}$ denote straight-chain alkyl or alkylene, respectively, in each case having n, m or l C atoms, wherein n and m, independently are 1, 2, 3, 4, 5, 6 or 7 and l is 1, 2 or 3. Table A lists the codes used for the ring elements of the core structures of the compounds, while Table B shows the linking groups and end groups. Table C shows illustrative structures of compounds with their respective abbreviations.

TABLE A

| Ring elements | |
|---|---|
| C | 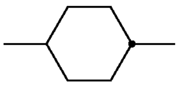 |
| D | 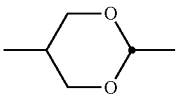 |
| DI | 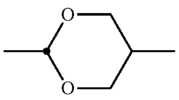 |

TABLE A-continued

| Ring elements | |
|---|---|
| A | 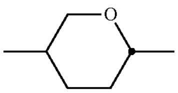 |
| AI | 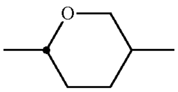 |
| G | 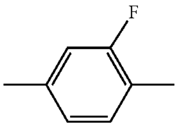 |
| GI | 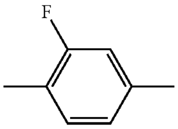 |
| G(Cl) | 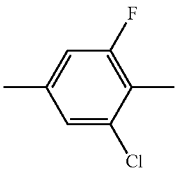 |
| P(Cl,Cl) | 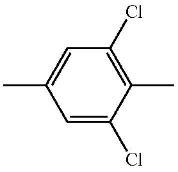 |
| GI(Cl) | 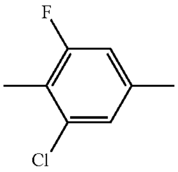 |
| P(Cl,Cl)I | 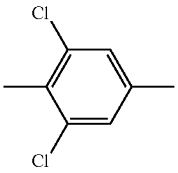 |
| G(F) | 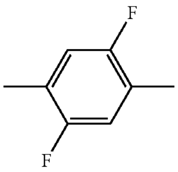 |
| U | 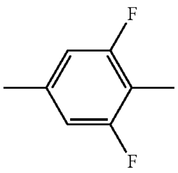 |

TABLE A-continued
| Ring elements | |
|---|---|
| UI | 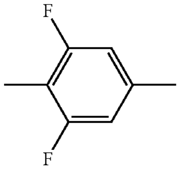 |
| U(F.F) | 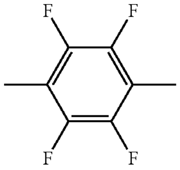 |
| Y | 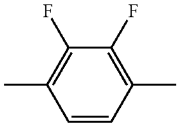 |
| M | 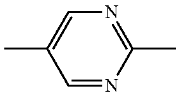 |
| MI | 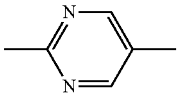 |
| N | 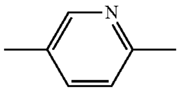 |
| NI | 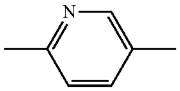 |
| Np | 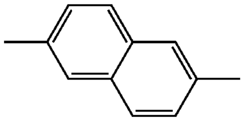 |
| N3f | 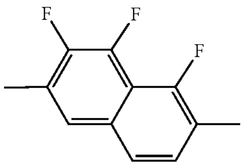 |
| N3fl | 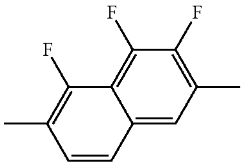 |
| tH | 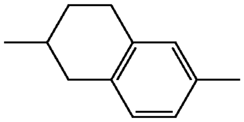 |
TABLE A-continued
| Ring elements | |
|---|---|
| tHI | 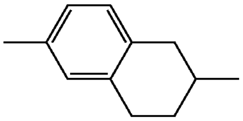 |
| tH2f | 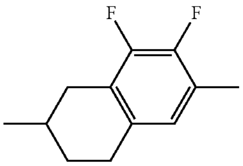 |
| tH2fl | 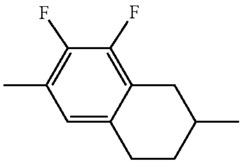 |
| dH | 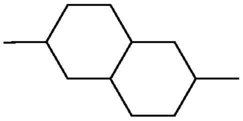 |
| K | 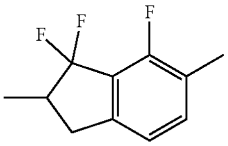 |
| KI | 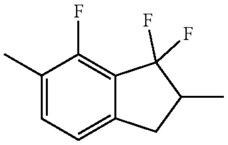 |
| L | 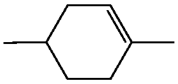 |
| LI | 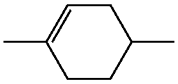 |
| F | 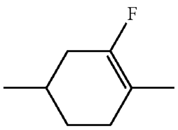 |
| FI | 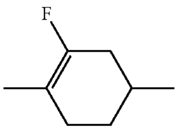 |
| P | 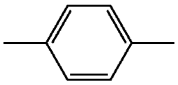 |

TABLE A-continued
| Ring elements | |
|---|---|
| P(n,m) | 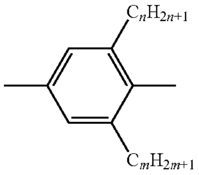 |
| P(o) | 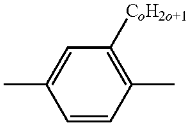 |
| PI(o) | 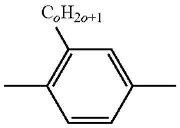 |
| P(i3) | 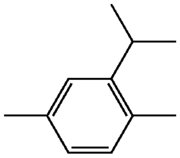 |
| PI(ic3) | 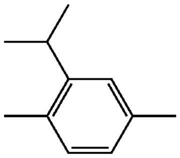 |
| P(t4) | 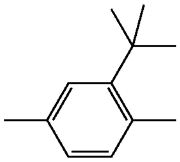 |
| PI(t4) | 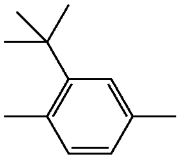 |
| P(c3) | 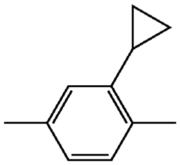 |
| PI(c3) | 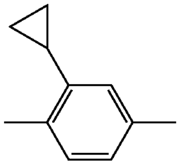 |
TABLE A-continued
| Ring elements | |
|---|---|
| P(c4) | 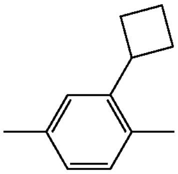 |
| PI(c4) | 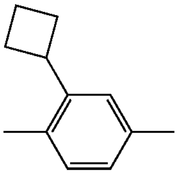 |
| P(c5) | 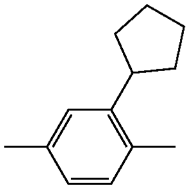 |
| PI(c5) | 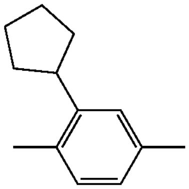 |
| P(e5) | 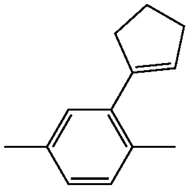 |
| PI(e5) | 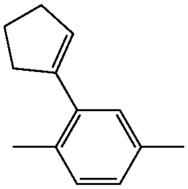 |
| P(c6) | 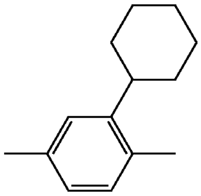 |
| PI(c6) | 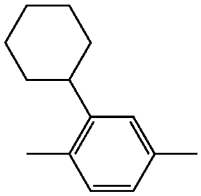 |

TABLE A-continued
| Ring elements | |
|---|---|
| P(e6) | 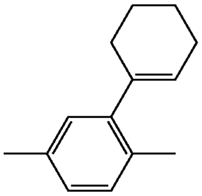 |
| PI(e6) | 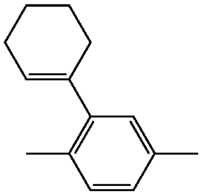 |
| GI(o) | 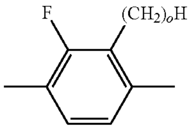<br>in which o =<br>1, 2, 3, 4, 5 or 6 |
| G(o) | 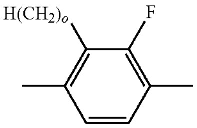<br>in which o =<br>1, 2, 3, 4, 5 or 6 |
| GI(i3) | 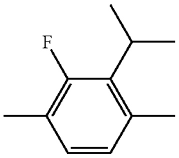 |
| G(i3) | 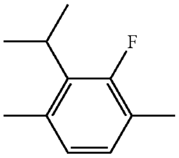 |
| GI(t4) | 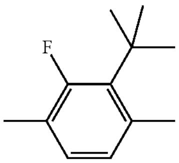 |
| G(t4) | 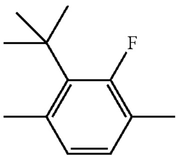 |
TABLE A-continued
| Ring elements | |
|---|---|
| GI(c3) | 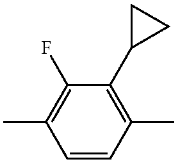 |
| G(c3) | 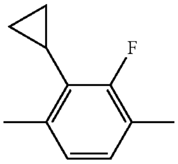 |
| GI(c4) | 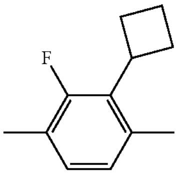 |
| G(c4) | 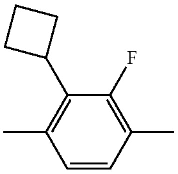 |
| GI(c5) | 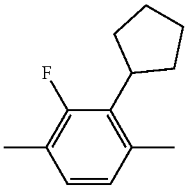 |
| G(c5) | 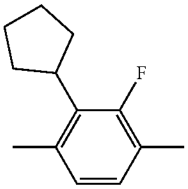 |
| GI(e5) | 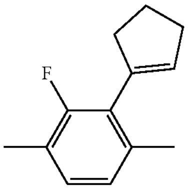 |
| G(e5) | 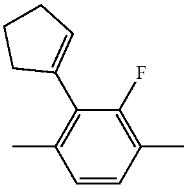 |

TABLE A-continued

| Ring elements | |
|---|---|
| GI(c6) | 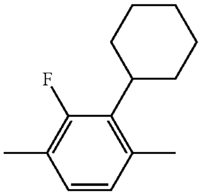 |
| G(c6) | 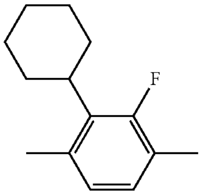 |
| GI(e6) | 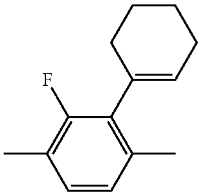 |
| G(e6) | 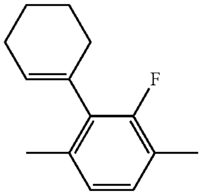 |

TABLE A-continued

| Ring elements | |
|---|---|
| Np(1,4) | 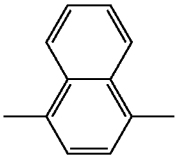 |
| Th | 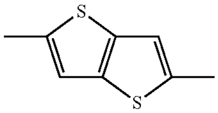 |

TABLE B

| Linking groups | | | |
|---|---|---|---|
| E | —$CH_2CH_2$— | Z | —CO—O— |
| V | —CH═CH— | ZI | —O—CO— |
| X | —CF═CH— | O | —$CH_2$—O— |
| XI | —CH═CF— | OI | —O—$CH_2$— |
| B | —CF═CF— | Q | —$CF_2$—O— |
| T | —C≡C— | QI | —O—$CF_2$— |
| W | —$CF_2CF_2$— | | |

TABLE B

| End groups | | | |
|---|---|---|---|
| | | Right-hand side | |
| Left-hand side | | Used alone | |
| -n- | $C_nH_{2n+1}$— | -n | —$C_nH_{2n+1}$ |
| -nO— | $C_nH_{2n+1}$—O— | —On | —O—$C_nH_{2n+1}$ |
| —V— | $CH_2$═CH— | —V | —CH═$CH_2$ |
| -nV— | $C_nH_{2n+1}$—CH═CH— | -nV | —$C_nH_{2n}$—CH═$CH_2$ |
| —Vn- | $CH_2$═CH—$C_nH_{2n+1}$— | —Vn | —CH═CH—$C_nH_{2n+1}$ |
| -nVm- | $C_nH_{2n+1}$—CH═CH—$C_mH_{2m}$— | -nVm | —$C_nH_{2n}$—CH═CH—$C_mH_{2m+1}$ |
| —N— | N≡C— | —N | —C≡N |
| —S— | S═C═N— | —S | —N═C═S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —FXO— | $CF_2$═CH—O— | —OXF | —O—CH═$CF_2$ |
| —A— | H—C≡C— | —A | —C≡C—H |
| -nA— | $C_nH_{2n+1}$—C≡C— | —An | —C≡C—$C_nH_{2n+1}$ |
| —NA— | N≡C—C≡C— | —AN | —C≡C—C≡N |
| -(cn)- | 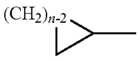 | -(cn) | 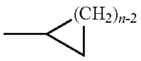 |
| -(cn)m- | 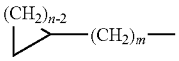 | -m(cn) | 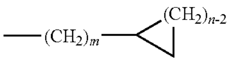 |

Used in Combination with Others

| | | | |
|---|---|---|---|
| - . . . A . . . - | —C≡C— | - . . . A . . . | —C≡C— |
| - . . . V . . . - | —CH=CH— | - . . . V . . . | —CH=CH— |
| - . . . Z . . . - | —CO—O— | - . . . Z . . . | —CO—O— |
| - . . . ZI . . . - | —O—CO— | - . . . ZI . . . | —O—CO— |
| - . . . K . . . - | —CO— | - . . . K . . . | —CO— |
| - . . . W . . . - | —CF=CF— | - . . . W . . . | —CF=CF— |

in which n and m each denote integers, and the three dots " . . . " are placeholders for other abbreviations from this table.

Branched lateral groups are numbered starting from the position next to the ring (1) where the longest chain is selected, the smaller number indicating the length of the branch and the superscript number in brackets indicates the position of the branch, for example:

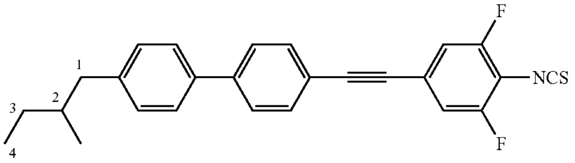

PPTU-4(1[2])-S

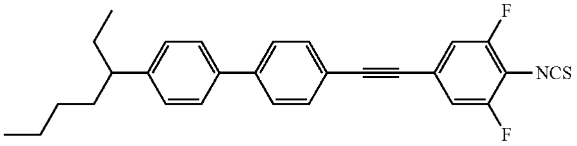

PPTU-5(2[1])-S

The following table shows illustrative structures together with their respective abbreviations. These are shown in order to illustrate the meaning of the rules for the abbreviations. They furthermore represent compounds which are preferably used.

TABLE C

Illustrative structures

The following illustrative structures are examples as well as compounds, which are preferably additionally used in the media:

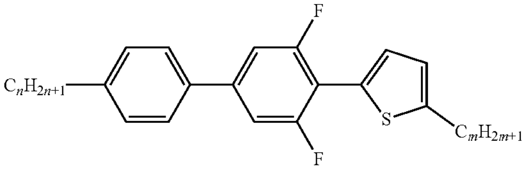

PUS-n-m

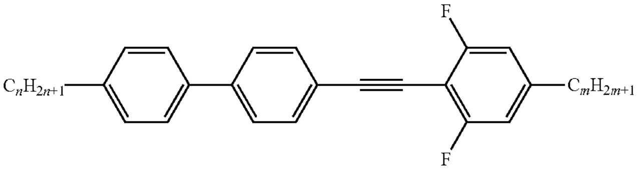

PPTUI-n-m

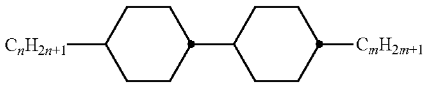

CC-n-m

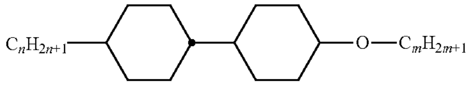

CC-n-Om

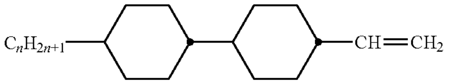

CC-n-V

TABLE C-continued
Illustrative structures
The following illustrative structures are examples as well as compounds, which are preferably additionally used in the media:
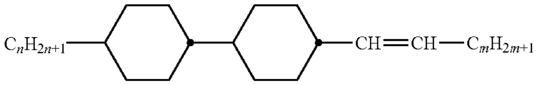
CC-n-Vm
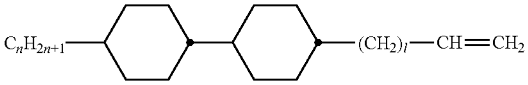
CC-n-IV
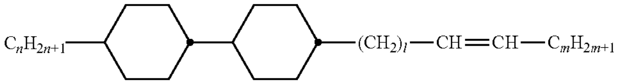
CC-n-IVm
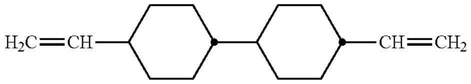
CC-V-V
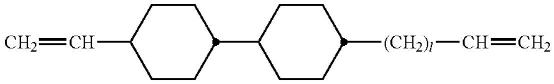
CC-V-IV
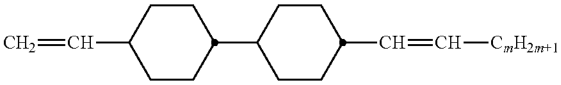
CC-V-Vm
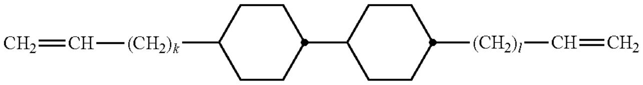
CC-Vk-IV
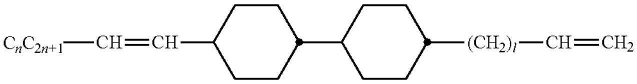
CC-nV-IV
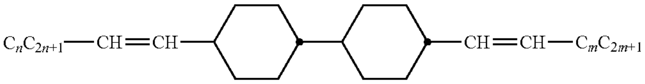
CC-nV-Vm
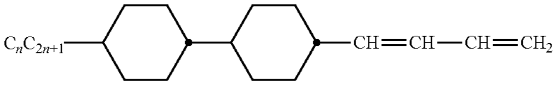
CC-n-VV
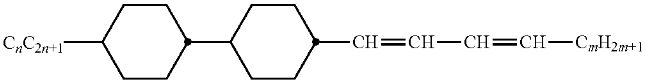
CC-n-VVm TABLE C-continued
Illustrative structures
The following illustrative structures are examples as well as compounds, which are preferably additionally used in the media:
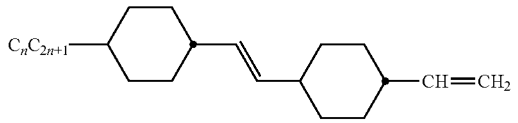
CVC-n-V
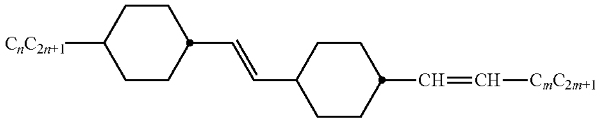
CVC-n-Vm
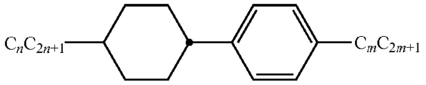
CP-n-m
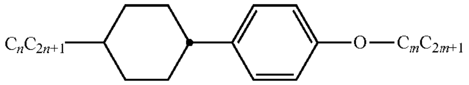
CP-n-Om
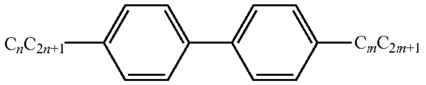
PP-n-m
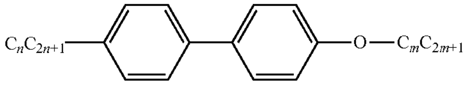
PP-n-Om
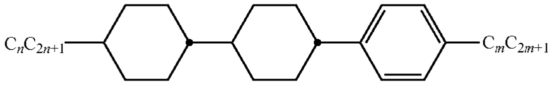
CCP-n-m
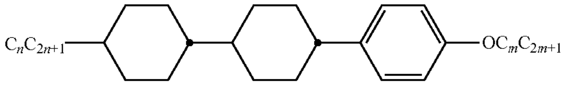
CCP-n-Om
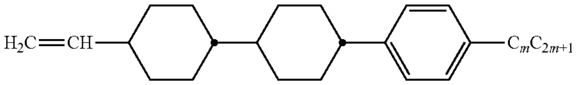
CCP-V-m
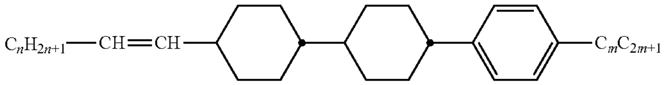
CCP-nV-m TABLE C-continued
Illustrative structures
The following illustrative structures are examples as well as compounds, which are preferably additionally used in the media:
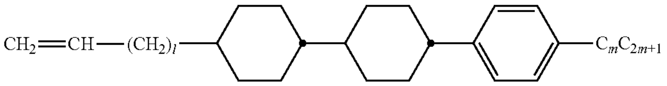
CCP-VI-m
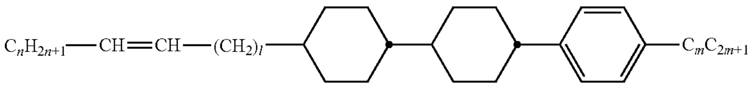
CCP-nVI-m
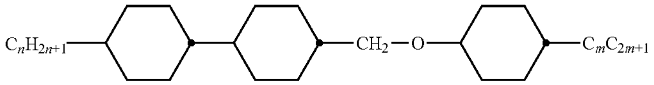
CCOC-n-m
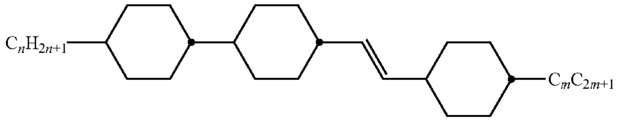
CCVC-n-m
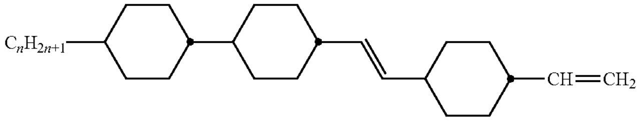
CCVC-n-V
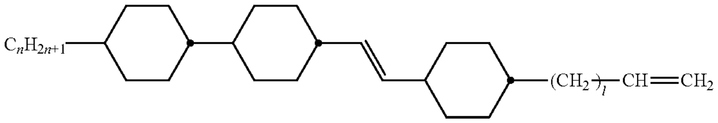
CCVC-n-IV
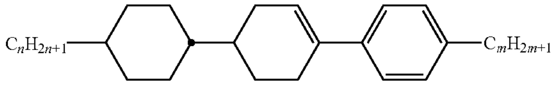
CLP-n-m
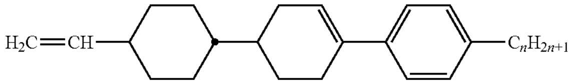
CLP-V-n
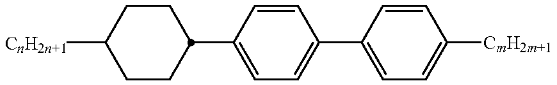
CPP-n-m
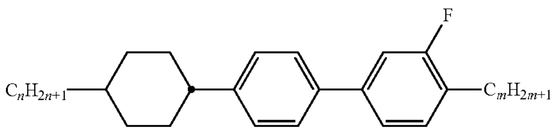
CPG-n-m TABLE C-continued
| Illustrative structures<br>The following illustrative structures are examples as well as compounds, which are preferably additionally used in the media: |
|---|
| 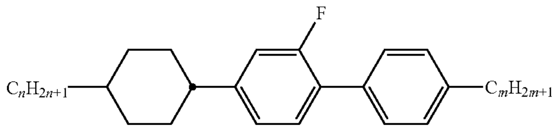 |
| CGP-n-m |
| 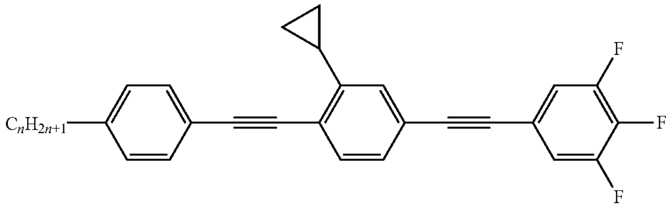 |
| PTPI(c3)TU-n-F |
| 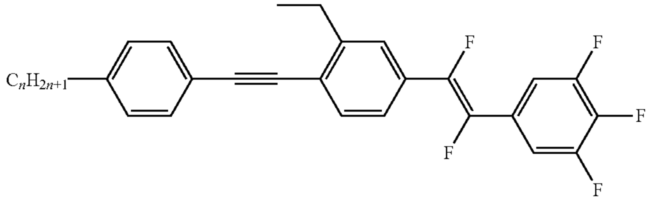 |
| PTPI(2)WU-n-F |
| 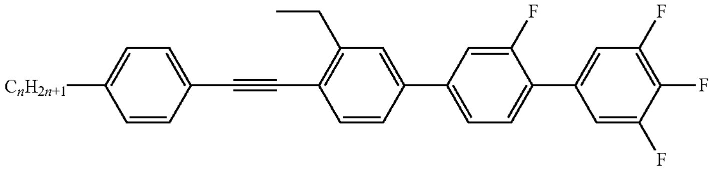 |
| PTPI(2)GU-n-F |
| 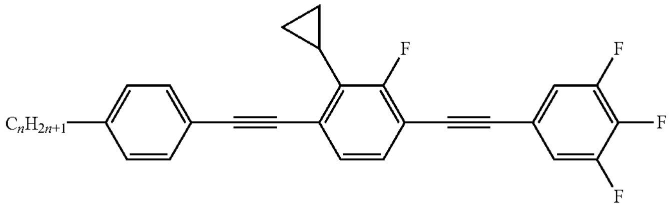 |
| PTG(c3)TU-n-F |
| 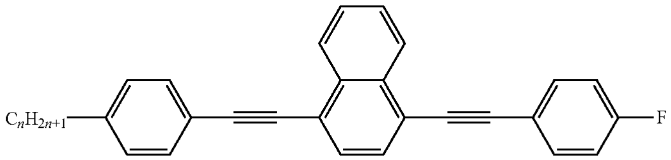 |
| PTN(1,4)TP-n-F |
| 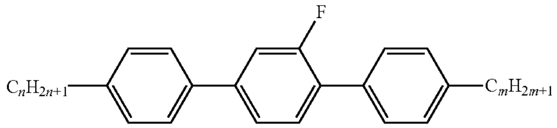 |
| PGP-n-m |

TABLE C-continued
| Illustrative structures<br>The following illustrative structures are examples as well as compounds, which are preferably additionally used in the media: |
|---|
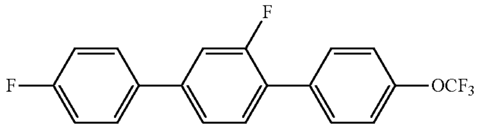 [SMILES: Fc1ccc(-c2ccc(-c3ccc(OC(F)(F)F)cc3)c(F)c2)cc1]
PGP-F-OT
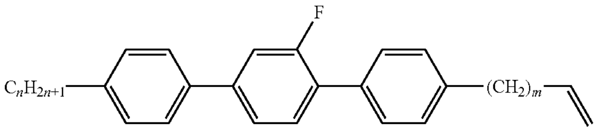
PGP-n-mV
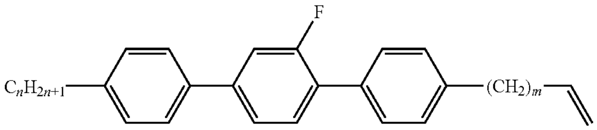
PGP-n-mVI
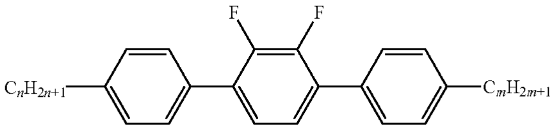
PYP-n-m
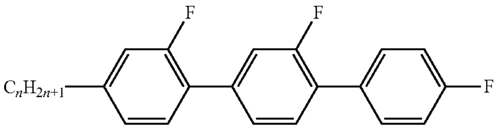
GGP-n-F
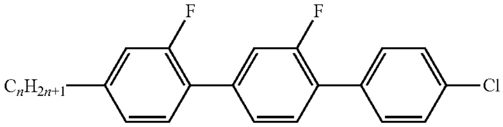
GGP-n-CL
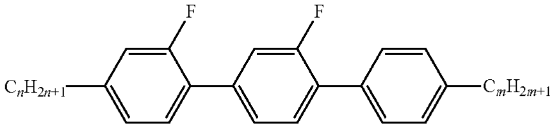
GGP-n-m
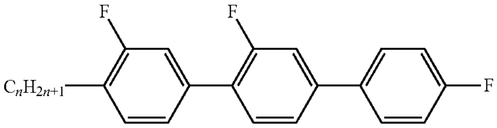
PGIGI-n-F TABLE C-continued
| Illustrative structures The following illustrative structures are examples as well as compounds, which are preferably additionally used in the media: |
| --- |
| 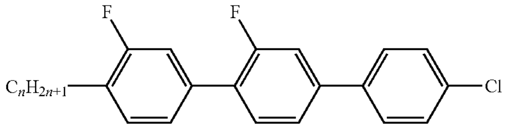 |
| PGIGI-n-CL |
| 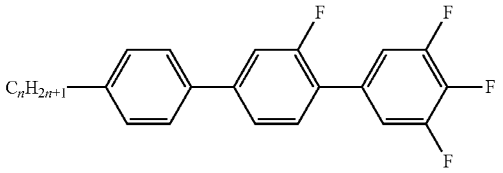 |
| PGU-n-F |
| 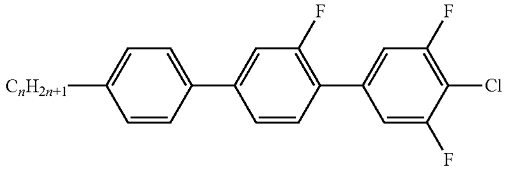 |
| PGU-n-CL |
| 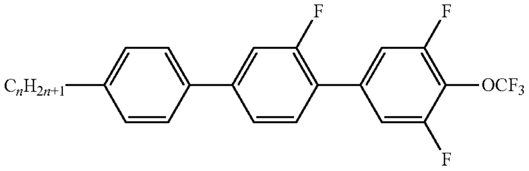 |
| PGU-n-OT |
| 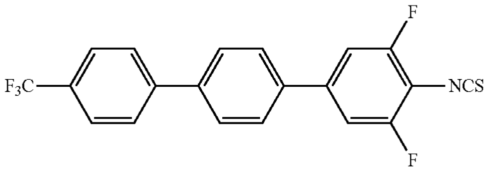 |
| PPU-T-S |
| 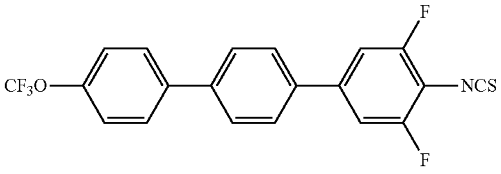 |
| PPU-TO-S |
| 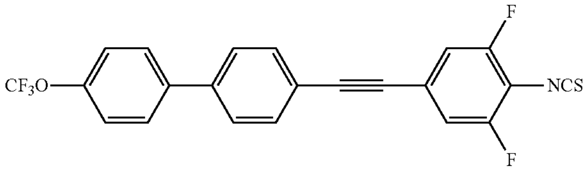 |
| PPTU-TO-S |

TABLE C-continued
| Illustrative structures<br>The following illustrative structures are examples as well as compounds, which are preferably additionally used in the media: |
|---|
| 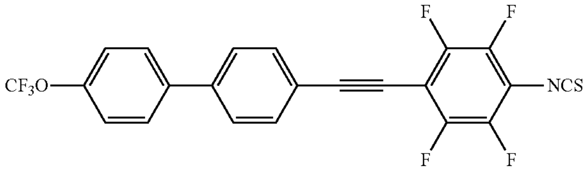 |
| PPTU(F.F)-TO-S |
| 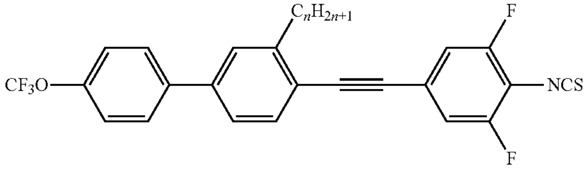 |
| PP(n)TU-TO-S |
| 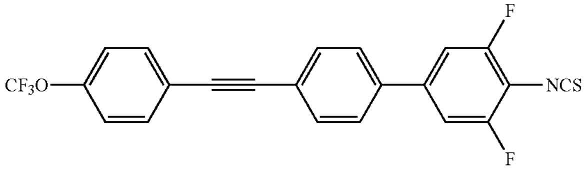 |
| PTPU-TO-S |
| 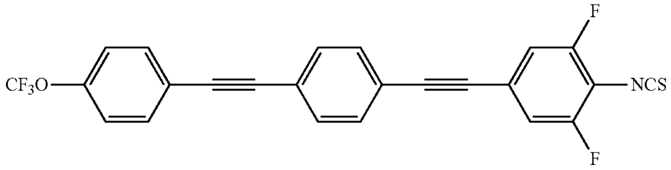 |
| PTPTU-TO-S |
| 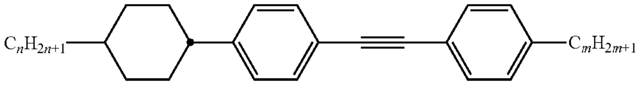 |
| CPTP-n-m |
| 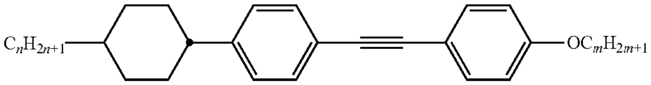 |
| CPTP-n-Om |
| 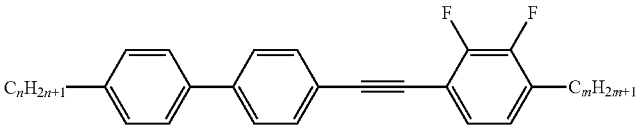 |
| PPTY-n-m |
| 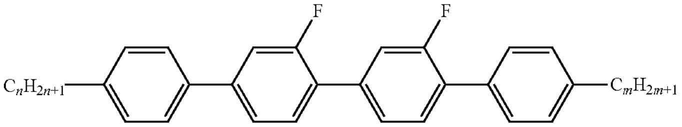 |
| PGGP-n-m |

TABLE C-continued
Illustrative structures
The following illustrative structures are examples as well as compounds, which are preferably additionally used in the media:
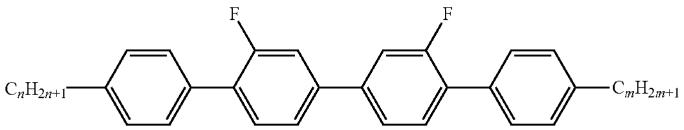
PGIGP-n-m
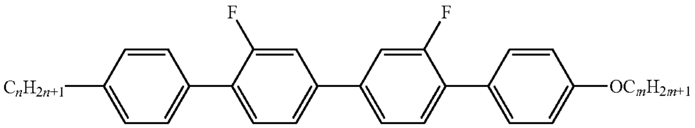
PGIGP-n-Om
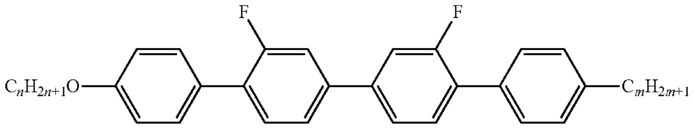
PGIGP-nO-m
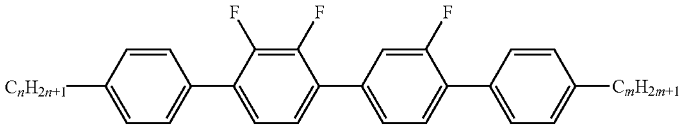
PYGP-n-m
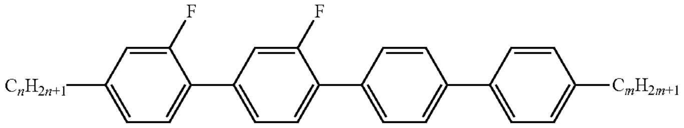
GGPP-n-m
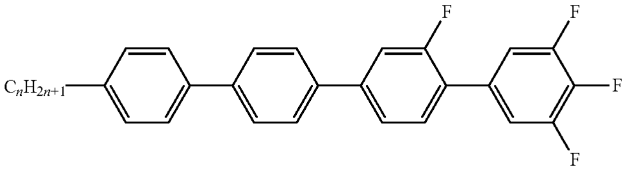
PPGU-n-F
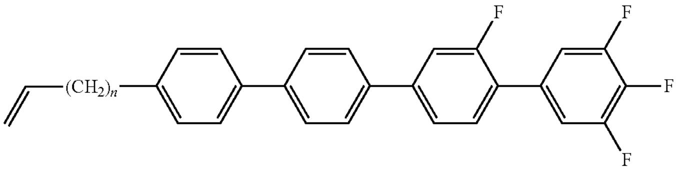
PPGU-Vn-F
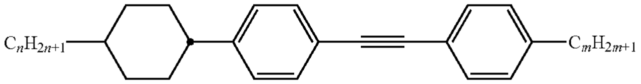
CPTP-n-m TABLE C-continued
| Illustrative structures<br>The following illustrative structures are examples as well as compounds, which are preferably additionally used in the media: |
|---|
| 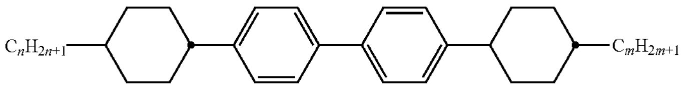<br>CPPC-n-m |
| 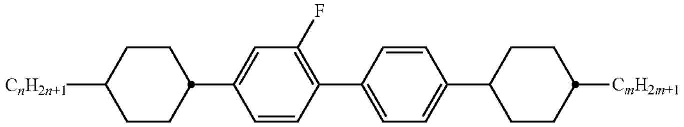<br>CGPC-n-m |
| 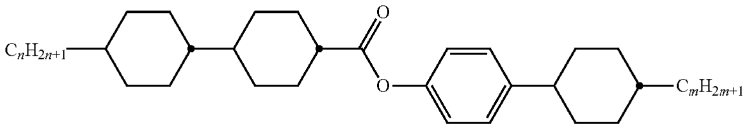<br>CCZPC-n-m |
| 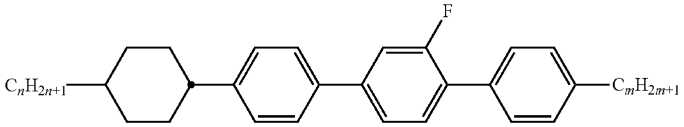<br>CPGP-n-m |
| 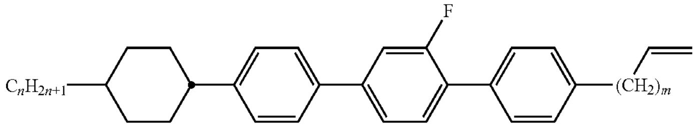<br>CPGP-n-mV |
| 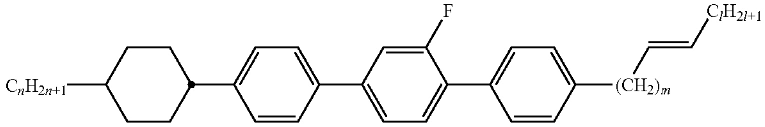<br>CPGP-n-mVI |
| 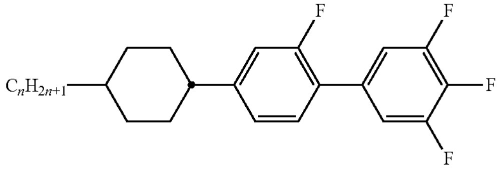<br>CGU-n-F |
| 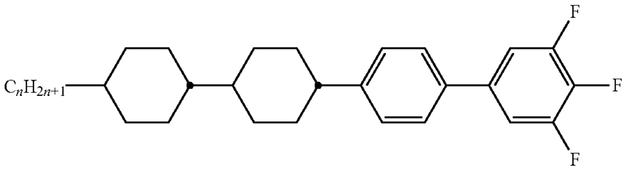<br>CCPU-n-F |

TABLE C-continued
| Illustrative structures<br>The following illustrative structures are examples as well as compounds, which are preferably additionally used in the media: |
|---|
| 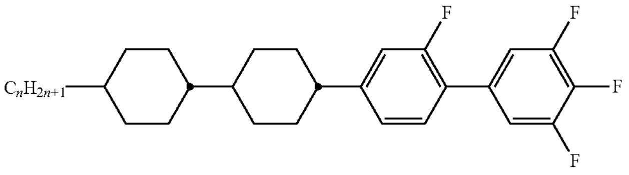 |
| CCGU-n-F |
| 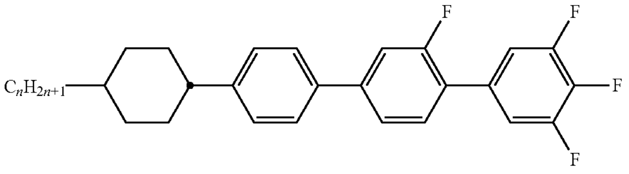 |
| CPGU-n-F |
| 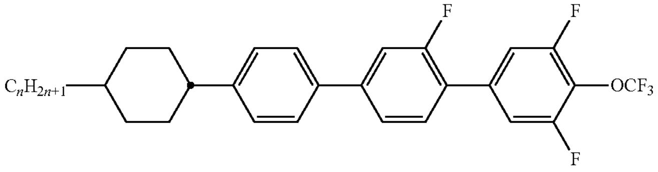 |
| CPGU-n-OT |
| 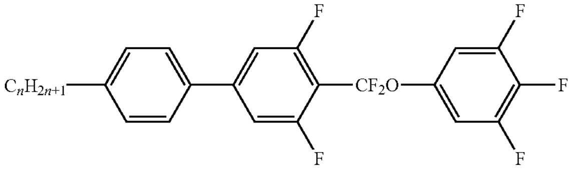 |
| PUQU-n-F |
| 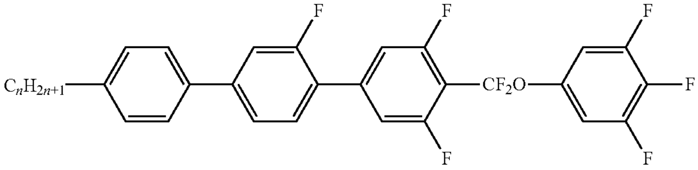 |
| PGUQU-n-F |
| 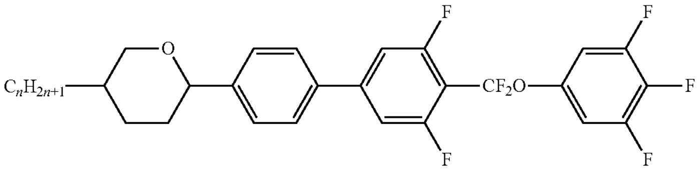 |
| APUQU-n-F |
| 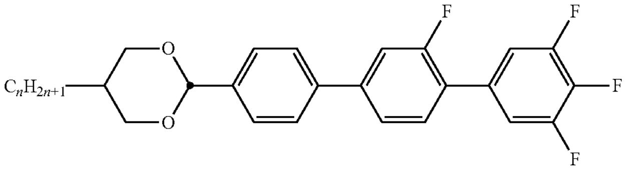 |
| DPGU-n-F |

TABLE C-continued

| Illustrative structures<br>The following illustrative structures are examples as well as compounds, which are preferably additionally used in the media: |
| --- |
| 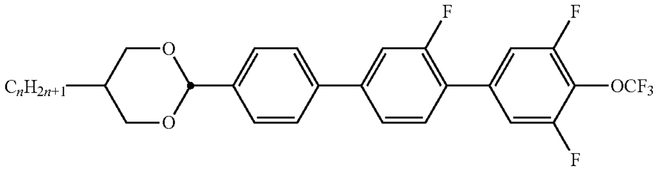<br>DPGU-n-OT |
| 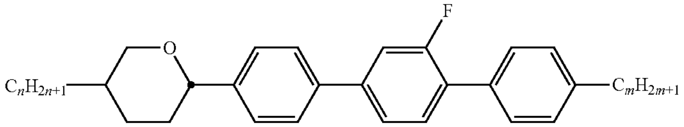<br>APGP-n-m<br>in which m and n, identically or differently, are 1, 2, 3, 4, 5, 6 or 7. |

Preferably, the medium according to the invention comprises one or more compounds selected from the compounds of Table C.

The following table, Table D, shows illustrative compounds which can be used as additional stabilisers in the mesogenic media in accordance with the present invention. The total concentration of these and similar compounds in the media is preferably 5% or less.

TABLE D

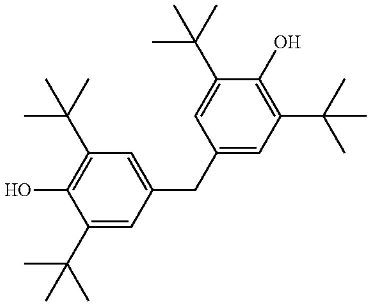 [SMILES: CC(C)(C)c1cc(Cc2cc(C(C)(C)C)c(O)c(C(C)(C)C)c2)cc(C(C)(C)C)c1O]

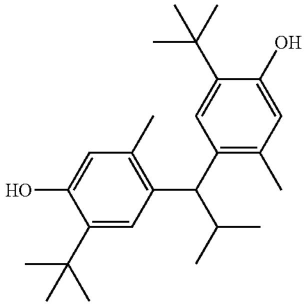 [SMILES: Cc1cc(O)c(C(C)(C)C)cc1C(c1cc(C(C)(C)C)c(O)cc1C)C(C)C]

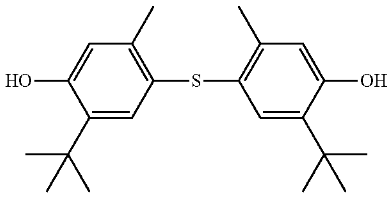 [SMILES: Cc1cc(O)c(C(C)(C)C)cc1Sc1cc(C(C)(C)C)c(O)cc1C]

TABLE D-continued
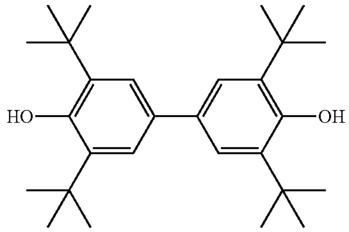 [SMILES: CC(C)(C)c1cc(-c2cc(C(C)(C)C)c(O)c(C(C)(C)C)c2)cc(C(C)(C)C)c1O]
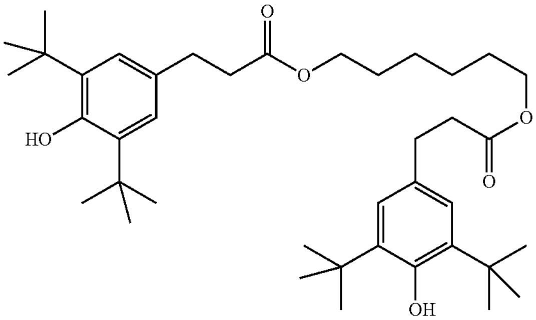 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
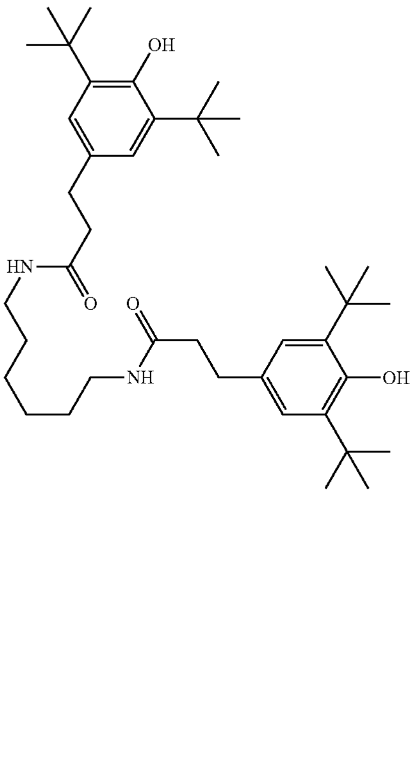 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
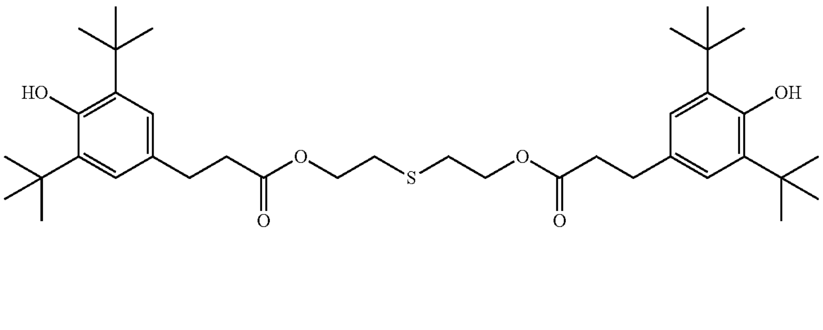 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
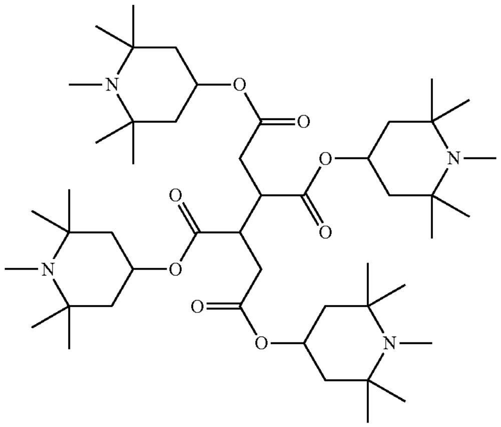
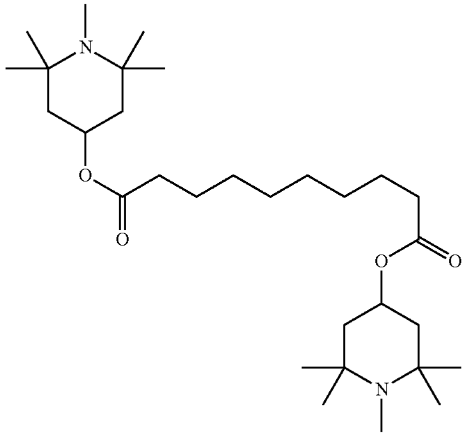
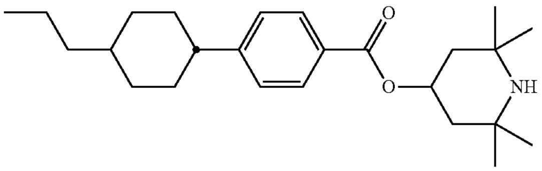
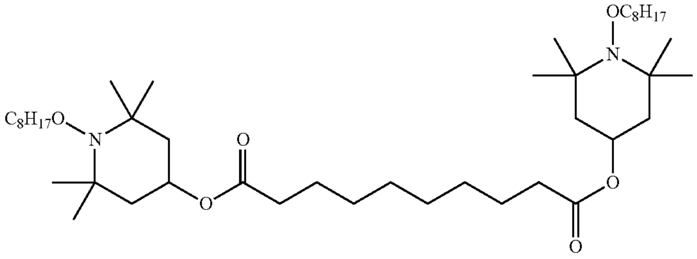
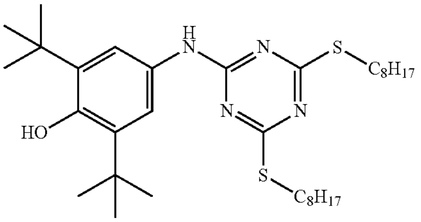

TABLE D-continued
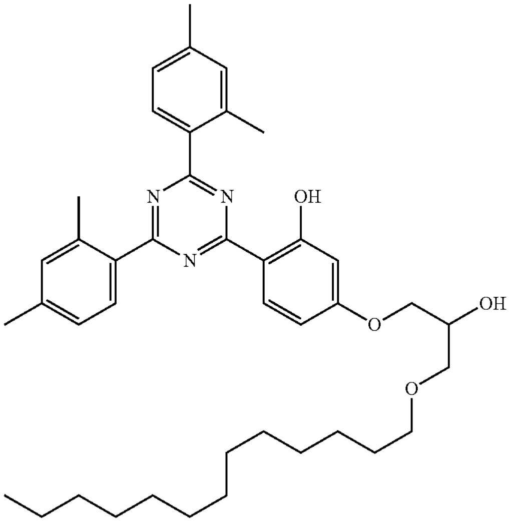 [SMILES: CCCCCCCCCCCCCOCC(O)COc1ccc(-c2nc(-c3ccc(C)cc3C)nc(-c3ccc(C)cc3C)n2)c(O)c1]
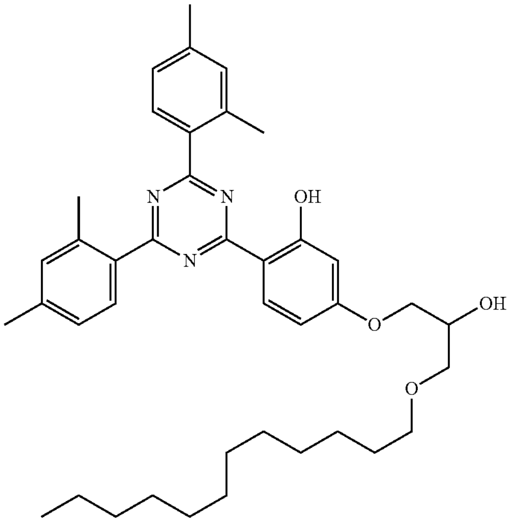 [SMILES: CCCCCCCCCCCCOCC(O)COc1ccc(-c2nc(-c3ccc(C)cc3C)nc(-c3ccc(C)cc3C)n2)c(O)c1]
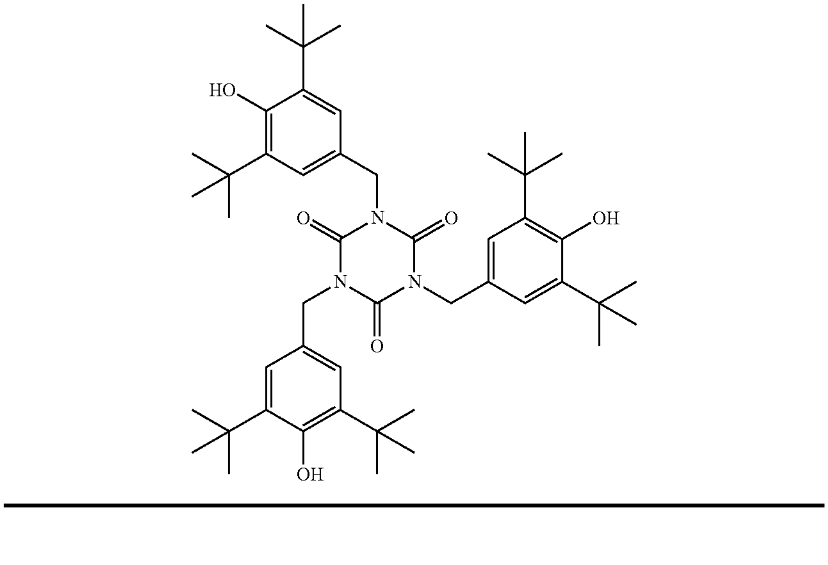

In a preferred embodiment of the present invention, the mesogenic media comprise one or more compounds selected from the group of the compounds from Table D.

The mesogenic media in accordance with the present application preferably comprise two or more, preferably four or more, compounds selected from the group consisting of the compounds from the above tables.

Preferably the medium comprises one or more chiral dopants in a concentration in the range of from above 0% to 5%, preferably from 0.01 to 4%, more preferably from 0.1% to 3%, very preferably from 0.2% to 2% and in particular from 0.3% to 1%.

All mixtures according to the invention are nematic. The liquid-crystal media according to the invention preferably have nematic phases in preferred ranges given above. The expression "to have a nematic phase" here means on the one hand that no smectic phase and no crystallization are observed at low temperatures at the corresponding temperature and on the other hand that no transition from a nematic phase to an isotropic phase occurs on heating from the nematic phase at a given temperature. At high temperatures, the clearing point is measured in capillaries by conventional methods. The investigation at low temperatures is carried out in a flow viscometer at the corresponding temperature and checked by storage of bulk samples: The storage stability in the bulk (LTS) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallization. For every material and at each temperature two bottles are stored. If crystallization or the appearance of a smectic phase is observed in at least one of the two correspondent bottles the test is terminated and the time of the last inspection before the one at which the occurrence of a higher ordered phase is observed is recorded as the respective storage stability.

The test is finally terminated after 1000 h, i.e., an LTS value of 1000 h means that the mixture is stable at the given temperature for at least 1000 h.

The response times are given as rise time ($\tau_{on}$) for the time for the change of the relative tuning, respectively of the relative contrast for the electro-optical response, from 0% to 90% ($t_{90}-t_0$), i.e. including the delay time ($t_{10}-t_0$), as decay time ($\tau_{off}$) for the time for the change of the relative tuning, respectively of the relative contrast for the electro-optical response, from 100% back to 10% ($t_{100}-t_{10}$) and as the total response time ($\tau_{total}=\tau_{on}+\tau_{off}$), respectively.

m.p. denotes the melting point and $T_{(N,I)}$ denotes the clearing point of a liquid-crystalline substance in degrees Celsius; Furthermore: K denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The host mixture used for determination of the optical anisotropy Δn of single compounds is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below:

$V_0$ denotes threshold voltage, capacitive [V] at 20° C., $n_e$ denotes extraordinary refractive index at 20° C. and 589 nm, $n_o$ denotes ordinary refractive index at 20° C. and 589 nm, Δn denotes optical anisotropy at 20° C. and 589 nm, $\varepsilon_\perp$ denotes dielectric permittivity perpendicular to the director at 20° C. and 1 kHz, $\varepsilon_\parallel$ denotes dielectric permittivity parallel to the director at 20° C. and 1 kHz, Δε denotes dielectric anisotropy at 20° C. and 1 kHz, cl.p., T(N,I) denotes clearing point [° C.], $\gamma_1$ denotes rotational viscosity measured at 20° C. [mPa·s], $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], and LTS denotes low-temperature stability (nematic phase), determined in test cells or in the bulk, as specified.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 μm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 μm, which each have on the insides an electrode layer and a polyimide alignment layer on top, where the two polyimide layers are rubbed antiparallel to one another and cause a homeotropic edge alignment of the liquid-crystal molecules.

The tilt angle is determined using the Mueller Matrix Polarimeter "AxoScan" from Axometrics. A low value (i.e., a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Unless indicated otherwise, the VHR is determined at 20° C. ($VHR_{20}$) and after 5 minutes in an oven at 100° C. ($VHR_{100}$) in a commercially available instrument Model LCM-1 (O0004) from TOYO Corporation, Japan. The voltage used has a frequency of in a range from 1 Hz to 60 Hz, unless indicated more precisely.

The stability to UV irradiation is investigated in a "Suntest CPS+", a commercial instrument from Heraeus, Germany, using a Xenon lamp NXE1500B. The sealed test cells are irradiated for 2.0 h, unless explicitly indicated, without additional heating. The irradiation power in the wavelength range from 300 nm to 800 nm is 765 $W/m^2$ V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio (ΔVHR) usually caused by the exposure, for example by UV irradiation or by LCD backlighting, is determined in accordance with the following equation (1):

$$\Delta VHR(t) = VHR(t) - VHR(t = 0). \quad (1)$$

The ion density from which the resistivity is calculated is measured using the commercially available LC Material Characteristics Measurement System Model 6254 from Toyo Corporation, Japan, using VHR test cells with AL16301 Polyimide (JSR Corp., Japan) having a 3.2 μm cell gap. The measurement is performed after 5 min of storage in an oven at 60° C. or 100° C.

The so-called "HTP" denotes the helical twisting power of an optically active or chiral substance in an LC medium (in μm). Unless indicated otherwise, the HTP is measured in the commercially available nematic LC host mixture MLC-6260 (Merck KGaA) at a temperature of 20° C.

The Clearing point is measured using the Mettler Thermosystem FP900. The optical anisotropy (Δn) is measured using an Abbe-Refractometer H005 (Natrium-spectral lamp Na10 at 589 nm, 20° C.). The dielectric anisotropy (Δε) is measured using an LCR-Meter E4980A/Agilent (G005) at 20° C. (ε-parallel-cells with JALS 2096-R1). The turn on voltage ($V_0$) is measured using an LCR-Meter E4980A/Agilent (G005) at 20° C. (ε-parallel-cells with JALS 2096-R1). The rotational viscosity ($\gamma_1$) is measured using a TOYO LCM-2 (0002) at 20° C. (gamma 1 negative cells with JALS-2096-R 1). The elastic constant ($K_1$, splay) is measured using an LCR-Meter E4980A/Agilent (G005) at 20° C. (ε parallel-cells with JALS 2096-R1). $K_3$: The elastic constant ($K_3$, bend) is measured using an LCR-Meter E4980A/Agilent (G005) at 20° C. (ε-parallel-cells with JALS 2096-R1).

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The liquid-crystalline media are investigated with respect to their properties in the microwave frequency range as described in A. Penirschke et al. "Cavity Perturbation Method for Characterization of Liquid Crystals up to 35 GHz", 34th European Microwave Conference—Amsterdam, pp. 545-548. Compare in this respect also A. Gaebler et al. "Direct Simulation of Material Permittivities . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or quartz capillary. The capillary has an inner diameter of 0.5 mm and an outer diameter of 0.78 mm. The effective length is 2.0 cm. The filled capillary is introduced into the center of the cylindrical cavity with a resonance frequency of 19 GHz. This cavity has a length of 11.5 mm and a radius of 6 mm. The input signal (source) is then applied, and the frequency depending response of the cavity is recorded using a commercial vector network analyzer (N5227A PNA Microwave Network Analyzer, Keysight Technologies Inc. USA. For other frequencies, the dimensions of the cavity are adapted correspond-ingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in the above-mentioned publication A. Penirschke et al., 34th European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla.

The dielectric anisotropy in the microwave range is defined as $$\Delta\varepsilon_r \equiv (\varepsilon_{r,\|} - \varepsilon_{r,\perp}).$$

The tunability (τ) is defined as $$\tau \equiv (\Delta\varepsilon_r / \varepsilon_{r,\|}).$$

The material quality (q) is defined as $\eta \equiv (\tau / \tan\delta_{\varepsilon r,max})$, where the maximum dielectric loss is $\tan\delta_{\varepsilon r,max} \equiv \max.\ \{\tan\delta_{\varepsilon r,\perp}, \tan\delta_{\varepsilon r,\|}\}$

EXAMPLES

The following examples are intended to explain the invention without limiting it. Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. The following examples can be repeated with similar success by substituting the generically or specifically described reactants and/or operating conditions of this invention for those used in the following examples. From the foregoing description, one skilled in the art can easily ascertain the essential characteristics of this invention and, without departing from the spirit and scope thereof, can make various changes and modifications of the invention to adapt it to various usages and conditions.

Mixture Example M1

| | | | |
|---|---|---|---|
| S1-1a | 0.400% | $T_{(N, I)}$ [° C.]: | 101 |
| PUQU-3-F | 16.932% | Δn (589.3 nm, 20° C.) | 0.2467 |
| APUQU-3-F | 6.972% | $n_e$ (589.3 nm, 20° C.) | 1.7535 |
| PGUQU-3-F | 6.972% | $n_o$ (589.3 nm, 20° C.) | 1.5068 |
| CC-3-V | 14.940% | Δε (1 kHz, 20° C.): | 11.7 |
| PPTUI-3-2 | 17.928% | $\varepsilon_{\parallel}$ (1 kHz, 20° C.): | 15.1 |
| PPTUI-3-4 | 17.928% | $\varepsilon_{\perp}$ (1 kHz, 20° C.): | 3.4 |
| PUS-3-2 | 17.928% | $\gamma_1$ [mPa · s], (20° C.): | 177 |
| Σ | 100.0% | $K_1$ [pN], (20° C.): | 16.0 |
| | | $K_3$ [pN], (20° C.): | 16.7 |
| | | $V_0$ [V], (20° C.): | 1.24 |
| | | LTS (bulk, 0° C.) | >1000 h |

Mixture Example M2

| | | | |
|---|---|---|---|
| S1-1a | 0.400% | $T_{(N, I)}$ [° C.]: | 87.5 |
| PUQU-3-F | 16.932% | Δn (589.3 nm, 20° C.) | 0.2233 |
| APUQU-3-F | 6.972% | $n_e$ (589.3 nm, 20° C.) | 1.7272 |
| PGUQU-3-F | 6.972% | $n_o$ (589.3 nm, 20° C.) | 1.5039 |
| CC-3-V | 9.960% | Δε (1 kHz, 20° C.): | 10.7 |
| CP-3-O2 | 14.940% | $\varepsilon_{\parallel}$ (1 kHz, 20° C.): | 14.3 |
| PPTUI-3-2 | 17.928% | $\varepsilon_{\perp}$ (1 kHz, 20° C.): | 3.6 |
| PPTUI-3-4 | 16.932% | $\gamma_1$ [mPa · s], (20° C.): | 161 |
| PUS-3-2 | 11.952% | $K_1$ [pN], (20° C.): | 13.9 |
| Σ | 100.0% | $K_3$ [pN], (20° C.): | 15.8 |
| | | $V_0$ [V], (20° C.): | 1.20 |
| | | LTS (bulk, −10° C.) | >1000 h |

Mixture Example M3

The medium M3 consists of 99.9% of the medium M1 and 0.1% of the compound S2-1a-1.

S2-1a-1

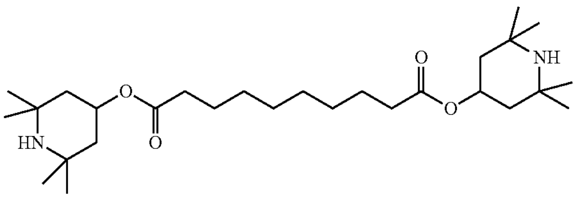

Mixture Example M4

The medium M4 consists of 99.99% of the medium M1 and 0.01% of the compound S2-2a-1.

S2-2a-1

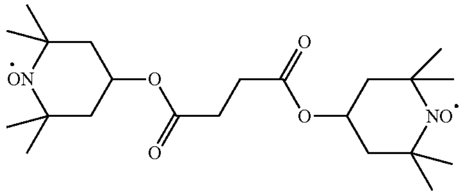

Mixture Example M5

The medium M5 consists of 99.9% of the medium M2 and 0.1% of the compound S2-1a-1.

Mixture Example M6

The medium M4 consists of 99.99% of the medium M2 and 0.01% of the compound S2-2a-1.

A light stability test is performed with a Hönle LED Cube 100 IC using blue light with a peak wavelength of 460 nm and at an irradiance of 280 mW/cm$^2$. The mixtures are irradiated in ITO cells coated with polyimide (AL3046 (CT19320)) with a cell gap of 6 μm, and the VHR is measured at a temperature of 60° C. and a frequency of 60 Hz every 2 h. The results are shown in Table 1.

TABLE 1

| | VHR [%] (60° C., 60 Hz, 1 V) | | | | | | |
|---|---|---|---|---|---|---|---|
| Mixture | t = 0 h | t = 2 h | t = 4 h | t = 6 h | t = 8 h | t = 10 h | t = 12 h |
| M1 | 99.3 | 94.7 | 91.2 | 88.0 | 87.3 | 87.4 | 86.7 |
| M2 | 99.1 | 95.0 | 91.7 | 89.4 | 87.2 | 86.6 | 86.3 |
| M3 | 99.6 | 99.2 | 98.7 | 98.3 | 97.9 | 97.6 | 97.3 |
| M4 | 99.3 | 92.0 | 89.7 | 91.4 | 91.8 | 90.3 | 87.3 |
| M5 | 99.6 | 99.3 | 98.8 | 97.9 | 97.0 | 96.6 | 95.9 |
| M6 | 99.1 | 93.2 | 89.9 | 92.7 | 91.0 | 88.6 | 88.3 |

The mixtures M1 to M6 have excellent stability under irradiation with blue light. The VHR values are sufficiently high for applications in electronic devices.

Mixture example M7 contains the compound S3-3a

S3-3a

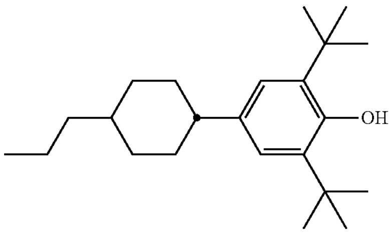

Mixture Example M7

| | | | |
|---|---|---|---|
| S1-1a | 0.44% | $T_{(N, I)}$ [° C.]: | 149 |
| S3-3a | 0.12% | Δε (1 kHz, 20° C.): | 4.9 |
| PPTUI-3-2 | 19.89% | $\varepsilon_{\parallel}$ (1 kHz, 20° C.): | 7.8 |
| PPTUI-3-4 | 31.82% | $\varepsilon_{\perp}$ (1 kHz, 20° C.): | 2.9 |
| CPGP-5-2 | 3.98% | $K_1$ [pN], (20° C.): | 21.3 |
| CPGP-5-3 | 3.98% | $K_3$ [pN], (20° C.): | 23.3 |
| PGUQU-3-F | 3.48% | $V_0$ [V], (20° C.): | 2.18 |
| PGUQU-5-F | 3.48% | $\varepsilon_{r, \parallel}$ [20° C., 19 GHz]: | 3.13 |
| PUQU-3-F | 2.98% | tan $\delta_{\varepsilon\ r, \parallel}$ [20° C., 19 GHz]: | 0.0034 |
| CC-3-V | 8.95% | $\varepsilon_{r, \perp}$ [20° C., 19 GHz]: | 2.47 |
| PUS-3-2 | 10.44% | tan $\delta_{\varepsilon\ r, \perp}$ [20° C., 19 GHz]: | 0.0123 |
| APUQU-3-F | 2.98% | τ [20° C., 19 GHz]: | 0.211 |
| CCP-V-1 | 7.46% | η [20° C., 19 GHz]: | 17.1 |
| Σ | 100.0% | | |

The medium M7 has favorable properties for high frequency applications due to a low dielectric loss and high tunability.

The invention claimed is:

1. A liquid crystal medium comprising a) 15% to 65% by weight of one or more compounds of formula I

I

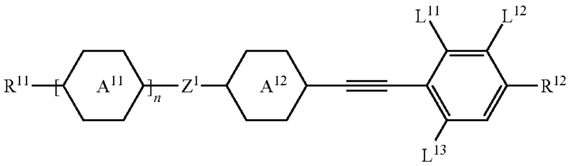

in which $R^{11}$ and $R^{12}$, identically or differently, denote H, alkyl or alkoxy having 1 to 12 C atoms, or alkenyl, alkenyloxy or alkoxyalkyl having 2 to 12 C atoms, in which one or more $CH_2$-groups may be replaced by

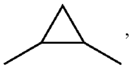 , 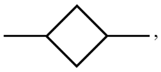 , 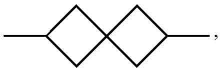 , 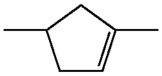 or 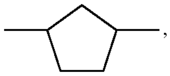 , and in which one or more H atoms may be replaced by fluorine, $L^{11}$, $L^{12}$, $L^{13}$ identically or differently, denote H, $CH_3$, Cl or F, $A^{11}$ denotes phenylene-1,4-diyl, in which one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl or cyclohexene-1,4-diyl, in which one or two non-adjacent $CH_2$ groups may be replaced, independently of one another, by O and/or S and one or more H atoms may be replaced by F, bicyclo[1.1.1]pentane-1,3-diyl, bicyclo[2.2.2]octane-1,4-diyl, spiro-[3.3]heptane-2,6-diyl, tetrahydropyran-2,5-diyl or 1,3-dioxane-2,5-diyl, $A^{12}$ denotes phenylene-1,4-diyl, in which one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, or cyclohexane-1,4-diyl or cyclohexene-1,4-diyl, in which one or two non-adjacent $CH_2$ groups may be replaced, independently of one another, by O and/or S and one or more H atoms may be replaced by F, $Z^1$ denotes denote a single bond, $—CH_2CH_2—$, $—CH{=}CH—$, $—CF_2O—$, $—OCF_2—$, $—CH_2O—$, $—OCH_2—$, $—COO—$, $—OCO—$, $—C_2F_4—$, $—CF{=}CF—$ or $—CH{=}CHCH_2O—$, n is 0 or 1;

and b) one or more compounds of the formula T,

T

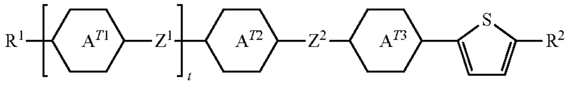

in which $R^1$ and $R^2$ denote H, F, Cl, Br, —CN, —SCN, —NCS, $SF_5$ or straight-chain alkyl having 1 to 12 C atoms or branched alkyl having 3 to 12 C atoms, in which one or more non-adjacent $CH_2$ groups may each be replaced, independently of one another, by $—CH{=}CH—$, $—C{\equiv}C—$, —O—, —CO—, —CO—O—, —O—CO—, or —O—CO—O— in such a way that O atoms are not linked directly to one another, and in which one or more H atoms may be replaced by F, Cl or Br, $A^{T1}$, $A^{T2}$ and $A^{T3}$ each, independently of one another, denote phenylene-1,4-diyl, in which one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, wherein $A^{T1}$ alternatively denotes cyclohexane-1,4-diyl, in which one or two non-adjacent $CH_2$ groups may be replaced, independently of one another, by O and/or S and one or more H atoms may be replaced by F, cyclohexene-1,4-diyl, bicyclo[1.1.1]pentane-1,3-diyl, bicyclo[2.2.2]octane-1,4-diyl, spiro[3.3]heptane-2,6-diyl, tetrahydropyran-2,5-diyl or 1,3-dioxane-2,5-diyl, $Z^1$ and $Z^2$ each, independently of one another, denote $—CF_{20}—$, $—OCF_2—$, $—CH_2O—$, $—OCH_2—$, —CO—O—, —O—CO—, $—C_2H_4—$, $—C_2F_4—$, $—CF_2CH_2—$, $—CH_2CF_2—$, —CFHCFH—, $—CFHCH_2—$, $—CH_2CFH—$, $—CF_2CFH—$, $—CFHCF_2—$, $—CH{=}CH—$, $—CF{=}CH—$, $—CH{=}CF—$, $—CF{=}CF—$, $—C{\equiv}C—$ or a single bond, t is 0 or 1, and c) one or more compounds of formula S1

S1

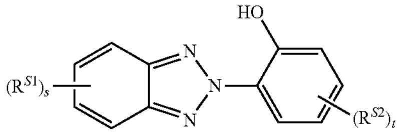

in which $R^{S1}$ and $R^{S2}$, on each occurrence, identically or differently, denote H or straight-chain alkyl having from 1 to 25 carbon atoms or branched alkyl having from 3 to 25 carbon atoms, which are unsubstituted or monosubstituted by CN or $CF_3$ or at least monosubstituted by halogen and in which one or more $CH_2$ groups may each, independently of one another, be replaced by

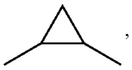 , 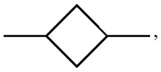 , 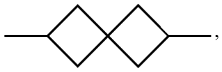 , 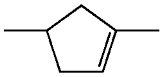 , 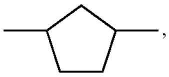 ,

—O—, —S—, —CO—, —CO—O—, —O—CO—, —O—CO—O—, $—CH{=}CH—$ or $—C{\equiv}C—$ in such a way that O and/or S atoms are not linked directly to one another, or halogen, aryl, heteroaryl, alkylaryl or arylalkyl having from 6, 5, 7, or 7 to 25 carbon atoms, respectively, each of which is unsubstituted or monosubstituted or polysubstituted by alkyl having from 1 to 6 C atoms or by halogen, S is 0, 1 or 2, and t is 0, 1, 2 or 3, and d) 2% to 15% by weight in total of one or more compounds of formula II-1a and one or more components of formula II-1g II-1a

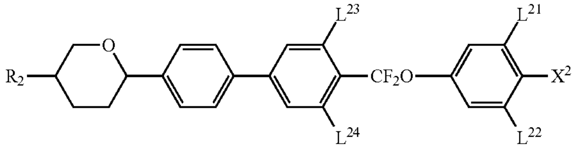

II-1g

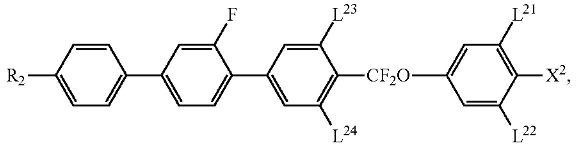

and 1% to 10% by weight of one or more compounds of formula II-3d

II-3d

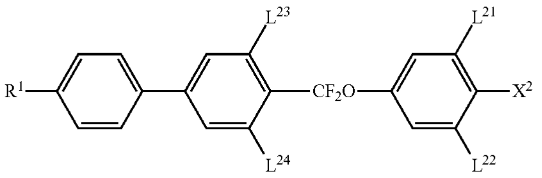

in which $R^2$ denotes a straight-chain or branched alkyl or alkoxy radical that is unsubstituted or halogenated and has 1 to 15 C atoms, where one or more $CH_2$ groups in these radicals may each be replaced, independently of one another, by

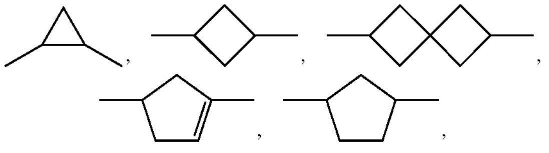

—C≡C—, —$CF_2$O—, —CH═CH—, —O—, —CO—O— or —O—CO— in such a way that O atoms are not linked directly to one another, $L^{21}$, $L^{22}$, $L^{23}$, and $L^{24}$ identically or differently, denote H or F, $X^2$ denotes halogen, halogenated alkyl or alkoxy with 1 to 3 C-atoms or halogenated alkenyl or alkenyloxy with 2 or 3 C-atoms, and wherein the medium has a birefringence of 0.180 to 0.400.

2. The liquid crystal medium according to claim 1, wherein the medium comprises one or more compounds selected from the group of compounds of the formulae S2 and S3

S2

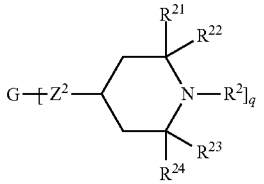

S3

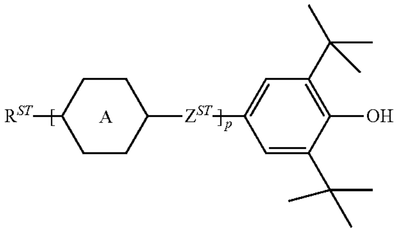

in which q is 1, 2, 3 or 4,

G denotes a straight chain hydrocarbon radical having from 1 to 60 carbon atoms or a branched or cyclic hydrocarbon radical having from 3 to 60 carbon atoms, and which is unsubstituted or monosubstituted by CN or $CF_3$ or at least monosubstituted by halogen and in which one or more $CH_2$ groups may each, independently of one another, be replaced by —O—, —S—, —$NR^0$—, —CO—, —CO—O—, —O—CO—, —O—CO—O—, —CH═CH— or —C≡C— in such a way that O or S atoms are not linked directly to one another, $R^0$ denotes H or alkyl having 1 to 6 C atoms, $R^2$ denotes H, —O', —OH, straight chain alkyl or alkoxy having 1 to 12 C atoms or branched or cyclic alkyl having 3 to 25 C atoms or arylalkoxy having 7 to 25 C atoms, $R^{21}$ and $R^{22}$ identically or differently, denote a straight-chain alkyl having from 1 to 12 carbon atoms or branched alkyl having from 3 to 12 carbon atoms, or $R^{21}$ and $R^{22}$, together with the carbon atom to which they are attached, form a cycloalkyl group having from 5 to 12 carbon atoms, $R^{23}$ and $R^{24}$ identically or differently, denote a straight-chain alkyl having from 1 to 12 carbon atoms or branched alkyl having from 3 to 12 carbon atoms, or $R^{23}$ and $R^{24}$, together with the carbon atom to which they are attached, form a cycloalkyl group having from 5 to 12 carbon atoms, $Z^2$ on each occurrence, identically or differently, denotes —O—, —C(O)O—, —OC(O)— or a single bond, $R^{ST}$ denotes H, alkyl or alkoxy having 1 to 12 C atoms, or alkenyl, alkenyloxy or alkoxyalkyl having 2 to 12 C atoms, in which one or more $CH_2$-groups may be replaced by

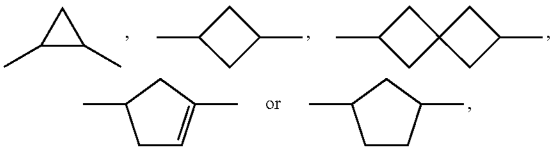

and in which one or more H atoms may be replaced by fluorine, $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$, —$(CH_2)_4$—, —CH═CH—$CH_2O$—, —$C_2F_4$—, —$CH_2CF_2$—, —$CF_2CH_2$—, —CF═CF—, —CH═CF—, —CF═CH—, —CH═CH—, —C≡C— or a single bond,

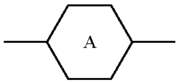, on each occurrence, identically or differently, denotes cyclohexane-1,4-diyl, cyclohexene-1,4-diyl, pyrane-2,5-diyl or 1,3-dioxane-2-5-diyl, in which one or more H atoms may be replaced by F, and p is 0, 1 or 2.

3. The liquid crystal medium according to claim 1, wherein the medium comprises one or more compounds of formula S2 selected from the group of compounds of the formulae S2-1 and S2-2

S2-1

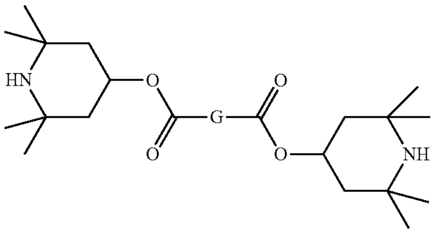

S2-2

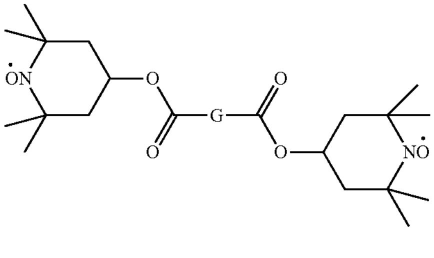

in which G denotes a divalent aliphatic radical having 1 to 20 C atoms or a or cycloaliphatic radical having 3 to 20 C atoms.

4. The liquid crystal medium according to claim 1, wherein the medium comprises one or more compounds of formula I selected from the group of compounds of the formulae PT-1 to PT-3:

PT-1

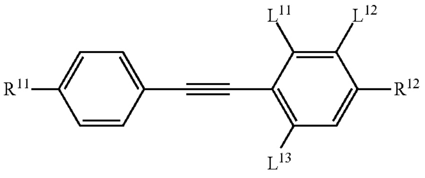

-continued

PT-2

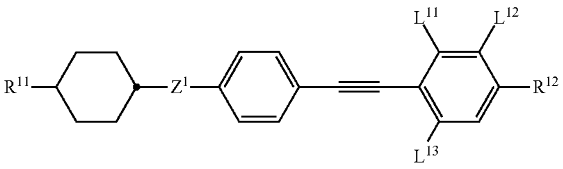

PT-3

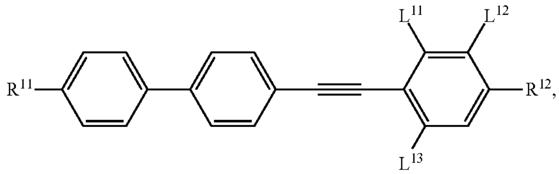, wherein:

$R^{11}$ and $R^{12}$, identically or differently, denote H, alkyl or alkoxy having 1 to 12 C atoms, or alkenyl, alkenyloxy or alkoxyalkyl having 2 to 12 C atoms, in which one or more $CH_2$-groups may be replaced by

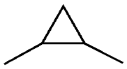, 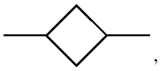,

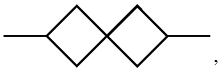, 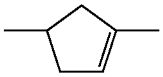 or

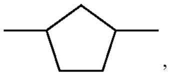, and in which one or more H atoms may be replaced by fluorine, and $L^{11}$, $L^{12}$, $L^{13}$ identically or differently, denote H, $CH_3$, CI or F.

5. The liquid crystal medium according to claim 1, wherein the medium comprises one or more compounds of the formula T selected from the group of compounds of the formulae T1 to T5,

T1

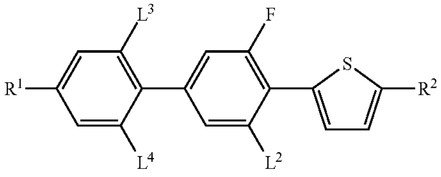

T2

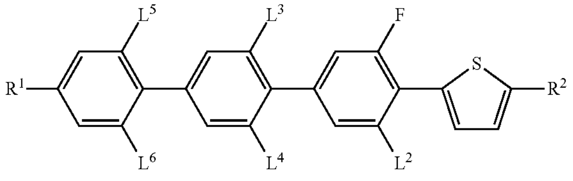

-continued

T3

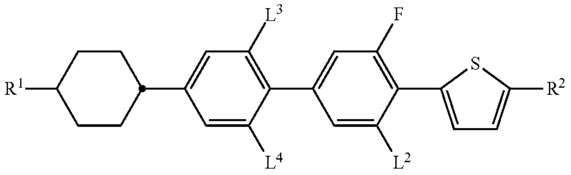

T4

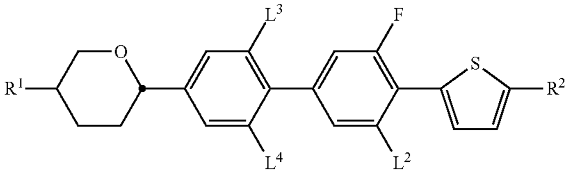

T5

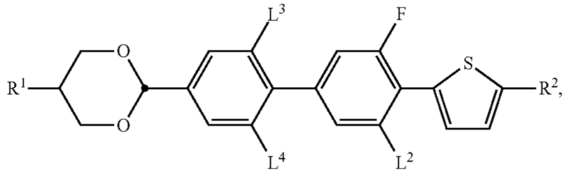

wherein:

$R^1$ and $R^2$ denote H, F, Cl, Br, —CN, —SCN, —NCS, $SF_5$ or straight-chain alkyl having 1 to 12 C atoms or branched alkyl having 3 to 12 C atoms, in which one or more non-adjacent $CH_2$ groups may each be replaced, independently of one another, by —CH═CH—, —C≡C—, —O—, —CO—, —CO—O—, —O—CO—, or —O—CO—O— in such a way that O atoms are not linked directly to one another, and in which one or more H atoms may be replaced by F, Cl or Br, and $L^2$ to $L^6$ independently denote H or F.

6. The liquid crystal medium according to claim 1, wherein the medium comprises one or more compounds of the formula S1 selected from the group of compounds of formula S1-1

S1-1

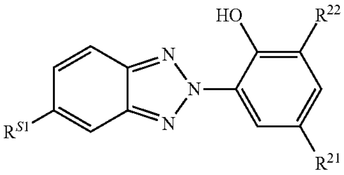

in which $R^{S1}$ denotes H, F or Cl, and $R^{21}$ and $R^{22}$, identically or differently, denote H or straight-chain alkyl having from 1 to 12 carbon atoms or branched alkyl having from 3 to 12 carbon atoms, in which one or more $CH_2$ groups may each, independently of one another, be replaced by

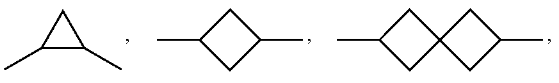

-continued

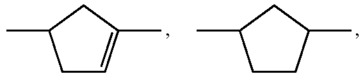

—O—, —CO—O—, —O—CO—, —CH═CH— or —C≡C— in such a way that O atoms are not linked directly to one another, or aryl, or arylalkyl having from 6 to 25 carbon atoms.

7. The liquid crystal medium according claim 1, wherein the medium further comprises one or more compounds selected from formula III-2:

III-2

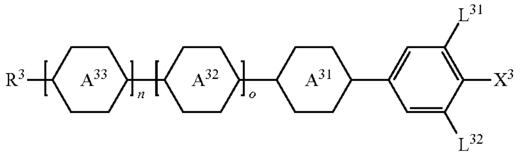

in which $R^3$ denotes a straight-chain or branched alkyl or alkoxy radical that is unsubstituted or halogenated and has 1 to 15 C atoms, where one or more $CH_2$ groups in these radicals may each be replaced, independently of one another, by

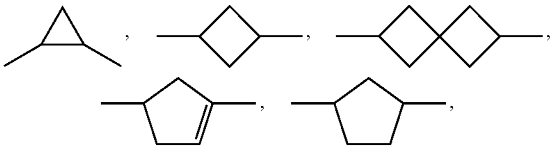

—C≡C—, —$CF_2$O—, —CH═CH—, —O—, —CO—O— or —O—CO— in such a way that O atoms are not linked directly to one another,

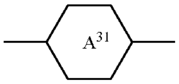 to 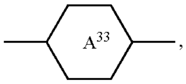, identically or differently, denote,

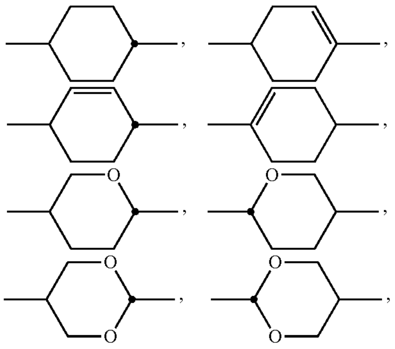

-continued

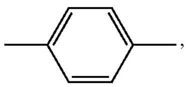, 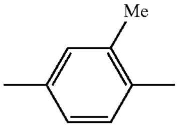,

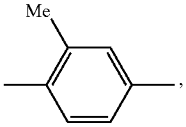, 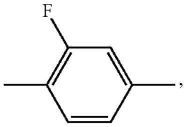,

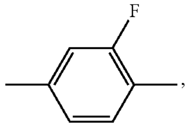, 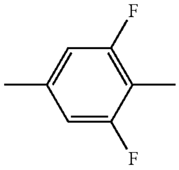 or

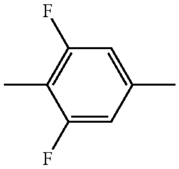, $L^{31}$ and $L^{32}$ identically or differently, denote H or F, $X^3$ denotes halogen, halogenated alkyl or alkoxy with 1 to 3 C-atoms or halogenated alkenyl or alkenyloxy with 2 or 3 C-atoms, and n and o are, independently of each other, 0 or 1.

8. The medium according to claim 1, wherein the medium further comprises one or more compounds of the formula IV

IV

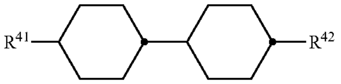

in which $R^{41}$ denotes a straight chain alkyl radical having 1 to 12 C atoms or a branched or cyclic alkyl radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, $R^{42}$ denotes a straight chain alkyl or alkoxy radical having 1 to 12 C atoms or a branched or cyclic alkyl or alkoxy radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine.

9. The medium according to claim 8, wherein the medium comprises one or more compounds of formula IV selected from the group of compounds of the formulae IVa and IVb IVa

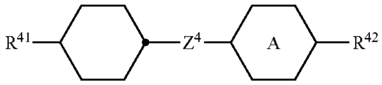

-continued

IVb

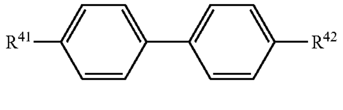

in which $R^{41}$ and $R^{42}$, independently of one another, have the meanings defined in claim 8, and

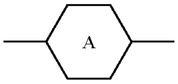 denotes 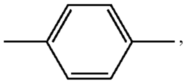,

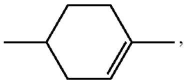, 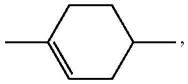,

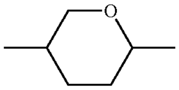 or 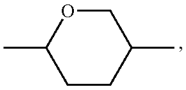, $Z^4$ denotes a single bond, $—CH_2CH_2—$, $—CH{=}CH—$, $—CF_2O—$, $—OCF_2—$, $—CH_2O—$, $—OCH_2—$, $—COO—$, $—OCO—$, $—C_2F_4—$, $—C_4H_8—$, or $—CF{=}CF—$.

10. An electronic component comprising a first substrate and a second substrate facing each other, a liquid crystal medium sandwiched between said first and second substrates, an electrode provided on each substrate or two electrodes provided on only one of the substrates for supplying an electric potential across said liquid crystal medium to drive liquid crystals in a predetermined configuration, wherein said liquid crystal medium comprises the liquid crystal medium according to claim 1.

11. The electronic component according to claim 10, wherein the liquid crystal medium in the component is arranged as a tunable dielectric configured for use in high-frequency technology.

12. The electronic component according to claim 10, wherein the component is a liquid-crystal based antenna element, a phase shifter, a tunable filter, a tunable metamaterial structure, a matching network or a varactor.

13. A microwave antenna array, wherein it comprises one or more components according to claim 10.

14. The component according to claim 10, wherein the component is an optical component operable in the visible or infrared range of the electromagnetic spectrum.

15. The component according to claim 14, wherein the component is a transmissive spatial light modulator.

16. The component according to claim 14, wherein the component is a reflective spatial light modulator configured to modulate the phase of an incident optical signal propagating at least partially in a first dimension, wherein the first substrate is a transparent glass layer having a first, transparent electrode, and wherein the second substrate is a CMOS silicon backplane (160), the component further comprising a mirror (150) disposed between the second substrate and the liquid crystal medium, wherein the mirror is divided into a two-dimensional array of individually addressable pixels arranged and configured as second electrodes, each pixel being individually drivable by a voltage signal to provide a local phase change to at least one polarization component of an optical signal.

17. An optical device comprising an RGB light source, and the component according to claim 14, arranged and configured to modulate the phase of an incident optical signal from said RGB light source when the optical device is in operation.

18. A method of spatially modulating light, the method comprising, i) providing an optical component comprising first and second substrates facing each other and each having a surface, the first substrate comprising at least one first electrode, the second substrate comprising at least one second electrode, the component further comprising a liquid crystal layer sandwiched between the first and second substrates wherein the liquid crystal comprises the liquid crystal medium according to claim 1;

ii) providing an RGB light source;

ii) receiving incident light from said RGB light source at a surface of said optical component;

iii) applying a predetermined voltage to each of the individual electrodes formed on the first substrate in order to modulate a refractive index of the liquid crystal layer.

* * * * *